(12) United States Patent
Ferren et al.

(10) Patent No.: US 8,032,798 B2
(45) Date of Patent: Oct. 4, 2011

(54) DATA RETRIEVAL SYSTEMS

(75) Inventors: Bran Ferren, Beverly Hills, CA (US); Edward K. Y. Jung, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 318 days.

(21) Appl. No.: 12/287,341

(22) Filed: Oct. 7, 2008

(65) Prior Publication Data

US 2009/0122670 A1    May 14, 2009

Related U.S. Application Data

(62) Division of application No. 11/223,888, filed on Sep. 9, 2005, now Pat. No. 7,565,596.

(51) Int. Cl.
*G06F 11/00* (2006.01)
(52) U.S. Cl. .......... 714/54; 714/6.11; 714/6.13; 714/15; 714/42
(58) Field of Classification Search .................. 714/5, 6, 714/8, 15, 42, 54, 6.11, 6.13
See application file for complete search history.

(56) References Cited

U.S. PATENT DOCUMENTS

| | | | |
|---|---|---|---|
| 4,237,211 A | 12/1980 | Fanselow | |
| 4,434,337 A | 2/1984 | Becker | |
| 4,490,767 A | 12/1984 | Neuman et al. | |
| 4,625,359 A | 12/1986 | Egner-Walter et al. | |
| 4,743,989 A | 5/1988 | Bauck et al. | |
| 5,014,311 A | 5/1991 | Schrenk | |
| 5,162,989 A | 11/1992 | Matsuda | |
| 5,182,742 A | 1/1993 | Ohmori et al. | |
| 5,302,898 A | 4/1994 | Pethig et al. | |
| 5,309,301 A | 5/1994 | Gregory et al. | |
| 5,319,481 A | 6/1994 | Fergason | |
| 5,337,180 A | 8/1994 | Woods et al. | |
| 5,394,367 A | 2/1995 | Downs et al. | |
| 5,450,489 A | 9/1995 | Ostrover et al. | |
| 5,465,381 A | 11/1995 | Schmidt et al. | |
| 5,483,596 A | 1/1996 | Rosenow et al. | |
| 5,507,545 A | 4/1996 | Krysiak | |
| 5,521,140 A | 5/1996 | Matsuda et al. | |
| 5,567,512 A | 10/1996 | Chen et al. | |
| 5,590,381 A * | 12/1996 | Mourad .......................... 710/52 |

(Continued)

FOREIGN PATENT DOCUMENTS

CN    1585980 A    2/2005

(Continued)

OTHER PUBLICATIONS

U.S. Appl. No. 11/504,547, Ferren et al.

(Continued)

*Primary Examiner* — Robert Beausoliel, Jr.
*Assistant Examiner* — Joshua P Lottich
(74) *Attorney, Agent, or Firm* — Suiter Swantz pc llo

(57) ABSTRACT

Embodiments of methods and systems for controlling access to information stored on memory or data storage devices are disclosed. In various embodiments, methods of retrieving information from a data storage device previously deactivated by modification or degradation of at least a portion of the data storage device are disclosed.

8 Claims, 48 Drawing Sheets

U.S. PATENT DOCUMENTS

| | | | |
|---|---|---|---|
| 5,652,838 A | 7/1997 | Lovett et al. | |
| 5,734,823 A | 3/1998 | Saigh et al. | |
| 5,736,777 A | 4/1998 | Shield et al. | |
| 5,751,074 A | 5/1998 | Prior et al. | |
| 5,755,942 A | 5/1998 | Zanzucchi et al. | |
| 5,785,831 A | 7/1998 | Bek | |
| 5,796,706 A | 8/1998 | Shintani et al. | |
| 5,815,434 A | 9/1998 | Hasbun et al. | |
| 5,815,484 A | 9/1998 | Smith et al. | |
| 5,878,203 A * | 3/1999 | Matsumoto et al. | 714/6 |
| 5,880,523 A | 3/1999 | Candelore | |
| 5,960,398 A | 9/1999 | Fuchigami et al. | |
| 6,000,030 A | 12/1999 | Steinberg et al. | |
| 6,006,328 A | 12/1999 | Drake | |
| 6,011,772 A | 1/2000 | Rollhaus et al. | |
| 6,030,581 A | 2/2000 | Virtanen | |
| 6,041,412 A | 3/2000 | Timson et al. | |
| 6,044,046 A | 3/2000 | Diezmann et al. | |
| 6,103,454 A | 8/2000 | Dhar et al. | |
| 6,131,165 A | 10/2000 | Lipkin et al. | |
| 6,151,262 A | 11/2000 | Haroun et al. | |
| 6,157,559 A | 12/2000 | Yoo | |
| 6,160,734 A | 12/2000 | Henderson et al. | |
| 6,226,747 B1 | 5/2001 | Larsson et al. | |
| 6,228,440 B1 | 5/2001 | Dailey et al. | |
| 6,230,244 B1 | 5/2001 | Kai | |
| 6,278,679 B1 | 8/2001 | Weiss et al. | |
| 6,296,020 B1 | 10/2001 | McNeely et al. | |
| 6,303,886 B1 | 10/2001 | Stoughton | |
| 6,314,518 B1 | 11/2001 | Linnartz | |
| 6,320,830 B1 | 11/2001 | Tsukamoto et al. | |
| 6,322,682 B1 | 11/2001 | Arvidsson et al. | |
| 6,338,933 B1 | 1/2002 | Lawandy et al. | |
| 6,389,701 B1 | 5/2002 | Friedland | |
| 6,410,103 B1 | 6/2002 | Kasamatsu et al. | |
| 6,427,140 B1 | 7/2002 | Ginter et al. | |
| 6,434,109 B2 | 8/2002 | Rollhaus et al. | |
| 6,454,173 B2 | 9/2002 | Graves | |
| 6,454,970 B1 | 9/2002 | Öhman et al. | |
| 6,511,728 B1 | 1/2003 | Bakos et al. | |
| 6,512,600 B1 | 1/2003 | Kawai et al. | |
| 6,513,060 B1 | 1/2003 | Nixon et al. | |
| 6,535,858 B1 | 3/2003 | Blaukovitsch et al. | |
| 6,537,635 B1 | 3/2003 | Bakos et al. | |
| 6,587,429 B1 | 7/2003 | Conturie et al. | |
| 6,589,626 B2 | 7/2003 | Selinfreund et al. | |
| 6,591,852 B1 | 7/2003 | McNeely et al. | |
| 6,601,613 B2 | 8/2003 | McNeely et al. | |
| 6,620,478 B1 | 9/2003 | Öhman | |
| 6,632,656 B1 | 10/2003 | Thomas et al. | |
| 6,633,877 B1 | 10/2003 | Saigh et al. | |
| 6,640,305 B2 | 10/2003 | Kocher et al. | |
| 6,641,886 B1 | 11/2003 | Bakos et al. | |
| 6,646,967 B1 * | 11/2003 | Garcia | 369/53.21 |
| 6,651,149 B1 | 11/2003 | Iwasaki | |
| 6,653,625 B2 | 11/2003 | Andersson et al. | |
| 6,654,797 B1 | 11/2003 | Kamper | |
| 6,662,262 B1 | 12/2003 | Kasa et al. | |
| 6,663,003 B2 | 12/2003 | Johnson et al. | |
| 6,678,239 B2 | 1/2004 | Clemens | |
| 6,684,199 B1 | 1/2004 | Stebbings | |
| 6,684,310 B2 | 1/2004 | Anzai et al. | |
| 6,709,802 B2 | 3/2004 | Lawandy et al. | |
| 6,715,116 B2 | 3/2004 | Lester et al. | |
| 6,717,136 B2 | 4/2004 | Andersson et al. | |
| 6,721,889 B1 | 4/2004 | Jaegtnes et al. | |
| 6,728,644 B2 | 4/2004 | Bielik et al. | |
| 6,744,551 B1 | 6/2004 | Chao | |
| 6,747,930 B1 | 6/2004 | Weldon et al. | |
| 6,748,485 B1 | 6/2004 | Yokota et al. | |
| 6,748,537 B2 | 6/2004 | Hughes | |
| 6,751,716 B2 | 6/2004 | Sumitani et al. | |
| 6,756,103 B2 | 6/2004 | Thompson et al. | |
| 6,764,758 B1 | 7/2004 | Grunze et al. | |
| 6,772,340 B1 | 8/2004 | Peinado et al. | |
| 6,775,655 B1 | 8/2004 | Peinado et al. | |
| 6,780,564 B2 | 8/2004 | Lawandy et al. | |
| 6,782,190 B1 | 8/2004 | Morito | |
| 6,788,443 B2 | 9/2004 | Ayres et al. | |
| 6,793,753 B2 | 9/2004 | Unger et al. | |
| 6,802,489 B2 | 10/2004 | Marr et al. | |
| 6,811,736 B1 | 11/2004 | Ohman et al. | |
| 6,812,456 B2 | 11/2004 | Andersson et al. | |
| 6,812,457 B2 | 11/2004 | Andersson et al. | |
| 6,826,700 B1 | 11/2004 | Germscheid et al. | |
| 6,837,476 B2 | 1/2005 | Cabuz et al. | |
| 6,838,144 B2 | 1/2005 | Bakos et al. | |
| 6,839,316 B2 | 1/2005 | Bakos et al. | |
| 6,852,851 B1 | 2/2005 | Tooke et al. | |
| 6,854,005 B2 | 2/2005 | Thiele | |
| 6,878,555 B2 | 4/2005 | Andersson et al. | |
| 6,948,071 B2 | 9/2005 | Schneider et al. | |
| 7,027,384 B2 | 4/2006 | Ohbi et al. | |
| 7,177,261 B2 | 2/2007 | Thompson et al. | |
| 7,343,330 B1 * | 3/2008 | Boesjes et al. | 705/28 |
| 7,369,471 B2 | 5/2008 | Ferren et al. | |
| 7,451,344 B1 * | 11/2008 | Rothberg | 714/5 |
| 7,505,264 B2 | 3/2009 | Hall et al. | |
| 7,512,959 B2 | 3/2009 | Ferren et al. | |
| 7,519,980 B2 | 4/2009 | Ferren et al. | |
| 7,636,724 B2 * | 12/2009 | de la Torre et al. | 1/1 |
| 7,668,068 B2 | 2/2010 | Ferren et al. | |
| 7,748,012 B2 | 6/2010 | Ferren et al. | |
| 7,770,028 B2 | 8/2010 | Ferren et al. | |
| 7,796,485 B2 | 9/2010 | Ferren et al. | |
| 2001/0018741 A1 * | 8/2001 | Hogan | 713/189 |
| 2001/0055702 A1 | 12/2001 | Wang et al. | |
| 2002/0051536 A1 | 5/2002 | Shirakawa et al. | |
| 2002/0076647 A1 | 6/2002 | Lawandy et al. | |
| 2002/0137218 A1 | 9/2002 | Mian et al. | |
| 2002/0142099 A1 | 10/2002 | Dubs | |
| 2002/0166061 A1 | 11/2002 | Falik et al. | |
| 2003/0018905 A1 | 1/2003 | Schneider et al. | |
| 2003/0028820 A1 * | 2/2003 | Takashi et al. | 714/5 |
| 2003/0031115 A1 | 2/2003 | Constantinou et al. | |
| 2003/0043710 A1 | 3/2003 | Shelton et al. | |
| 2003/0044322 A1 | 3/2003 | Andersson et al. | |
| 2003/0051148 A1 | 3/2003 | Garney | |
| 2003/0053934 A1 | 3/2003 | Andersson et al. | |
| 2003/0054563 A1 | 3/2003 | Ljungstrom et al. | |
| 2003/0126391 A1 * | 7/2003 | Neufeld et al. | 711/165 |
| 2003/0131255 A1 | 7/2003 | Shim | |
| 2003/0156763 A1 | 8/2003 | Soderman | |
| 2003/0174616 A1 | 9/2003 | Constantinou et al. | |
| 2003/0223100 A1 | 12/2003 | Anderson | |
| 2004/0016879 A1 | 1/2004 | Andersson et al. | |
| 2004/0037994 A1 | 2/2004 | Bakos et al. | |
| 2004/0058408 A1 | 3/2004 | Thomas et al. | |
| 2004/0088479 A1 | 5/2004 | Hall | |
| 2004/0152015 A1 | 8/2004 | Lawandy et al. | |
| 2004/0191125 A1 | 9/2004 | Kellogg et al. | |
| 2004/0209034 A1 | 10/2004 | Tompson et al. | |
| 2004/0215909 A1 | 10/2004 | Imai et al. | |
| 2005/0002302 A1 | 1/2005 | Sugimura | |
| 2005/0015609 A1 | 1/2005 | Delorme | |
| 2005/0031777 A1 | 2/2005 | Hayashi et al. | |
| 2005/0042770 A1 | 2/2005 | Derand et al. | |
| 2005/0069913 A1 | 3/2005 | Mian et al. | |
| 2005/0094522 A1 | 5/2005 | Yokokawa | |
| 2005/0105885 A1 | 5/2005 | Lee | |
| 2005/0141351 A1 * | 6/2005 | Yamanaka | 369/30.01 |
| 2005/0195728 A1 | 9/2005 | Larroche | |
| 2006/0056815 A1 * | 3/2006 | Sutardja | 386/125 |
| 2006/0069945 A1 * | 3/2006 | Takashi et al. | 714/5 |
| 2006/0071795 A1 | 4/2006 | Benedikt | |
| 2006/0104172 A1 | 5/2006 | Grampel et al. | |
| 2006/0224611 A1 | 10/2006 | Dunn et al. | |
| 2006/0262928 A1 | 11/2006 | Bar-El et al. | |
| 2006/0268661 A1 | 11/2006 | Ferren et al. | |
| 2006/0280088 A1 | 12/2006 | Ferren et al. | |
| 2007/0033352 A1 | 2/2007 | Ferren et al. | |
| 2007/0061893 A1 * | 3/2007 | Black et al. | 726/27 |
| 2007/0074126 A1 | 3/2007 | Fisher et al. | |
| 2007/0162978 A1 | 7/2007 | Watanabe et al. | |
| 2008/0159109 A1 | 7/2008 | Ferren et al. | |

| | | | |
|---|---|---|---|
| 2008/0252463 | A1 | 10/2008 | Andrechak et al. |
| 2009/0034384 | A1* | 2/2009 | Geelen .................. 369/53.35 |
| 2009/0122666 | A1 | 5/2009 | Ferren et al. |

FOREIGN PATENT DOCUMENTS

| | | |
|---|---|---|
| GB | 2 443 998 A | 5/2008 |
| WO | WO 98/07019 | 2/1998 |
| WO | WO 98/11539 | 3/1998 |
| WO | WO 98/41979 | 9/1998 |
| WO | WO 98/53311 | 11/1998 |
| WO | WO 99/67085 | 12/1999 |
| WO | WO 2007/019473 A2 | 2/2007 |
| WO | WO 2007/030808 A2 | 3/2007 |

OTHER PUBLICATIONS

U.S. Appl. No. 11/499,395, Ferren et al.
U.S. Appl. No. 11/471,970, Ferren et al.
U.S. Appl. No. 11/471,284, Ferren et al.
U.S. Appl. No. 11/223,899, Ferren et al.
U.S. Appl. No. 11/223,898, Ferren et al.
U.S. Appl. No. 11/233,829, Ferren et al.
Adelstein, Peter Z.; "Permanence of Digital Information"; International Conference of the Round Table on Archives: XXIV—CITRA Budapest 1999, Access to Information and Preservation Issues; bearing a date of 1999; pp. 1-7.
"An Overview of the Field of Optical Disk Data Storage"; WTEC Hyper—Librarian; bearing a date of Jun. 1999; pp. 1-13; located at: http://www.wtec.org/loyola/hdmem/05_02.htm; printed on Apr. 20, 2005.
Bertram, Neal H.; Cuddihy, Edward F.; "Kinetics of the Humid Aging of Magnetic Recording Tape"; IEEE Transactions on Magnetics; pp. 993-999; vol. Mag-18, No. 5, Sep. 1982.
Bogart, John W.C. Van; "Magnetic Tape Storage and Handling: A Guide for Libraries and Archives—4. Life Expectancy: How Long Will Magnetic Media Last?"; National Media Laboratory; bearing a date of Jun. 1995; pp. 1-2; located at: http://www.clir.org/pubs/reports/pub54/4life_expectancy.html; printed on Apr. 22, 2005.
Bogart, John W.C. Van; "Magnetic Tape Storage and Handling: A Guide for Libraries and Archives—5. How Can You Prevent Magnetic Tape from Degrading Prematurely?"; National Media Laboratory; bearing a date of Jun. 1995; pp. 1-8; located at: http://www.clir.org/pubs54/5premature_degrade.html; printed on Apr. 22, 2005.
Bogart, John W.C. Van; "Mag Tape Life Expectancy 10-30 years: A Letter to the Editor of the Scientific American"; National Media Lab; bearing dates of Mar. 13, 1995, Jan. 1995, Aug. 3, 2004; pp. 1-2; located at: http://palimpsest.stanford.edu/bytopic/electronic-records/electronic-storage-media/bogart.html; printed on Apr. 22, 2005.
Bogart, John Van; "Storage Media Life Expectancies"; Digital Archive Directions (DADs) Workshop; Jun. 22, 1998; pp. 1-17; National Medial Laboratory located at : http://ssdoo.gsfc.nasa.gov/nost/isoas/dads/presentations/VanBogart/VanBogart.ppt; printed on Apr. 22, 2005.
"Flexplay: How Flexplay®Works"; Howstuffworks.com; bearing dates of Dec. 2, 2004, 2000, 2005; pp. 1-2; Convex Group; located at: http://www.flexplay.com/how-flexplay-works.htm; printed on Feb. 11, 2005.
Fuentes-Hernandez, Canek; Thomas, Jayan; Termine, Roberto; Meredith, Gerald; Peyghambarian, Nasser; Kippelen, Bernard; Barlow, Steve; Walker, Gregory; Marder, Seth R.; Yamamoto, Michiharu; Cammack, Kevin; Matsumoto, Kenji; "Video-rate compatible photorefractive polymers with stable dynamic properties under continuous operation"; Applied Physics Letters; bearing dates of 2004, and Feb. 24, 2005; pp. 1877-1879; vol. 85, No. 11, Sep. 13, 2004; American Institute of Physics.
Garfinkel, Simson; "The Myth of Doomed Data"; TechnologyReview.com; bearing a date of Dec. 3, 2003; pp. 1-2; located at: http://www.technologyreview.com/articles/03/12/wo_garfinkel120303.asp?p=0; printed on Apr. 25, 2005.
Hadenius, Patric; "Holostorage for the Desktop"; Technology Review: Innovation News—Hardware; bearing a date of May 2004; p. 22; Courtesy of Inphase Technologies.

"Hard disk drive design and technology: Magnetic Hard Disk Drive"; USByte.com; bearing dates of 1999-2002; pp. 1-2; located at: http://www.usbyte.com/common/HDD.htm; printed on Apr. 20, 2005.
Hunt, Jim; "Fend Off Data Degradation"; Quality Online, Quality Computing; bearing a date of May 1999; pp. 1-5; located at: http://www.qualitymag.com/articles/1999/may99/0599qc.html; printed on Nov. 12, 2001.
Jonietz, Erika; "Magnetic Future: Isolating bits on a disk drive could shatter storage limits"; Technology Review; p. 23; Jul./Aug. 2002; Courtesy of IBM Research; located at: www.technologyreview.com.
Judge, J.S.; Schmidt, R.G.; Weiss, R.D.; Miller, G; "Media Stability and Life Expectancies of Magnetic Tape for Use with IBM 3590 and Digital Linear Tape Systems"; pp. 1-4.
Kuhn, Kelin J.; "CD/ROM—An extension of the CD audio standard"; pp. 1-8; located at: http://www.ee.washington.edu/conselec/CE/kuhn/cdrom/95x8.htm; printed on Sep. 22, 2004.
Kuhn, Kelin J.; "Other disk formats of interest"; pp. 1-6; located at: http://www.ee.washington.edu/conselec/CE/kuhn/otherformats/95x9.htm; printed on Apr. 22, 2005.
Latorre, Laurent; Kim, Joonwon; Lee, Junghoon; De Guzman, Peter-Patrick; Lee, Hyesog J.; Nouet, Pascal; Kim, Chang-Jin; Electrostatic Actuation of Microscale Liquid-Metal Droplets; Journal of Microelectromechanical Systems; vol. 11; No. 4; Aug. 2002; pp. 302-308; IEEE.
Madou, Marc J.; Lee, L. James; Koelling, Kurt W; Daunert, Sylvia; Lai, Siyi; Koh, Chee Guan; Juang, Yi-Je; Yu, Liyong; Lu, Yumin; "Design and Fabrication of Polymer Microfluidic Platforms for Biomedical Applications"; ANTEC; bearing a date of 2001; pp. 2534-2538.
"6. Magnetic Materials"; pp. 1-9; located at: http://www.unesco.ore/webworld/mdm/administ/en/guide/guide008.htm; printed on Apr. 22, 2005.
Novack, Wesley; "ASUS DRW-1604P DVD±RW drive—Reading Performance"; CD Freaks.com; bearing a date of Feb. 12, 2005; pp. 1-9; located at: http://www.cdfreaks.com/article/179/3; printed on Apr. 22, 2005.
Peiker, E.J.; "Flash Memory—A Primer"; NatureScapes.Net; pp. 1-3; located at: http://www.naturescapes.net/112003/ej1103.htm; printed on Apr. 22, 2005.
Sadashige, Koichi; "Data Storage Technology Assessment—2002 Projections through 2010"; National Media Laboratory and National Technology Alliance; bearing a date of Mar. 2003; pp. 1-80.
"STMicroelectronics Advances in Development of Future Non-Volatile Memory Technology"; STMicroelectronics; bearing dates of Jun. 16, 2004, 2005; pp. 1-2; located at: http://www.st.com/stonline/press/news/year2004/t1480h.htm; printed on Apr. 22, 2005.
Thompson, D.A.; Best, J.S.; "The future of magnetic data storage technology"; IBM Journal of Research and Development; bearing dates of Jul. 9, 1999, Nov. 9, 1999; pp. 1-9;vol. 44, No. 3, 2000; located at: http://www.research.ibm.com/journal/rd/443/thompson.html; printed on Apr. 20, 2005.
"Transponder News"; pp. 1-6, located at http://rapidttp.com/transponder/easbasic.html; printed on Aug. 31, 2005.
Trock, Jacob; "18. Litteraturliste"; pp. 1-23; located at: http://home3.inet.tele.dk/jtrock/2del/kap18.htm; printed on Apr. 22, 2005.
Tyson, Jeff; "How Flash Memory Works"; howstuffworks; bearing dates of 1998-2005; pp. 1-6; HowStuffWorks, Inc.; located at: http://computer.howstuffworks.com/flash-memory.htm/printable; printed on Apr. 28, 2005.
Vos, Martin; Ashton, Gary; Bogart, John Van; Ensminger, Ron; "Heat and Moisture Diffusion in Magnetic Tape Packs"; National Media Laboratory; bearing a date of Mar. 1994; pp. 1-15; vol. 30, No. 2; IEEE Transactions on Magnetics.
Zeng, Jun; Banerjee, Deb; Deshpande, Manish; Gilbert, John R.; "Design Analyses of Capillary Burst Valves in Centrifugal Microfluidics"; UTAS; pp. 1-4; 2000; located at: www.coventor.com/media/papers/uTAS2000_burst.pdf.
U.S. Appl. No. 11/198,939, Ferren et al.
U.S. Appl. No. 11/198,938, Ferren et al.
U.S. Appl. No. 11/150,837, Ferren et al..
U.S. Appl. No. 12/583,859, Ferren et al.
U.S. Appl. No. 12/583,399, Ferren et al.

UK Intellectual Property Office Examination Report Under Section 18(3); App. No. GB0806367.9; Jun. 11, 2010 (received by our Agent on Jun. 14, 2010); pp. 1-3.
UK Intellectual Property Office Examination Report Under Section 18(3); App. No. GB0806366.1; Jun. 11, 2010 (received by our Agent on Jun. 14, 2010); pp. 1-3.
UK Intellectual Property Office Combined Search and Examination Report under Sections 17 and 18(3); App. No. GB1019876.0; Feb. 14, 2011 (received by our agent Feb. 15, 2011); pp. 1-5.

The State Intellectual Property Office of the People's Republic of China Notice on the First Office Action; App. No. 200680036503.8; Jan. 26, 2011; pp. 1-3.
The State Intellectual Property Office of the People's Republic of China Notice on the First Office Action; App. No. 200680039257.1; Jul. 14, 2011; pp. 1-3.

* cited by examiner

DATA RETRIEVAL SYSTEMS

CROSS-REFERENCE TO RELATED APPLICATIONS

For purposes of the United States Patent Office (USPTO) extra-statutory requirements, the present application is a DIVISION application of U.S. patent application Ser. No. 11/223,888 titled DATA RETRIEVAL SYSTEMS, naming BRAN FERREN AND EDWARD K. Y. JUNG as inventors, filed 9 Sep. 2005, now U.S. Pat. No. 7,565,596, or is an application of which a application is entitled to the benefit of the filing date. The present application claims the benefit of the earliest available effective filing date(s) (i.e., claims earliest available priority dates for other than provisional patent applications or claims benefits under 35 USC §119(e) for provisional patent applications) for any and all applications to which patent application Ser. No. 11/223,888 claims the benefit of priority, including but not limited to U.S. patent application Ser. No. 11/124,924, titled METHOD AND SYSTEM FOR FLUID MEDIATED DISK ACTIVATION AND DEACTIVATION, naming BRAN FERREN; ELEANOR V. GOODALL; AND EDWARD K. Y. JUNG as inventors, filed 9 May 2005. All subject matter of U.S. patent application Ser. No. 11/124,924 and of any and all applications from which it claims the benefit of the earliest available effective filing date(s) is incorporated herein by reference to the extent such subject matter is not inconsistent herewith. The applicant entity has provided above a specific reference to the application(s) from which priority is being claimed—as required by statute. Applicant entity understands that the statute is unambiguous in its specific reference language and does not require either a serial number or any characterization, such as "continuation" or "continuation-in-part" or "divisional," for claiming priority to U.S. patent applications. Notwithstanding the foregoing, the applicant entity has provided above a specific reference to the application(s) from which priority is being claimed, but expressly points out that such designations are not to be construed in any way as any type of commentary and/or admission as to whether or not the present application contains any new matter in addition to the matter of its parent application(s). Any designation that the present application is a "division" should not be construed as an admission that the present application claims subject matter that is patentably distinct from claimed subject matter of its parent application.

BACKGROUND

Various methods have been used to control access to information stored on data storage devices such as CDs, DVDs, floppy disks, and so forth. Methods of controlling access to information are utilized for various reasons including, for example, to limit unauthorized access to copyrighted information. Such methods may involve requiring the use of access codes provided, e.g., on data storage device packaging in order to read information from a data storage device, or erasing data or preventing reading of data from a data storage device following reading of the device.

SUMMARY

Embodiments of devices, methods and systems relating to retrieval of information from deactivated, expired or disabled memory or data storage devices are disclosed. Features of various embodiments will be apparent from the following detailed description and associated drawings.

BRIEF DESCRIPTION OF THE FIGURES

Features of the invention are set forth in the appended claims. The exemplary embodiments may best be understood by making reference to the following description taken in conjunction with the accompanying drawings. In the figures, like referenced numerals identify like elements.

FIG. 1C depicts the embodiment of FIG. 10A following degradation of the data;

DETAILED DESCRIPTION

Figure 1:
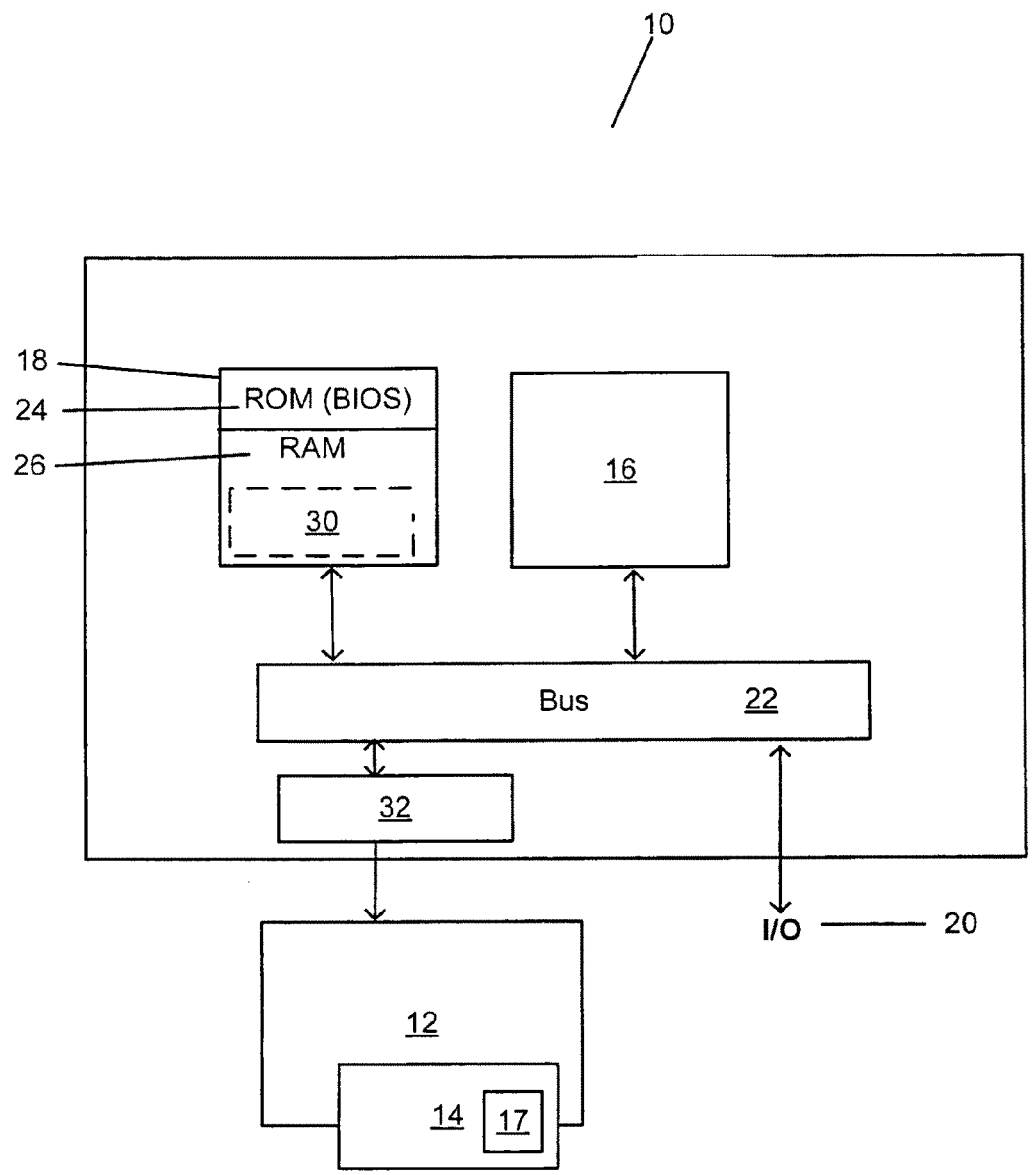
FIG. 1 is a block diagram of a system including a data storage device.

Data storage devices may be used to store a wide variety of types of data of interest including audio data, video data, text data, graphical data, numerical data, and software code, to name only a few examples. In some cases, it may be desired to permit reading of data from a data storage device for a limited period of time or for a limited number of uses or reads of the device. Such cases arise, for example, when a copyright holder wishes to limit access to copyrighted data, e.g. to permit software to be installed on a limited number of computer systems, or to permit a 'rented' movie to be viewed over the course of a few days and not longer. Limiting number of reads or duration of access to information may be of utility in various other applications as well, including, but not limited to, the distribution of information that is confidential or information that is valid for only a limited period of time. As used herein, the term "data of interest" refers to some portion of the data stored on a data storage device that is of interest with regard to controlling access to the data. It is not intended that the data of interest must include all data on the data storage device that might be of use or of interest to a user of the data storage device. In some embodiments, the data of interest may include all or the majority of useable data on the data storage device, while in others it may include only a subset of the useable data on the data storage device. In some embodiments, the data of interest may include selected modules of computer program code, or selected portions of a video or audio recording, so that access to certain portions of the program, video, or audio recording (for example) may be restricted, while other portions may remain accessible, or become accessible.

In some cases it may be desirable to provide the user of a data storage device the possibility of regaining access to information on the data storage device after deactivation of the data storage device. According to various embodiments as exemplified herein, methods, systems and devices are provided for retrieving information from degraded or deactivated data storage devices. Examples of data storage devices that may be usable for a limited number of uses (or reads) or for a limited period of time and subsequently modified, degraded or deactivated to destroy or render inaccessible or unusable some or all data on the data storage device are disclosed and described in U.S. patent application Ser. No. 11/124,924, filed May 9, 2005, entitled METHOD AND SYSTEM FOR FLUID MEDIATED DISK ACTIVATION AND DEACTIVATION; U.S. patent application Ser. No. 11/124,923, filed May 9, 2005, entitled FLUID MEDIATED DISK ACTIVATION AND DEACTIVATION MECHANISMS; U.S. patent application Ser. No. 11/150,823 filed Jun. 9, 2005, entitled ROTATION RESPONSIVE DISK ACTIVATION AND DEACTIVATION MECHANISMS; U.S. patent application Ser. No. 11/150,837, filed Jun. 9, 2005, entitled METHOD AND SYSTEM FOR ROTATIONAL CONTROL OF DATA STORAGE DEVICES; U.S. patent application Ser. No. 11/198,939, filed Aug. 5, 2005, entitled MEMORY DEVICE ACTIVATION AND DEACTIVATION and U.S. patent application Ser. No. 11/198,938, filed Aug. 5, 2005, entitled LIMITED USE MEMORY DEVICE WITH ASSOCIATED INFORMATION, to which the present application claims priority, and which are incorporated herein by reference in their entirety, and U.S. Pat. Nos. 6,011,772; 6,228,440; 6,709, 802; 6,780,564; 6,838,144; 6,839,316; all of which are incorporated herein by reference in their entirety.

FIG. 1 illustrates a system 10, which may be a computer system or other system that includes a read device 12 adapted for reading machine readable data from data storage device 14. Data storage device 14 may include a modifiable or degradable portion 17 that prior to degradation or modification contains information that supports reading of information from a portion of data storage device 14. As will be discussed herein, and as discussed in various references incorporated herein by reference, data storage devices according to various embodiments may include features that render at least portions of the data storage device degradable under certain conditions. In addition to computers, exemplary embodiments of systems that may include read devices for reading data from a data storage device included DVD players, CD players, card readers, and various special purpose devices for reading any sort of image, audio, text, software, or other data from a data storage device. System 10 may include a processor 16, system memory 18, one or more I/O devices 20, and data bus 22. Data and control signals may be transferred between system components via data bus 22. System memory 18 may include read-only memory (ROM) 24 and random access memory (RAM) 26. During use, device driver software 30 may be stored in RAM 26. System 10 may also include a power supply, not shown. Processor 16 may be a microprocessor, for example. Data storage device 14 may be a CD, DVD, floppy disk, smart card, magnetic stripe card, magnetic tape, or any of various other data storage devices capable of storing machine readable data. In this and other embodiments, data storage devices may take the form of disks, cards, or microchips, for example. System 10 may include a read device interface 32 operatively connected between read device 12 and system bus 22.

Figure 2:
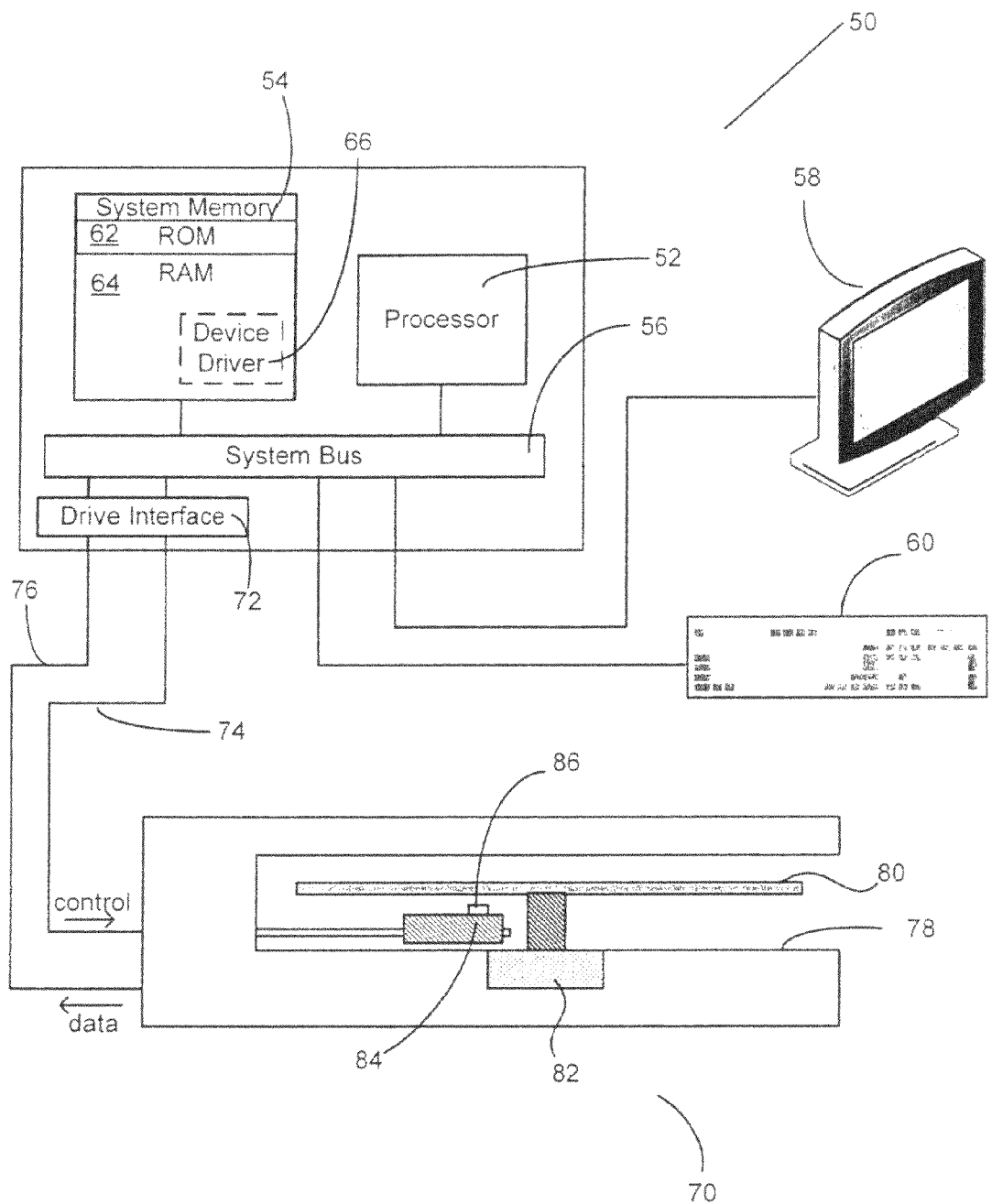
FIG. 2 illustrates a computer system.

FIG. 2 depicts a specific example of a system as depicted in FIG. 1. FIG. 2 illustrates a computer system 50. Computer system 50 may include a microprocessor 52, system memory 54, system bus 56, output device 58, and input device 60. In this example output device 58 is a monitor. One or multiple output devices of other types may be used in various embodiments, including but not limited to speakers, printers, data storage devices, and audio, video, or tactile displays of various types. Similarly, input device 60 in the present example is a keyboard, but other types of input devices, including but not limited to, computer mice, track balls, touch screens, microphones, scanners, may be used instead, either singly or in combination. System memory 54 includes read-only memory 62 and random-access memory 64. Device driver 66 may be stored in random-access memory 64. Device driver 66 is used to control disc drive 70. Drive Interface 72 provides an interface between the computer system 50 and disk drive 70. Control line 74 and data line 76 provide for the transfer of control and data signals between system 50 and disk drive 70. Disk drive 70 includes receptacle 78, which is adapted to receive disk 80. Disk 80 is rotated by motor 82. Positioner 84 adjusts the position of the read head 86 with respect to disk 80.

Systems for reading data from such data storage devices may include general-purpose computing devices and other systems having the capability of reading data from data storage devices. Such systems may expose data storage devices to influences that produce degradation or modification in the data storage device. For example a system such as computer system 50 may include hardware or software that cause light of a particular intensity or wavelength to be directed to a particular region of a data storage device when it is in the read device, cause the data storage device to be subjected to a spin of a specified intensity or duration by the read device, or cause the data storage device to be exposed to a particular electrical field or magnetic field strength. In some embodiments, the data storage device (e.g., disk 80) may be configured so that some or all of it will be modified or inactivated following a selected number of uses. In some embodiments, components of system 50 may operate in a conventional manner. In other embodiments, selected components of system 50 may include features that are specialized to produce modification or degradation of the data storage device. For example, if a portion of disk 80 is degraded by exposure to high intensity light, disk drive 70 may be modified to direct high intensity light onto an appropriate portion of disk 80 to cause deactivation of disk 80. System 50 may be modified at the level of drive 70, drive interface 72, or program code 66 residing in RAM 64. Drive 70 or drive interface 72 may be modified at the hardware, firmware, or software level. Program code 66 may be system software or application program software. System 50 may be configured to detect prior activation of a rotation activatable mechanism on data storage device 80 based upon detection of a modification to data storage device 80. Modifications to data storage device 80 associated with prior activation may be detected by various means. If the modification includes modification of data or modification of accessibility of a particular portion of data, the modification may be detected when an attempt is made to read data from data storage device 80, e.g. by failure of reading. Such modifications may be manifested as modifications of data or accessibility of data, but are not limited to modification of data or data accessibility. In some embodiments, modifications may be detectable by optical, electrical, magnetic, or other means, and the presence of the modification may serve as an instruction to the system to discontinue reading of the disk, or to operate in a specified manner (e.g., by increasing the speed of rotation of the disk, delivering light to a selected region of the disk, etc.). Combinations of data read devices and data storage devices that may be used to produce data storage device deactivation are described, for example, in U.S. Pat. Nos. 6,011,772; 6,228,440; 6,709,802; 6,744,551; 6,780,564; 6,838,144; and 6,839,316.

Figure 3:
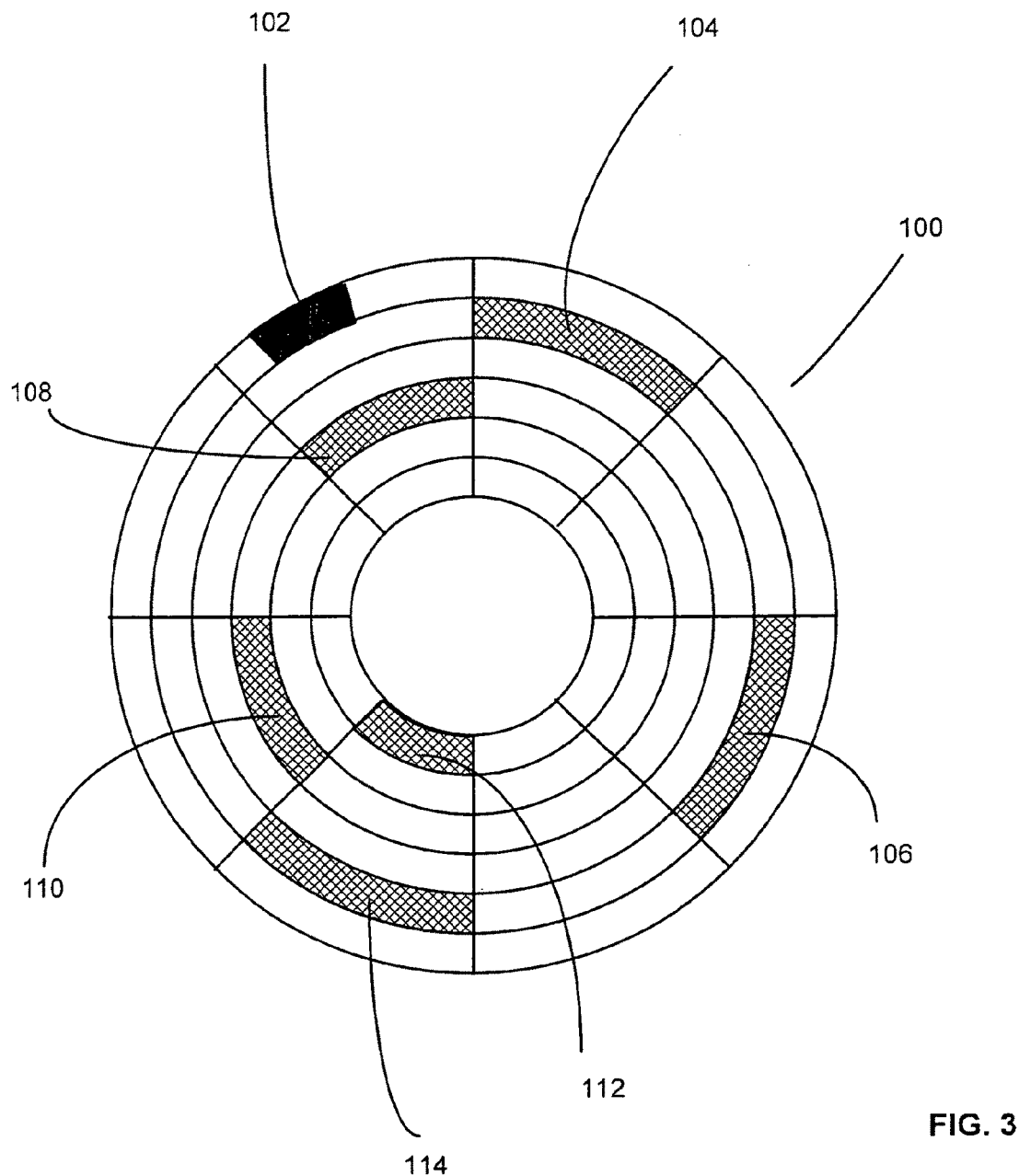
FIG. 3 illustrates a disk including stored machine readable data and index information.

FIG. 3 depicts an embodiment of an exemplary data storage device. As depicted in FIG. 3, data of interest (for example, a computer program or an audio or video digital recording) may be distributed to multiple locations on data storage device 100 (which in this example is depicted as a disk, but which may take other forms, as well). In order to retrieve the data of interest in usable form, it may be from the appropriate location in the appropriate order, as specified by index information stored in index region 102. In the present exemplary embodiment, index region 102 may specify that data may be read from first data region 104, second data region 106, third data region 108, fourth data region 110, fifth data region 112 and sixth data region 114, in that sequence. Thus, in order to render the data stored in first through sixth data regions 104 through 114 unusable, it may be sufficient to render data stored in index region 102 inaccessible, even though the data contained in data segments 104, 106, 108, 110, 112, and 114 may still be intact and otherwise readable. Therefore, according to certain embodiments, a data storage device deactivated in this way can be 'reactivated' by providing the index information from another source.

Figure 4:
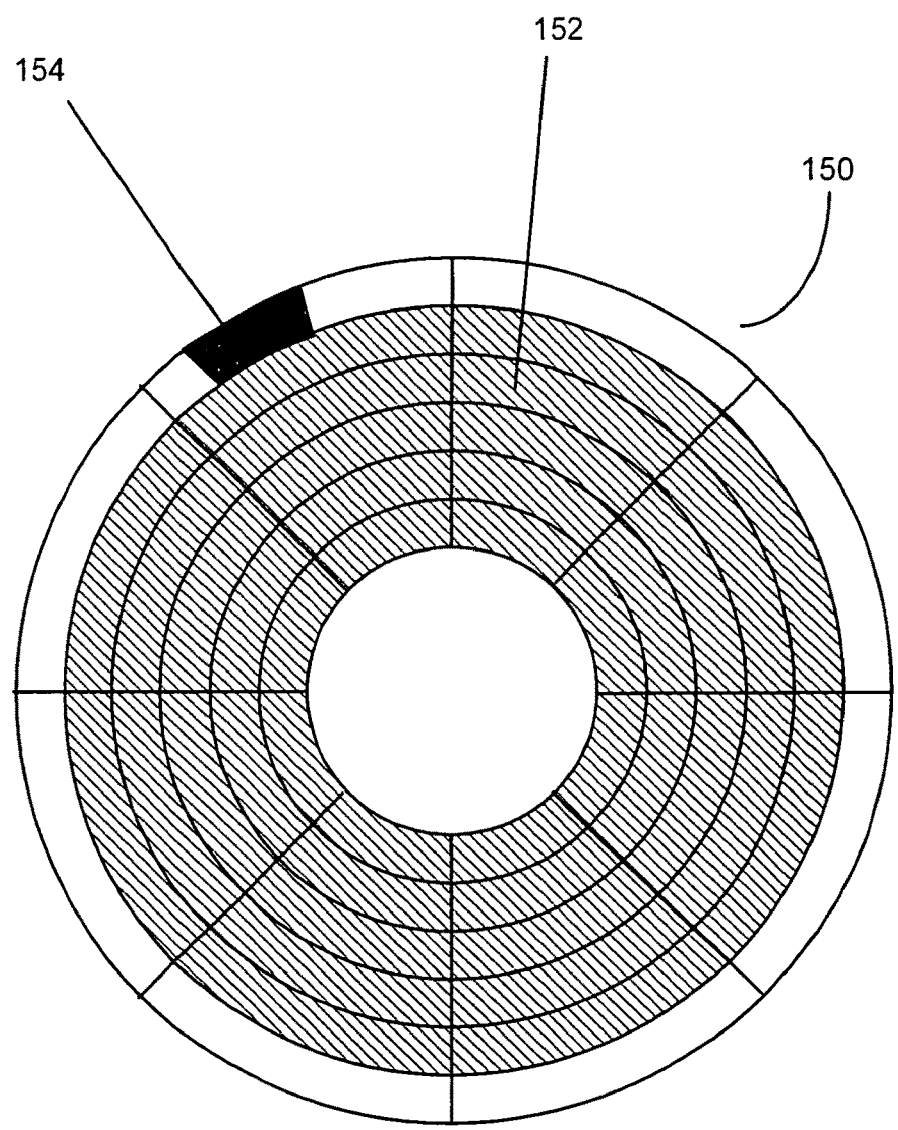
FIG. 4 illustrates a disk including stored machine readable data and key information.

A further exemplary data storage device is depicted in FIG. 4. In FIG. 4, a data storage device 150 may include data of interest in data region 152 stored in encrypted or encoded form, and key information stored in key region 154. Key information stored in key region 154 is used to decode or decrypt data of interest stored in data region 152. As described in connection with the embodiment shown in FIG. 3, if key information in key region 154 is destroyed, modified, or rendered inaccessible, the data of interest contained in data region 152 may be rendered inaccessible even though the data is still intact and readable. Thus, a data storage device deactivated in this way can be 'reactivated' by providing the data read device with key information from another source.

Both index information used in the embodiment of FIG. 3 and key information used in the embodiment of FIG. 4 may be classified generally as 'read-support information'. Other forms of ordering, encoding, encrypting or otherwise structuring data so that it is readable only with the use of some form of read-support information may be used in various embodiments as disclosed herein, and the term read-support information is not intended to be limited only to key and index information as illustrated in FIGS. 3 and 4. Methods of encoding or encrypting data are known or may be developed by those of skill in the relevant arts, and the embodiments described herein are not limited to use with any particular data indexing, encoding or encryption scheme. Encryption methods may include public key encryption methods such as Diff-Hellman, RSA, ElGaml, DSS, Elliptic curve, Paillier cryptosystem, or Password-authenticated Key agreement encryption method, or a private key encryption method, such as a DES encryption method.

Figure 5:
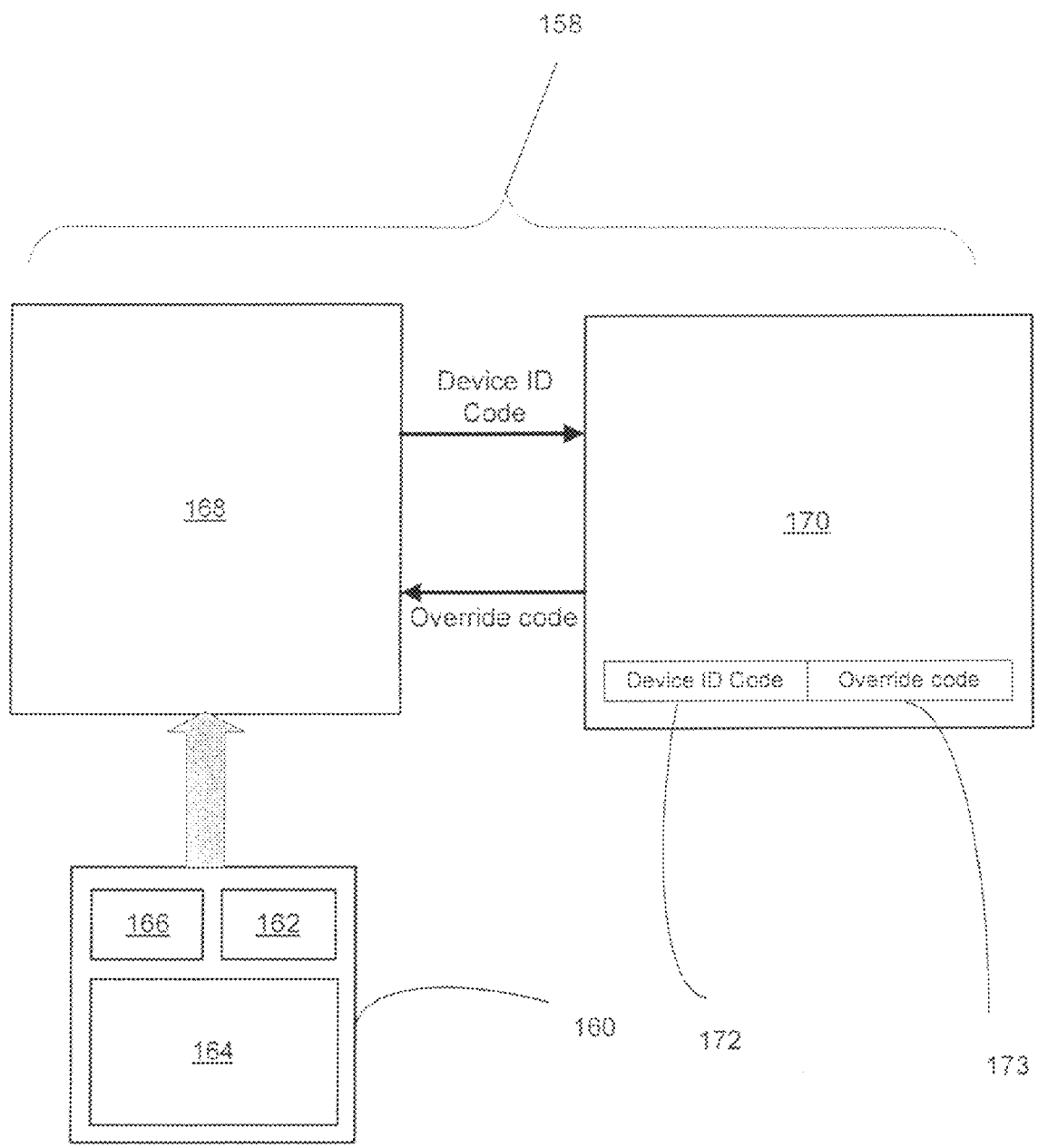
FIG. 5 is a schematic diagram of an embodiment of a system for activation of a deactivated data storage device.

FIG. 5 is a schematic diagram of an embodiment of a system 158 for activation of a data storage device 160. System 158 includes read device containing system 168 (which may be, for example, a computer system, a DVD player, a CD player, or various other systems that include a read device capable of reading data from a data storage device) and remote system 170. Data storage device 160 includes data storage device identification code 162, data of interest 164, and, prior to modification of the device (e.g., in connection with use of the device), read-support information 166. Read device containing system 168 makes use of read-support information 166 on data storage device 160 to read data of interest 164 from data storage device 160. Following degradation or modification of data storage device 160, in which read-support information 166 is degraded, modified, or otherwise rendered inaccessible, data of interest 164 remains intact but cannot be read (or cannot be read in a useful format) from data storage device 160. According to use of system 158, read device containing system 168 may send a request to remote system 170, the request including at least data storage device identification code 162. The data storage device identification code 162 is matched to a device ID code 172 with remote system 170, and a corresponding override code 173 is identified. The override code is then provided to read device containing system 168 by remote system 170. Device ID code 172 and override code 173 are associated, linked, or correlated with each other in remote system 170. Remote system 170 may be a hardware and/or software based system, and the request and override code may be transmitted between read device containing system 168 and remote system 170 in electronic format, via a wireless transmission, or via other methods for machine communication. Transfer of request and the override code may be performed in an automated fashion under hardware or software control, or under the direction of a user of a read device containing system 168. For example, remote system 170 may include a web site (e.g., a service or support web site), and device ID code 172 and override code 173 may be transmitted electronically to/from the web site. The override code may contain any data or information sufficient to override the deactivation of data storage device 160 to enable reading of data of interest 164 from data storage device 160. Override code 173 may include read-support information necessary to permit data to be read from a deactivated memory or data storage device. Override code 173 may be a backup copy of some or all of read-support information 166. In some embodiments, override code 173 may be an analog of read-support information 166, i.e., it may be functionally equivalent to read-support information 166 with regard to enabling reading of data of interest from data storage device 160, but it may not be exactly the same as read-support information 166. Remote system 170 may be at a location distinct from read device containing system 168. In some embodiments, remote system 170 may be operated by a third party or service provider.

Figure 6:
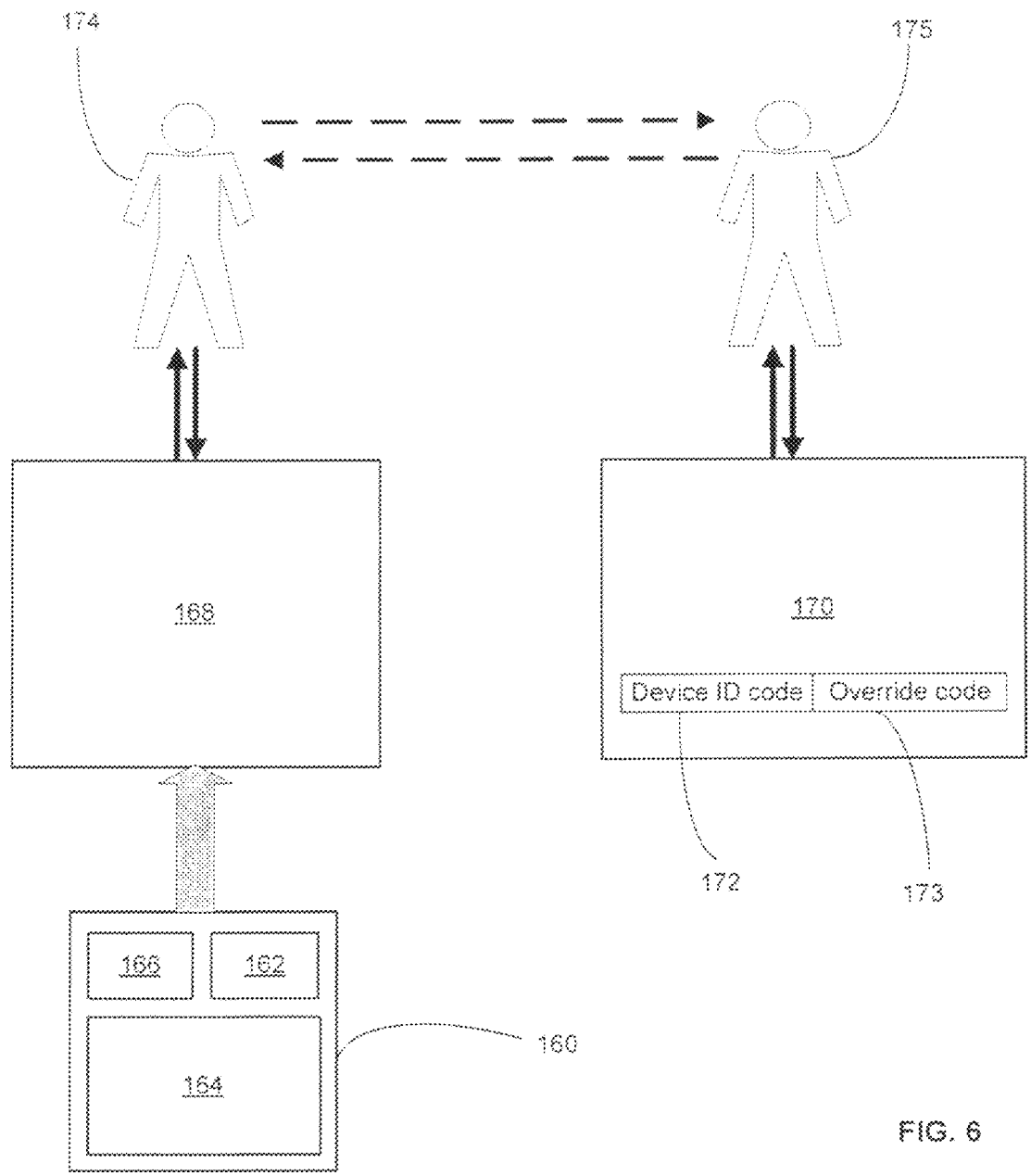
FIG. 6 is a schematic diagram of another embodiment of a system for activation of a deactivated data storage device.

FIG. 6 is a schematic diagram of another embodiment of a system for activation of a deactivated data storage device 160. In the embodiment of FIG. 6, as in the embodiment of FIG. 5, data storage device 160 is used in connection with read device containing system 168. Similarly, a remote system 170 includes linked or associated device ID code 172 and override code 173. In the embodiment of FIG. 6, however, communication between read device containing system 168 and remote system 170 is performed via user 174 of data storage device 160 and a human operator 175 of remote system 170. Communication between user 174 and operator 175 may be carried out in-person, via telephone, e-mail, or by various other forms of human communication as are well-known or as may be developed in the future. User 174 may be the usual user (e.g. the owner or licensee) of data storage device 160, or user 174 may be a representative of the usual user of data storage device 160, including, but not limited to, an employee of a service shop. Operator 175 may be an employee of a service shop, an employee or contractor of the seller of the data storage device or data stored on the data storage device, for example. Remote system 170 may be a computer-based system, in which operator 175 may access an override code stored in a machine readable format accessible to remote system 170. Alternatively, remote system 170 may include various other systems for storing an override code 173 in association with a device ID code 172, including, for example alphanumeric codes stored in a table printed on a sheet of paper in a format readable by operator 175.

Either an automated system including remote system 170, as shown in FIG. 5, or a system that includes a human intermediary, as shown in FIG. 6, may be considered a support entity. Accessing of read-support information may be handled automatically by the system reading the data and thus be transparent to the user of the system unless the device is deactivated to prevent reading of data.

Figure 7:
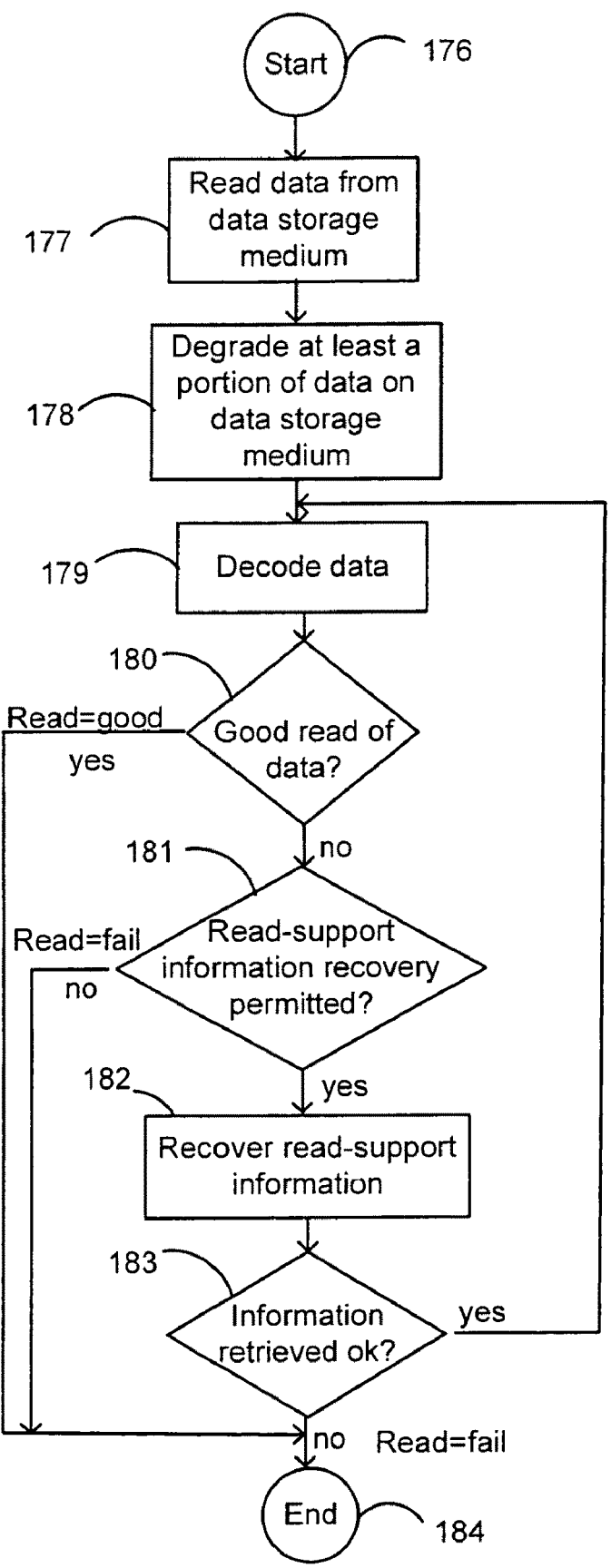
FIG. 7 is a flow diagram of a process including retrieval of read-support information.

FIG. 7 is a flow diagram of a process including retrieval of read-support information. The process of FIG. 7 may occur at the initial reading of data from a data storage device, or subsequent to reading of some or all of the data from the data storage device. At step 177, data is read from the data storage medium. At step 178 at least a portion of data on the data storage medium is degraded. It is presumed that the degraded data portion includes read-support information needed for decoding data that is encoded, encrypted, or ordered in some manner. Step 178 may take place subsequent to, at the same time as, or at least in part prior to reading of data from the data storage medium in step 177. A data decoding step is performed at 179. At decision point 180, the quality of the data reading is assessed. If a good read of data has been obtained, flow control moves to step 184, and the process ends. If a good read of data has not been obtained, flow control moves to decision point 181, and it is determined whether recovery of read-support information is permitted. If recovery of read-support information is not permitted, the read fails and the process ends. If however, recovery of read-support information is permitted, read-support information may be recovered at step 182, and if information retrieval is determined to be satisfactory (at step 183) process control returns to step 179, and data is decoded utilizing the retrieved read-support information. Whether or not recovery of read-support information is permitted may depend on the particular data storage device and surrounding circumstances. For example, if the data storage device contains a movie to be viewed or a music recording that has expired following a certain number/duration of uses, permission to recover read-support information (e.g., from a support entity) may be contingent on verification of payment of an additional rental/subscription fee. If the data storage device contains confidential information, permission to recover read-support information after a limited use period has expired may be granted to a user who provides an appropriate security password or the like. These are only a few of many possible examples.

Figure 8:
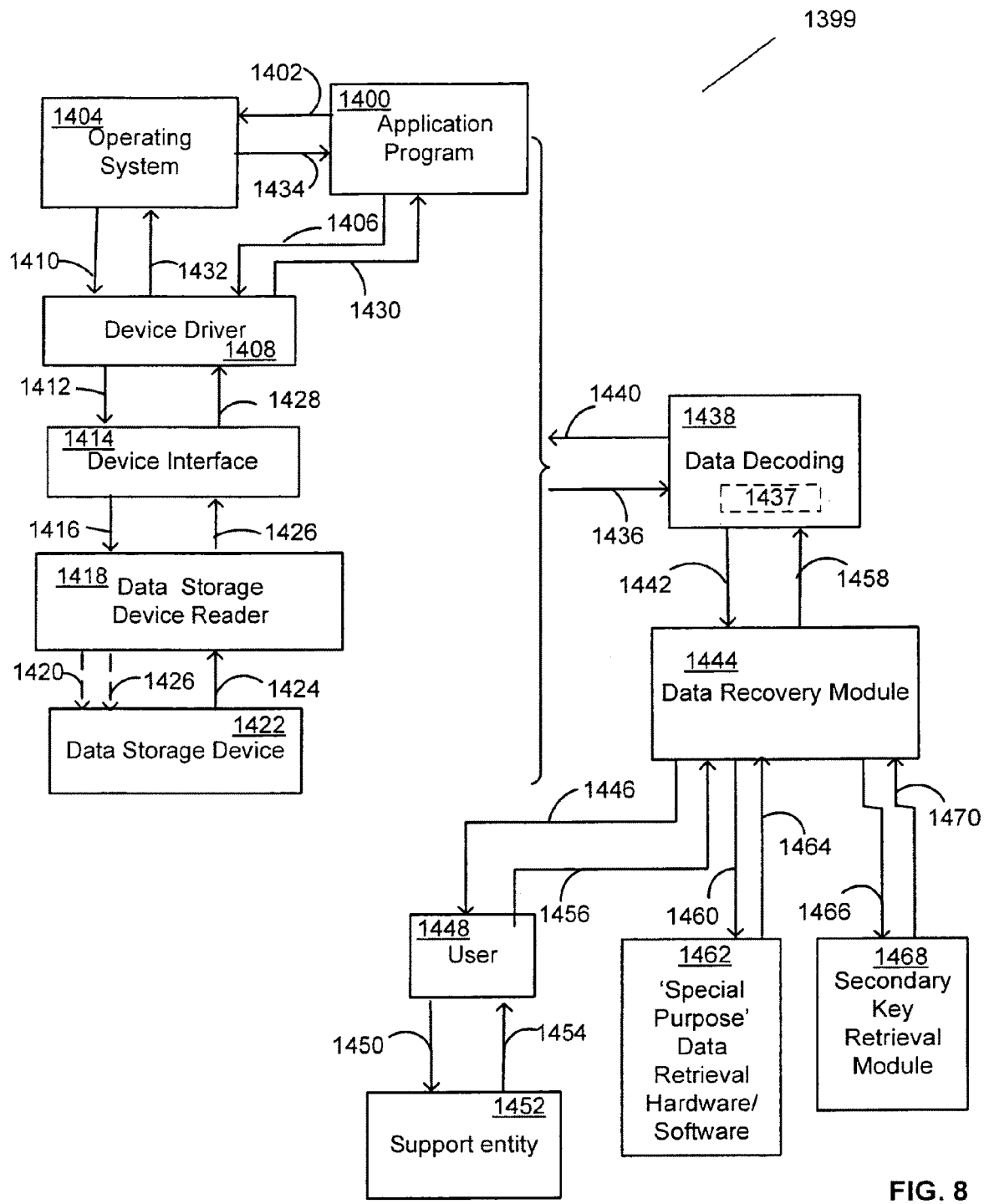
FIG. 8 is a schematic diagram illustrating exemplary processes for reading data from a data storage device.

FIG. 8 is a schematic diagram illustrating exemplary systems and processes for reading data from a data storage device. A read device containing system is indicated generally by reference number 1399, and may be a system including hardware, firmware, and software. An application program may transmit read request 1402 to operating system 1404, which transmits read request 1410 to device driver 1408. Alternately, application program 1400 may send a read request 1406 directly to device driver 1408. Device driver 1408 then submits read request 1412 to device interface 1414, which subsequently submits read request 1416 to data storage device reader 1418. Read requests may be in optical, electrical, or other formats and generated and transmitted through the use of hardware, firmware, software, and combinations thereof. In response to read request 1416, data storage device reader 1418 may send a probe signal 1420 (e.g., an optical interrogation signal) to data storage device 1422. Data storage device reader 1418 then reads data from data storage device 1422. In some embodiments, data storage device reader 1418 may transmit a degradation signal 1426 (which could be an electrical, magnetic, optical, or other signal) designed to produce or initiate degradation of some or all of the data stored in data storage device 1422. Data signals 1424, 1426, 1428, and 1430 may be transmitted to data storage device reader 1418, device interface 1414, device driver 1408, and finally to application program 1400. Alternatively, a data signal 1432 may be transmitted from device driver 1408 to operating system 1404 and then be transmitted to application program 1400 as data signal 1434. At some point between data storage device 1422 and the final recipient of the data (e.g. application program 1400 or operating system 1404), encoded data 1436 may be sent to data decoding module 1438, where it may be decoded with the use of read-support information 1437. Prior to deactivation of data storage device 1422, read-support information 1437 may be read from data storage device 1422. Following deactivation of data storage device 1422, read-support information 1437 may not be obtainable from data storage device 1422. In such cases, a request 1442 may be sent to data recovery module 1444, which may include software, hardware, or firmware components of the data storage device reading system. Data recovery module 1444 may retrieve an override code as described previously, by sending a request 1446 to a user 1448, who then sends a request 1450 to a support entity 1452. In some embodiments, requests may be transmitted directly to support entity 1452 without user 1448 as intermediary. In other embodiments, a request 1460 may be transmitted to special purpose data retrieval hardware/software 1462, that may be adapted to retrieve read-support information directly from a degraded or modified data storage device. An override code 1454 may be transmitted to user 1448 and then to data recovery module 1444 (at reference number 1456). Retrieved read-support information 1464 may be transmitted back to data recovery module 1444. In other embodiments, suitable for cases where a secondary copy of read-support information is stored on data storage device 1422, a request 1466 may be sent from data recovery module 1444 to a secondary key retrieval module 1468 configured to retrieve a secondary copy of read-support information from data storage device 1422, where it may be stored in a secondary location. Data decoding operations may be handled at the hardware or software level in read device containing system 1399. Recovered read-support information 1458 is transmitted from data recovery module 1444 to data decoding module 1438, where it may be used in reading or decoding of data.

Degrading or otherwise rendering inaccessible portions of data on a data storage device may be performed by various methods, the choice of which may be based on the particular data storage device and read device used. In various embodiments described herein, data storage devices may contain machine readable data. Machine readable data is commonly stored in a binary code, which may be stored in various data storage media capable of existing in at least two different states for binary encoding. For example, data may be stored in patterns of electrical potentials, magnetized regions, optically transmissive regions, or optically reflective regions, among others, as known or as may be devised by those of skill in the relevant arts. In some embodiments, data storage media capable of existing in more than two states may be used, and encoding schemes other than binary code may be used. Examples of data storage media include optical and magnetic data storage media, as are well known for use in CDs or DVDs, and floppy disks and magnetic tapes.

In some embodiments of data storage devices suitable for use in methods and systems described herein, a data storage medium may be carried on a substrate. The substrate may be a structure or layer that underlies or supports the data storage medium, or a structure or layer that overlies or coats the data storage medium. The substrate may provide structural stability or protect the data storage medium. In some embodiments, the substrate material may be interspersed with or formed integrally with the data storage medium. As used herein, the term substrate refers to a material that does not itself store the data, but performs a structural or protective function relative to the data storage medium. Data stored in the data storage medium may be read through the substrate in some embodiments of data storage devices, for example, by an interrogating light beam shining through a substrate layer of an optical disk to read data from the disk. A degradation-sensitive region of a data storage device may include any portion of the data storage device that may be modified in some way to render information stored in the region inaccessible or unusable in some way. 'Degradation' may include modification of data stored in a data storage medium, and/or modification or damage to the substrate or data storage medium. In some embodiments a data storage device may include multiple layers or levels in which data may be stored. Data stored at different levels may be read by a read system that focuses the interrogation signal (e.g., a light beam used in reading an optical data storage device) at the appropriate depth or level within the data storage device. Depending on the construction of the data storage device and read system, data stored at different levels may be accessed from a single side or from opposite sides of the data storage device.

Figure 9A:
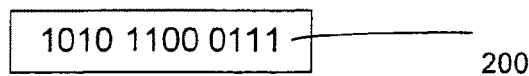
FIG. 9A illustrates an original set of machine readable data.
Figure 9B:
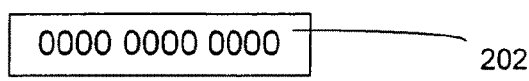
FIGS. 9B-9H illustrate different degraded forms of the machine readable data depicted in FIG. 9A.
Figure 9C:
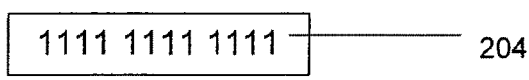
Figure 9D:
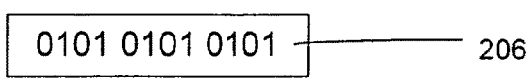
Figure 9E:
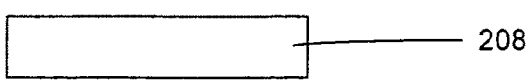
Figure 9F:
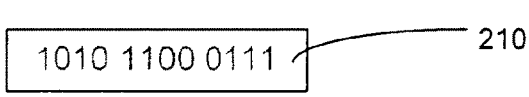
Figure 9G:
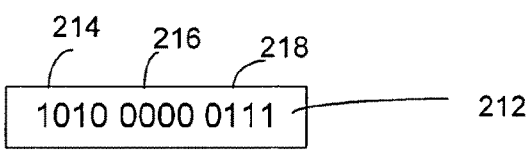
Figure 9H:
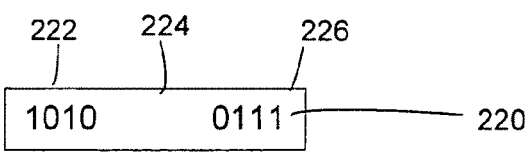

FIGS. 9A-9H illustrate a number of exemplary forms of degradation of data. FIG. 9A depicts an exemplary portion of data stored in a binary format, as represented by data string 200. A first state of a data storage medium may be represented by a '1', while a second state may be represented by a '0' in data string 200. Degradation of data may include setting all data values to a '0', as represented by data string 202 in FIG. 9B, or setting all data values to a '1', as represented by data string 204 in FIG. 9C. Degradation of data may include resetting data values to random values or to some pattern (e.g., alternating '1's and '0's) as represented by data string 206 in FIG. 9D. In each of the examples shown in FIGS. 9B-9D, the data strings contain readable data values, but the data values are not 'correct', i.e., the read data values do not match the original data values. In other embodiments, following degradation, data may no longer be readable. As depicted in FIG. 9E, in some embodiments it may be the case that no data can be read at all, e.g., an attempt to read data string 208 produces a signal that cannot be recognized as either a '1' or a '0'. In other embodiments, partial data degradation may be obtained. Reduced signal-to-noise ratio, as shown in FIG. 9F may be considered a form of partial data degradation; the data is present in data string 210 but accompanied by a higher than usual level of noise. Partial degradation may also include the case where a portion of machine readable data in the second data portion is unreadable. FIG. 9G depicts an example in which data string 212 is partially degraded. First data portion 214 and third data portion 218 contain the original data values, but in second data portion 216, all data values have been set to '0'. FIG. 9H depicts another example of partial data degradation in data string 220. In FIG. 9H, first data portion 222 and third data portion 226 contain original data values, but no data values can be read at all from second data portion 224.

Figure 10A:
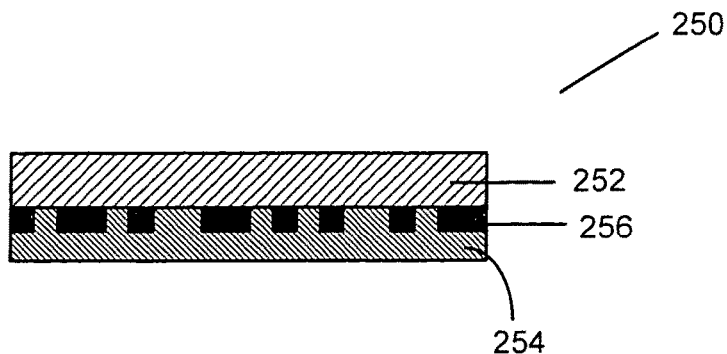
FIG. 10A depicts in schematic form data stored in a data storage medium on a substrate.
Figure 10B:
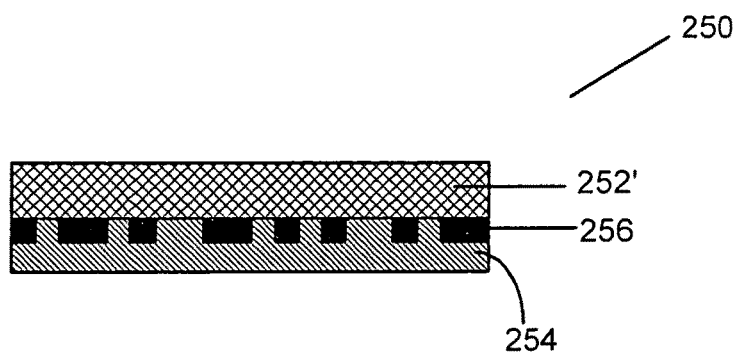
FIG. 10B depicts the embodiment of FIG. 10A following degradation of the substrate.
Figure 10C:
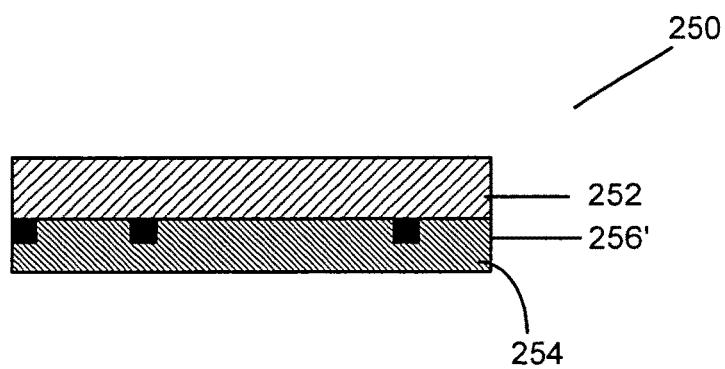
FIG. 10D depicts the embodiment of FIG. 10A following degradation of the data storage medium.
Figure 10D:
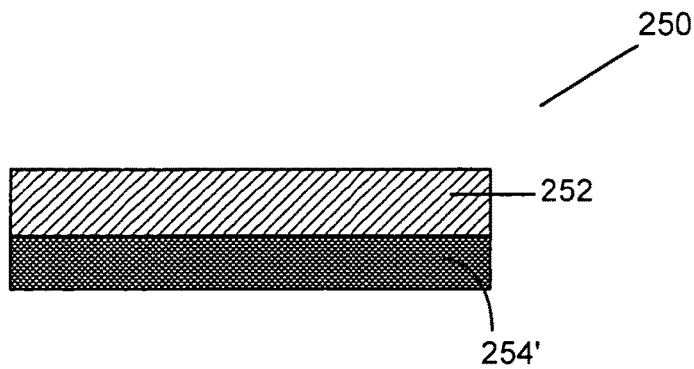

FIGS. 9A-9H illustrate different forms of data degradation that may be manifested in data read from a data storage device by a read device. FIGS. 10A-10D illustrate how different forms of data degradation may be obtained. FIG. 10A is a cross-sectional view of a portion of a data storage device 250, including substrate 252, data storage medium 254, and digital data 256 stored in data storage medium 254. Data storage medium 254 may be a material that can exist in two different states, one of which is represented by the black rectangles, and the other of which is represented by the shaded portion of data storage medium 254. Deactivation of a data storage device may include destruction or modification of the data storage medium so that no data may be stored therein, modification of data stored in a data storage medium, destruction or modification of a substrate or coating located adjacent or near a data storage medium considered to include destruction or modification of data, as shown in various examples herein, or various other modifications to the data storage device that in some way render data inaccessible. FIGS. 10B-10D illustrate possible modifications to data, data storage media, and substrate that may produce the different forms of degradation illustrated in FIGS. 9B-9H.

In FIG. 10B, data storage medium 254 and stored data 256 are unmodified, but the substrate has been changed to a modified form 252', which prevents reading of stored data 256. For example, if data is read optically, with the use of light transmitted through a transparent substrate, reading of data may be blocked, for example, by modifying or degrading substrate 256 to block or hinder transmission of light through the substrate. Examples of such mechanisms are described, for example, in U.S. Pat. Nos. 6,839,316, 6,780,564, and 6,709,802, which are incorporated herein by reference. Modification of substrate 252' may completely block reading of data, as depicted generally in FIG. 9E, or may produce a reduced signal-to-noise ratio as depicted in FIG. 9F. Depending on the particular read system used, a modified substrate may lead to reading of data that are interpreted as all '0's or all '1's as depicted in FIGS. 9B and 9C, respectively.

In FIG. 10C, substrate 252 and data storage medium 254 are unmodified, but data stored in data storage medium 254 is changed to modified form 256', so that the data storage medium contains data values that differ from the originally stored data 256 as shown in FIG. 10A are. Data may be modified by writing or erasing of data, as is known in the art. The data modification represented in FIG. 10C could lead to complete or partial data 'degradation', as depicted in FIG. 9B, 9C, 9D, or 9G.

FIG. 10D depicts a portion of data storage device 250 including substrate 252, and data storage medium 254', which has been modified so that it is no longer capable of storing data. Data storage 254' may be modified or degraded in various ways, depending upon the type of data storage medium. This may produce data degradation as depicted in FIG. 9E, for example.

Machine readable data may be degradable by exposure to one of light, heat, moisture, chemicals, an electrical field, or a magnetic field, or it may be degradable by exposure to a combination of at least two of light, heat, moisture, chemicals, mechanical damage, an electrical field, or a magnetic field. In some embodiments, machine readable data may be degradable in response to a single reading of the memory device, while in other embodiments, it may be degradable in response to between about one and about 10 readings of the memory device. In still other embodiments, machine readable data may be degradable by other numbers of readings of the memory device, and the numbers of readings specified herein are merely exemplary, rather than limiting. The machine readable data may be stored in a data storage medium that includes at least one of a magneto-optic material, a thermo-optic material, or an electro-optic material. In some embodiments, machine readable data may be stored in a data storage medium that includes at least one of a photochromic dye, a photopolymer, or a photorefractive ferroelectric material.

The substrate of the memory device may take various forms, for example the substrate may be a disk shaped substrate, a card, or microchip, for example. In some embodiments, the substrate may include a rigid material, while in others it may include a flexible material.

All or portions of data on a data storage device may be rendered inaccessible by degrading a subset of data on the data storage device that contains information necessary for reading data stored on other parts of the data storage device. In embodiments as exemplified in FIGS. 3 and 4, modification or destruction of portions of a data storage device containing index or key information may render data of interest stored in other portions of the data storage device inaccessible or unreadable. Degradation of the data storage medium may include one or more of destruction of the data storage medium, modification of the data storage medium, modification of data stored in the data storage medium, and modification of signal-to-noise ratio of data stored in the data storage medium. Degradation may take place directly in response to a degradation inducing influence, or it may be initiated by a degradation inducing influence but continue to completion after removal of the degradation inducing influence. This may be the case, for example, if the degradation inducing influence provides input of an activation energy sufficient to overcome an energetic barrier and set off a chemical process that proceeds without further input of energy once initiated. A degradation inducing influence may produce degradation directly, or may function as an intermediary to enable or initiate action by a direct degradation inducing influence. Degradation may include various combinations of two or more degradation mechanisms, and in some embodiments may be produced by synergistic or cooperative effects of two or more degradation inducing or producing factors or influences. Examples of modifiable features include, but are not limited to, mechanical properties, optical properties, electrical properties, magnetic properties, or chemical properties.

Degradation of the substrate may include a change in a material property of the substrate or a change in shape or conformation of the substrate material, such as thickness or surface texture. Material properties may include optical properties such as reflectivity, index of refraction, transmissivity, light scattering, electrical properties, magnetic properties, and so forth. Modifications to material properties, shape, or conformation may be caused by a phase change, chemical reaction, melting, etching, corrosion, etc. of the substrate material due to exposure to a degradation inducing influence. Examples of degradation inducing influences or factors include, for example, heat, light, other forms of electromagnetic radiation, pressure, a magnetic field, or an electrical field. Degradation of data, data storage medium, or substrate may occur by a limited number of reads or uses or by a limited period of time following initiation of degradation.

Figure 11:
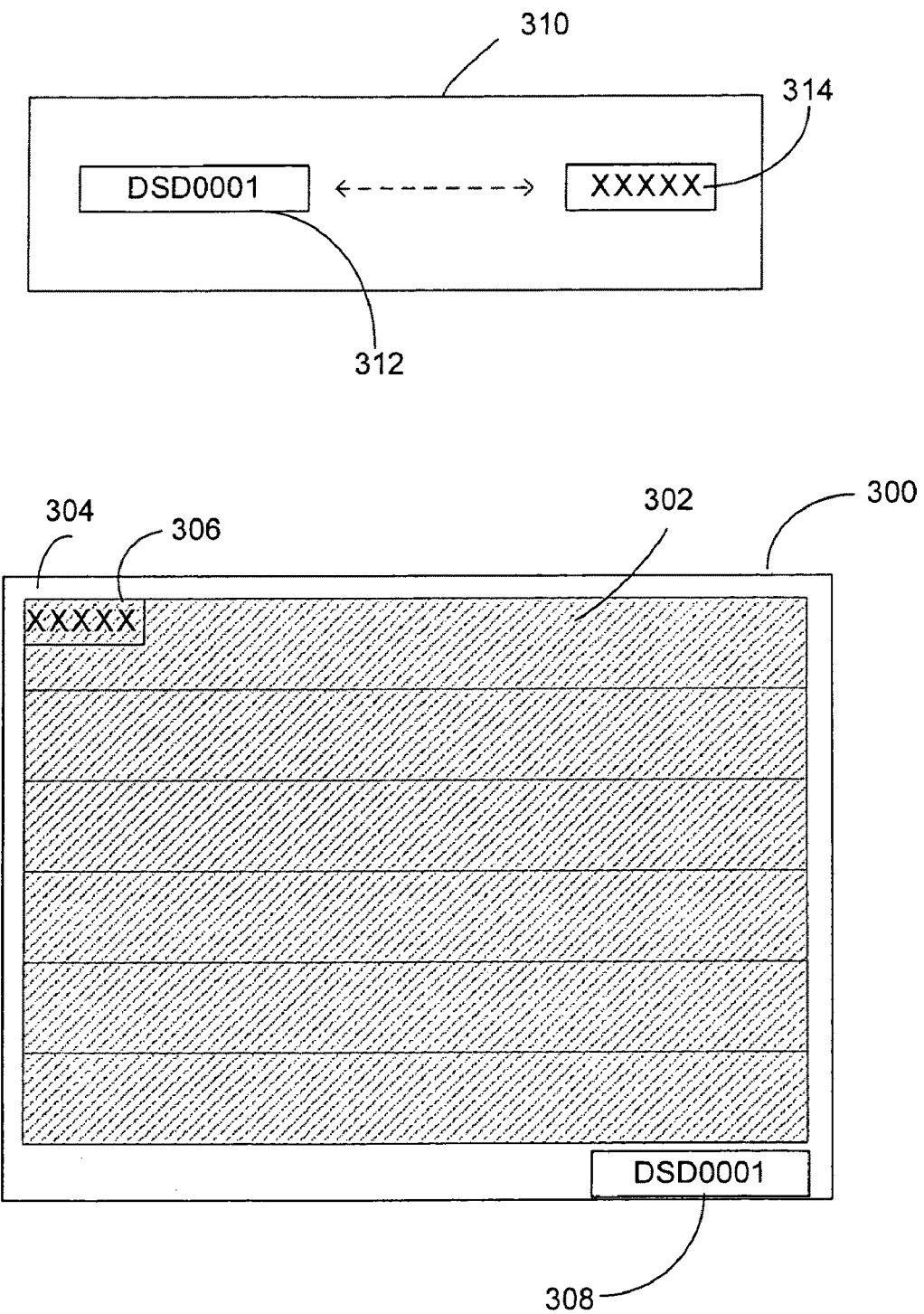
FIG. 11 illustrates a data storage device with read-support information.

FIG. 11 depicts a data storage device 300 containing machine readable data that may include a first data portion that is non-degradable by a limited number of readings, and a second data portion that is degradable by the limited number of readings, the second data portion comprising read-support information necessary for reading data of interest from the first data portion, the memory device having associated therewith a copy or analog of the read-support information retained by a third party. The first data portion contains stored data of interest 302 having a second data portion 304 containing read-support information 306. Read-support information 306 may be index information, key information, or other types of information needed to support reading of data of interest 302. Region 304 containing read-support information 306 may be a degradation-sensitive region. The override code may include a full copy of the read-support information, as depicted in FIG. 11, which may be used to enable reading of data of interest 302 from first data portion 300. Deactivation of the memory device may include degradation of the degradation-sensitive region. For example, the degradation-sensitive region may be degraded by exposure to a degradation-inducing influence to render the data of interest inaccessible to a user of the memory device. Data storage device 300 may also include device identification code 308. Device identification code 308 may be stored in a machine readable format that can be read by a device used to read data from data storage device 300. Alternatively, device identification code 308 may be in a machine readable format that is readable by a different reader, of the same or different type. For example, device identification code 308 may be readable by an optical reader, a magnetic reader, or various other readers. Device identification code 308 may be stored in an electronic, magnetic or optical format, as found on magnetic or optical data storage media, or an optically readable format such as a bar code, for example. In some embodiments, a device identification code may be a human-readable code that may be read by a human user of the device, for example an alphanumeric code printed or embossed on data storage device 300 directly or on a label affixed to data storage device 300. FIG. 11 also depicts a data storage location 310 that is distinct from data storage device 300, in which is stored data storage device identification code 312. Data storage device identification code 312 contains the same information as data storage device identification code 308. Data storage device identification code 312 may be stored in the same or a different format than data storage device identification code 308. For example, data storage device identification code 312 may be stored in an electronic, optical, or magnetic machine-readable format, or it may be stored in a human-readable format (for example, an alphanumeric code printed on a sheet of paper). Override code 314 may be stored in data storage location 310 in association with data storage device identification code 312.

Figure 12:
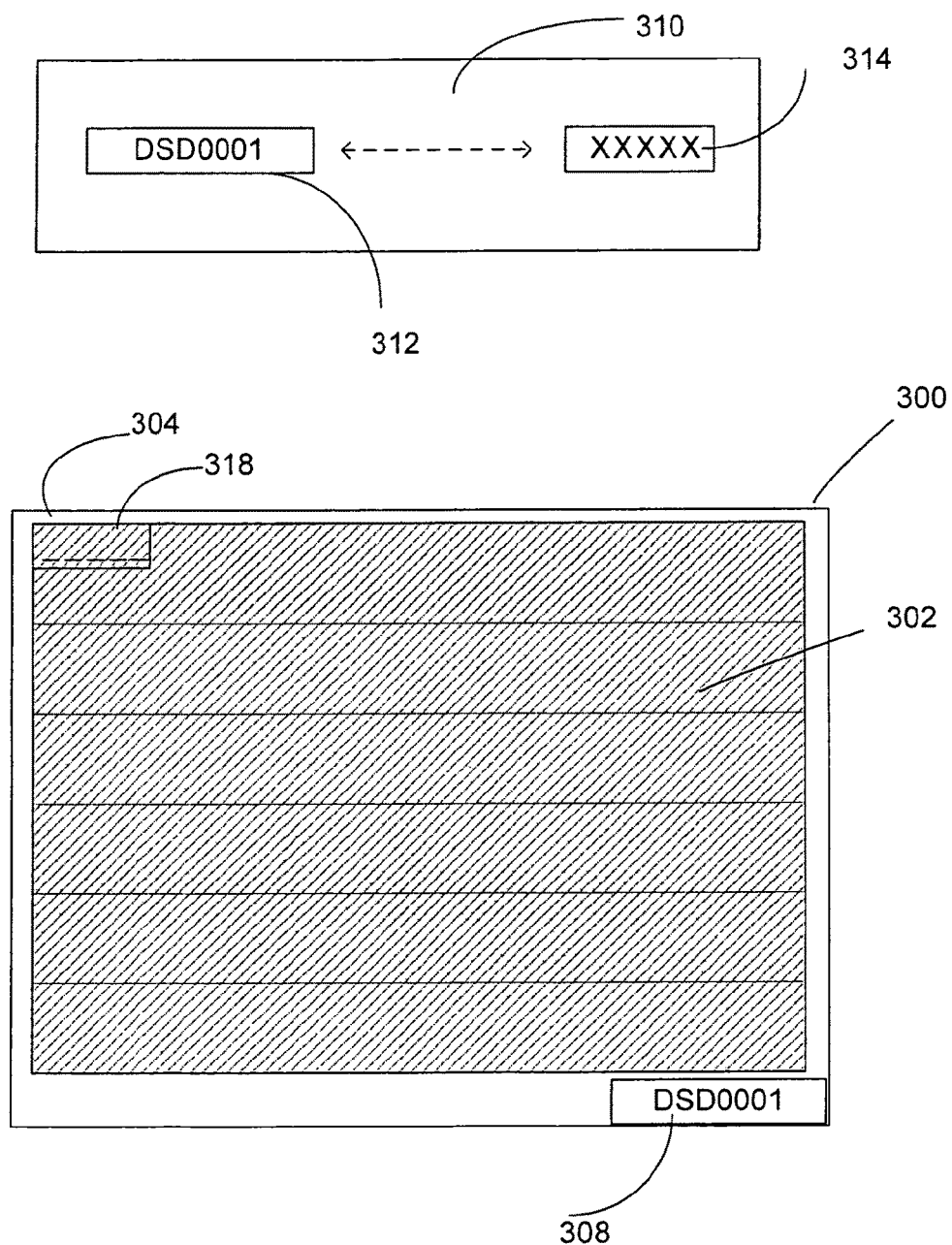
FIG. 12 illustrates a data storage device with degraded read-support information.

FIG. 12 depicts data storage device 300 following degradation of second data portion 304. Stored data of interest 302 is retained, but read-support information is fully degraded (degraded read-support information is indicated by reference number 318). A backup copy of read-support information 314 is stored in data storage location 310 and associated with data storage device 300 by means of data storage device identification code 312 stored in data storage location 310. Following deactivation (e.g., by degradation of second data portion 304), data storage device 300 may be reactivated by retrieving read-support information 314 from data storage location 310 according to a method as depicted in FIGS. 8 and 9.

Figure 13:
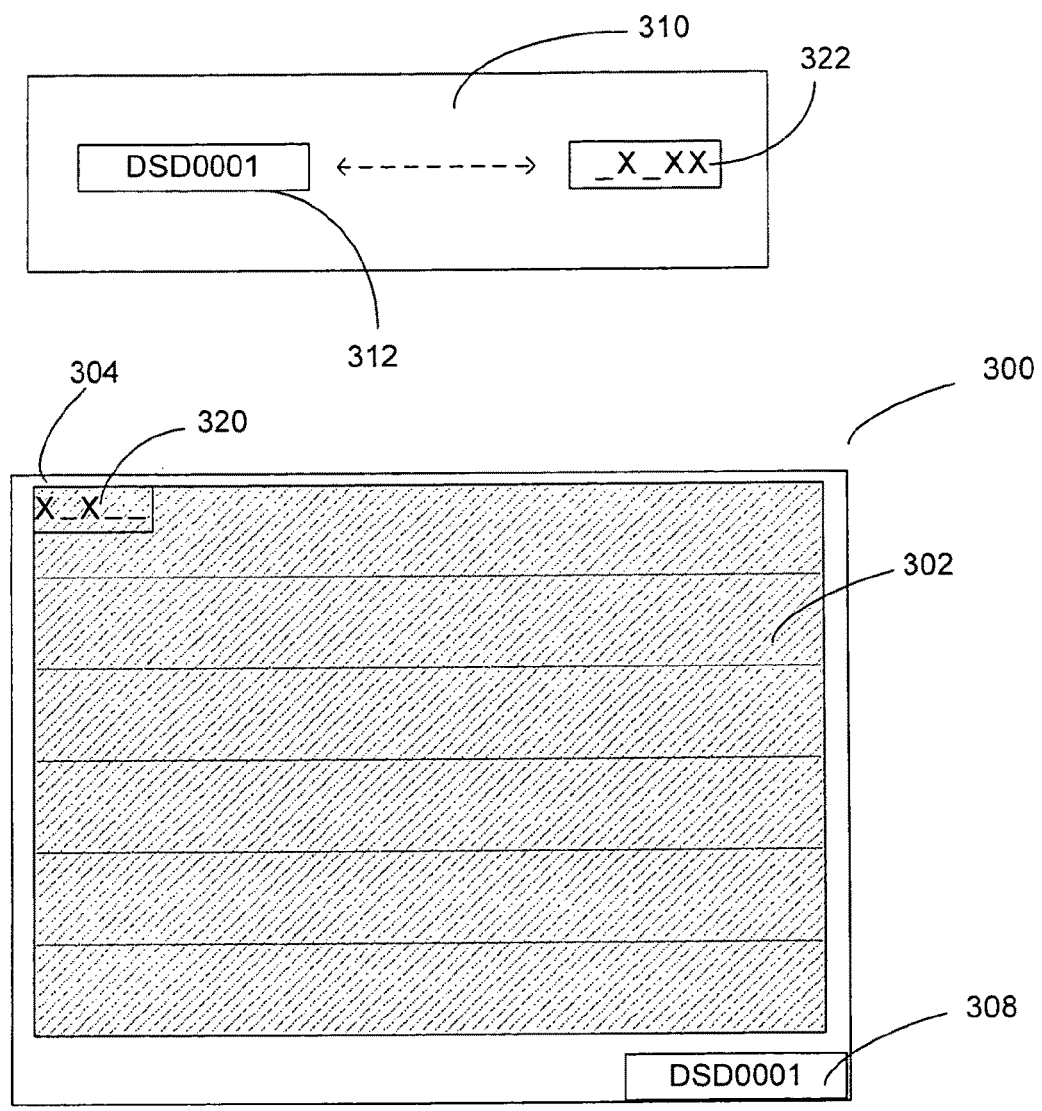
FIG. 13 illustrates a data storage device with partially degraded read-support information.

In some embodiments, as illustrated in FIG. 13, override code 322 may include a portion of the read-support information from second data portion 304. FIG. 13 depicts data storage device 300 as shown in FIG. 11 following a degradation process that left partial read-support information 320 in second data portion 304. Data storage location 310 includes data storage device identification code 312 which matches data storage device identification code 308 on data storage device 300, as before. Data storage location 310 includes override code 322 that includes a portion of read-support information. For example, the portion of the read-support information may supplement information that can be read from the data storage device to enable reading of data of interest from the data storage device. Alternatively, the original read-support information may include redundancies such that an override code that includes only a portion of the read-support information may contain sufficient information to enable reading of data of interest.

Figure 14:
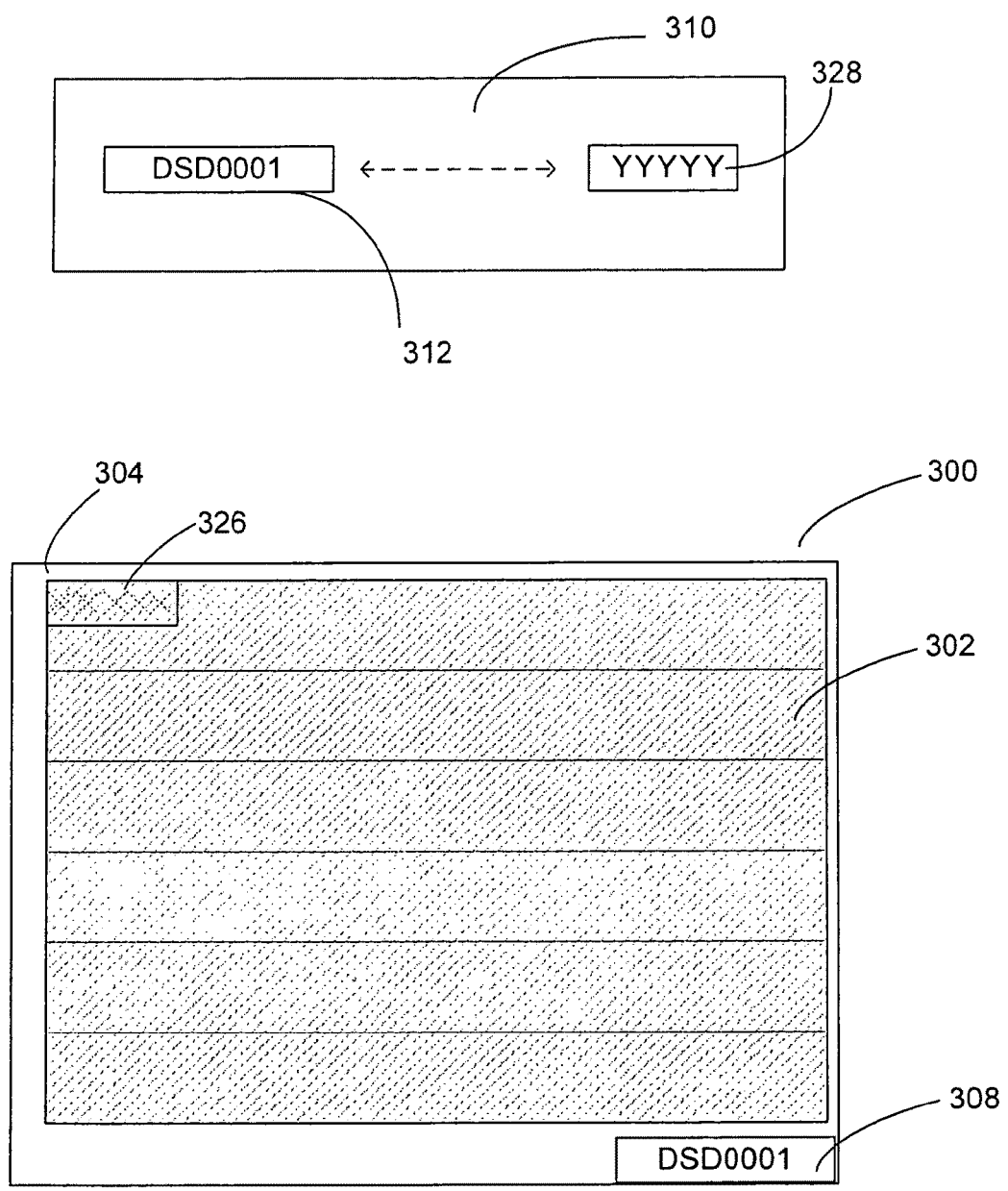
FIG. 14 illustrates a data storage device with partially degraded read-support information.

As illustrated in FIG. 14, in some embodiments data storage location 310 may include override code 328 that includes an analog of the degraded read-support information 326, which may differ from the read-support information that was originally stored in second data portion 304 on the data storage device 300 in some aspect, but which is functionally equivalent to the read-support information with respect to enabling reading of data of interest. The copy or analog of the read-support information 328 may be associated with the memory device 300 through the use of device identification codes 308 and 312. The copy or analog of the read-support information may be functionally analogous to the read-support information. In some embodiments, as depicted in FIG. 14, the analog may be functionally equivalent but different from the read-support information. In some embodiments, the copy or analog of the read-support information may include a full copy of the read-support information, while in other embodiments the copy or analog of the read-support information may include a partial copy of the read-support information.

Figure 15A:
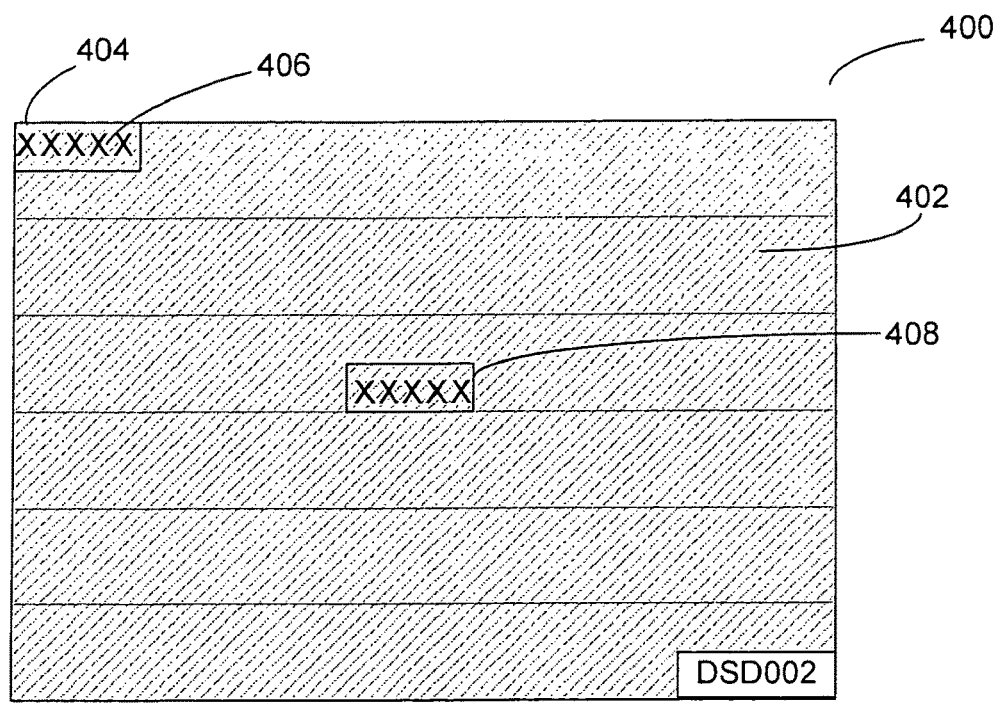
FIG. 15A illustrates a data storage device including primary and secondary read-support information.
Figure 15B:
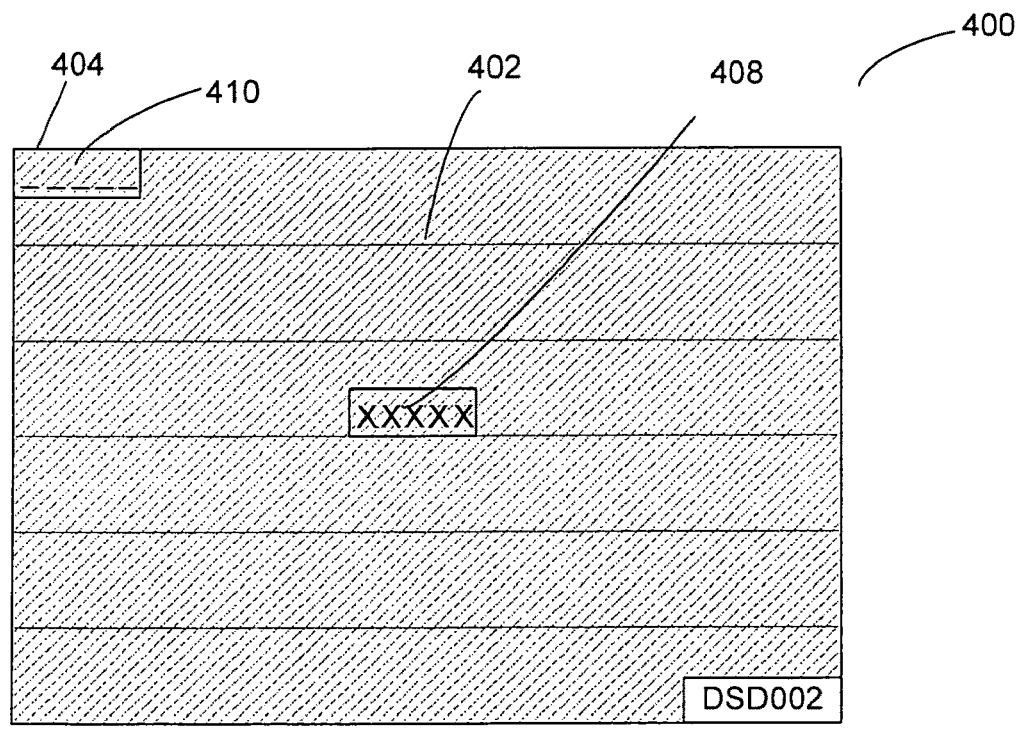
FIG. 15B illustrates the device of FIG. 15A following degradation of the primary read-support information.

As shown in FIGS. 15A and 15B and discussed previously in connection with FIG. 8, in some embodiments, a backup copy 408 of read-support information 406 may be stored in a secondary location on the data storage or memory device 400. FIG. 15A depicts data storage device 400 prior to deactivation, in which data of interest is stored in region 402 and read-support information 406 is stored in degradable second data portion 404. Backup copy 408 of read-support information 406 is stored in a secondary location in data storage device 400, e.g., in region 402. Backup copy 408 may be read by special purpose software, discussed in connection with FIG. 8. A method of reactivating the device may then include obtaining the backup copy 408 of the read-support information by reading the backup copy 408 from a secondary location on the memory device 400 as shown in FIG. 15B. The backup copy of the read-support information may contain complete information necessary for reading the data of interest, or it may be a subset of information necessary for reading the data of interest. In some cases, the backup copy may be stored in the secondary location of the memory device in encoded or encrypted form. For example, as shown in data storage device 450 in FIG. 16, the backup copy 458 of read-support info 456 stored in location 454 may be dispersed among the data of interest 452. Such dispersed read-support information may be distributed so that it can be retrieved only with the use of special-purpose software (or firmware or hardware; operation performed by software can generally be performed in firmware or hardware as well, and vice versa). Special purpose software may include decoding or decryption software, lookup table software, or, certain signal-processing software.

Figure 17:
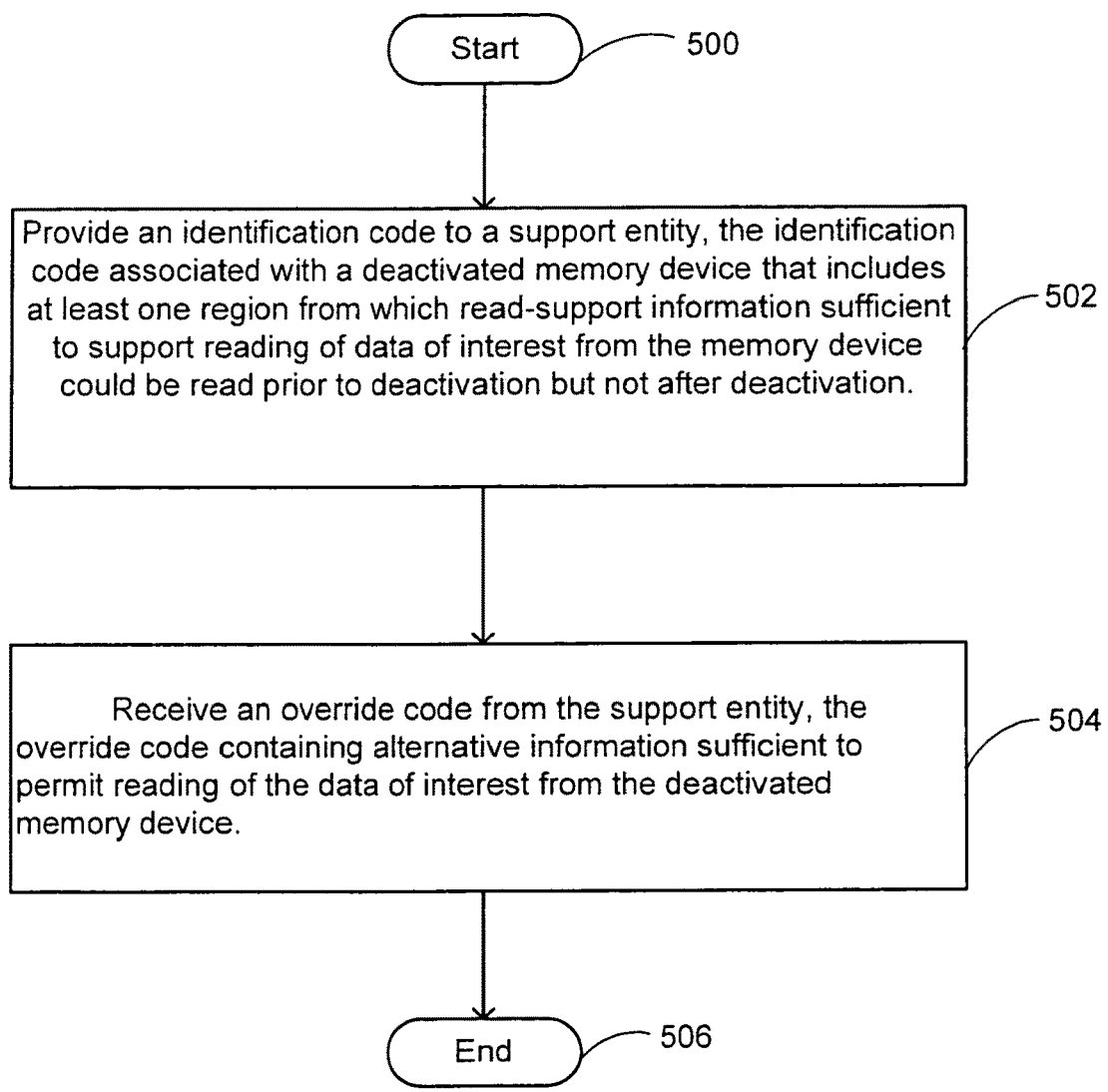
FIG. 17 is a flow diagram of a method of retrieving information from a deactivated memory device.

As outlined in FIG. 17, a method of retrieving information from a deactivated memory device may include providing an identification code to a support entity the identification code associated with a deactivated memory device that includes at least one region from which read-support information sufficient to support reading of data of interest from the memory device could be read prior to deactivation but not after deactivation at step 502 and receiving an override code from the support entity, the override code containing alternative information sufficient to permit reading of the data of interest from the deactivated memory device, at step 504.

Figure 18:
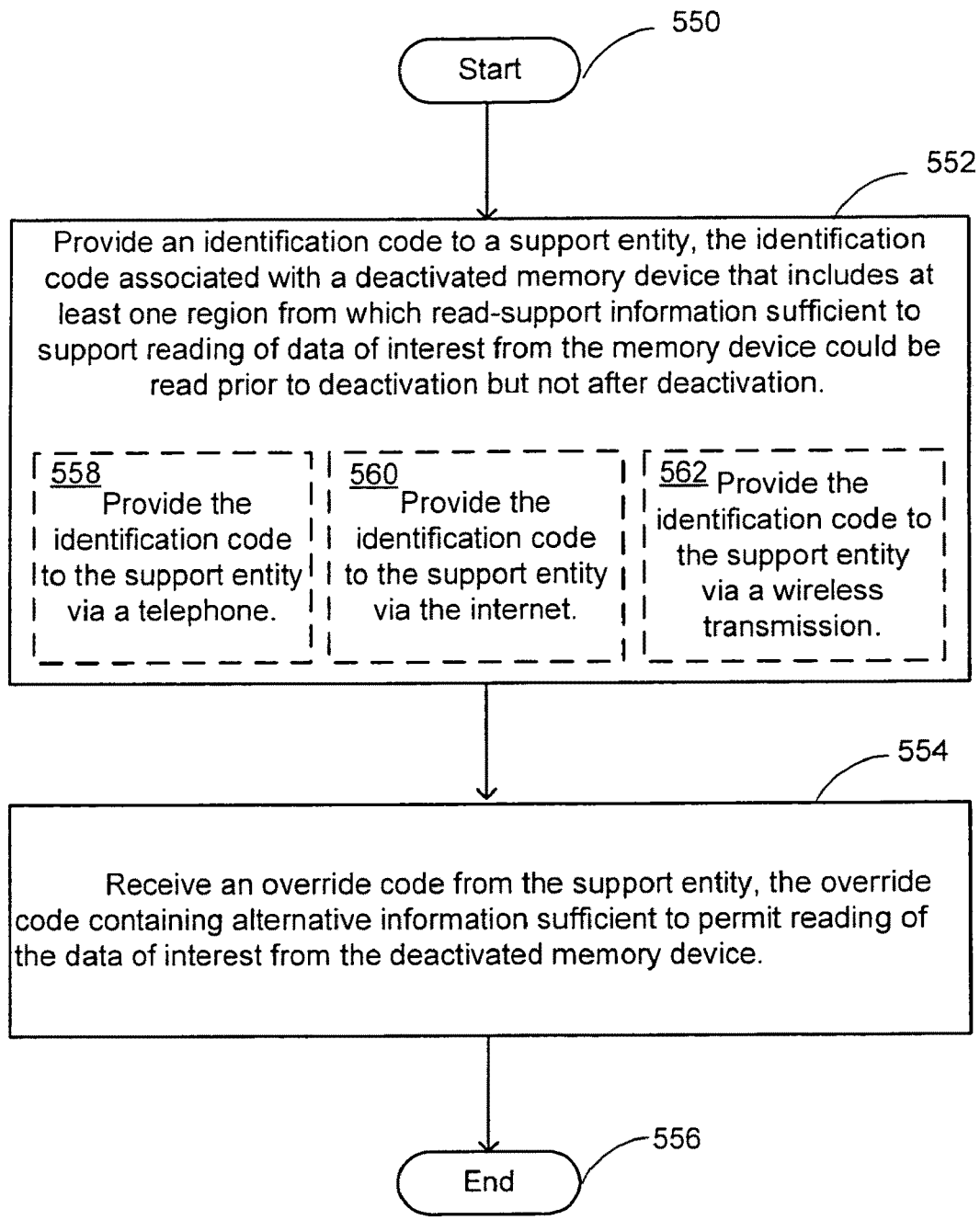
FIG. 18 depicts a further exemplary method of retrieving information from a deactivated memory device.

FIG. 18 further elaborates on the method of retrieving information from a deactivated memory device outlined in FIG. 17. Step 552 includes providing an identification code to a support entity, the identification code associated with a deactivated memory device that includes at least one region from which read-support information sufficient to support reading of data of interest from the memory device could be read prior to deactivation but not after deactivation. Three alternative methods of providing the identification code are depicted. Step 558 includes providing the identification to the support entity via a telephone, step 560 includes providing the identification code to the support entity via the internet, and step 562 includes providing the identification code to the support entity via a wireless transmission. Step 554 includes receiving an override code from the support entity, the override code containing alternative information sufficient to permit reading of the data of interest from the deactivated memory device.

Figure 19:
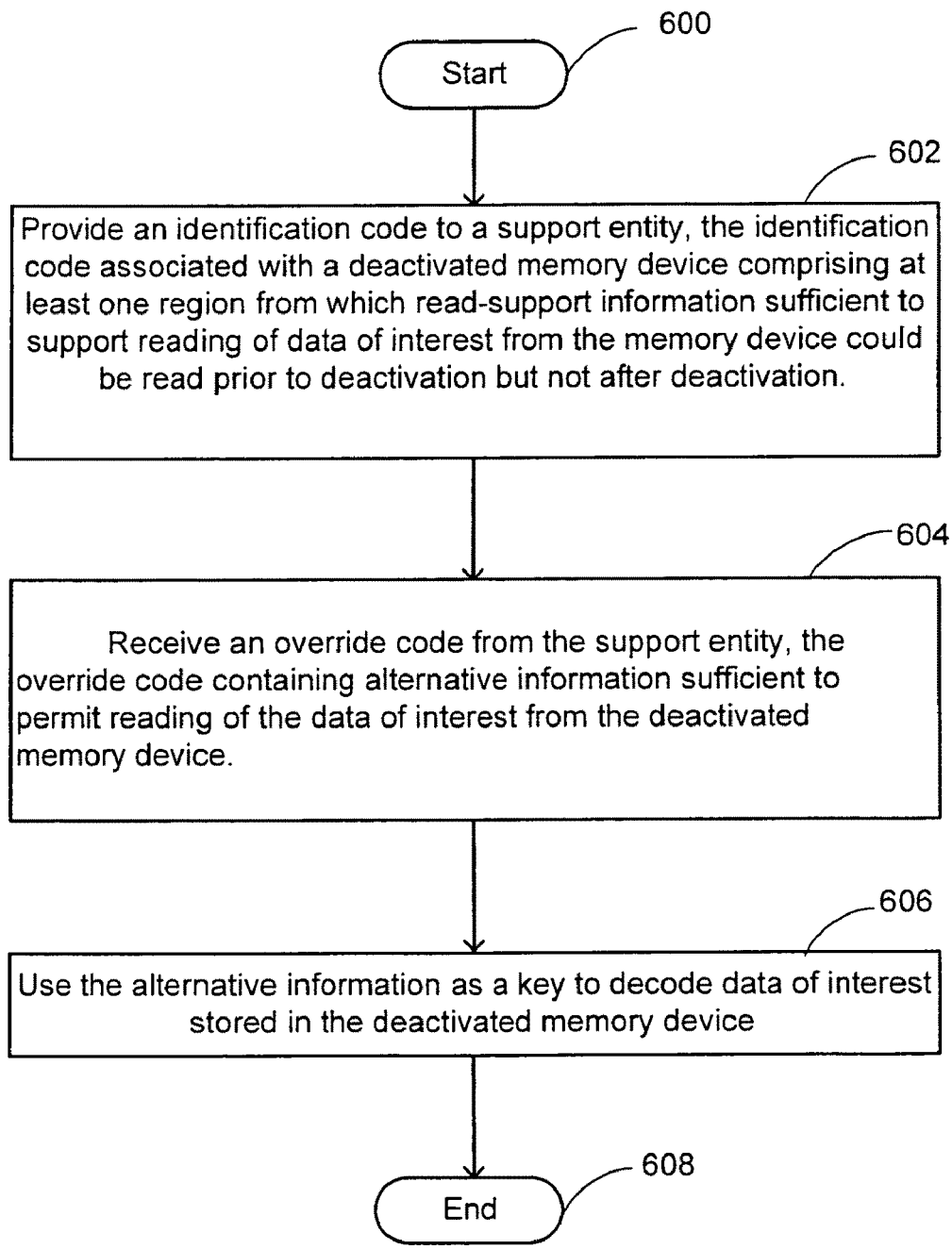
FIG. 19 depicts another exemplary method of retrieving information from a deactivated memory device.

In another embodiment of a method of retrieving information from a deactivated memory device, as shown in FIG. 19, at 602, an identification code is provided to a support entity, the identification code associated with a deactivated memory device comprising at least one region from which read-support information sufficient to support reading of data of interest from the memory device could be read prior to deactivation but not after deactivation. At step 604, an override code is received from the support entity, the override code containing alternative information sufficient to permit reading of the data of interest from the deactivated memory device. At step 606, the alternative information is used as a key to decode data of interest stored in the deactivated memory device.

Figure 20:
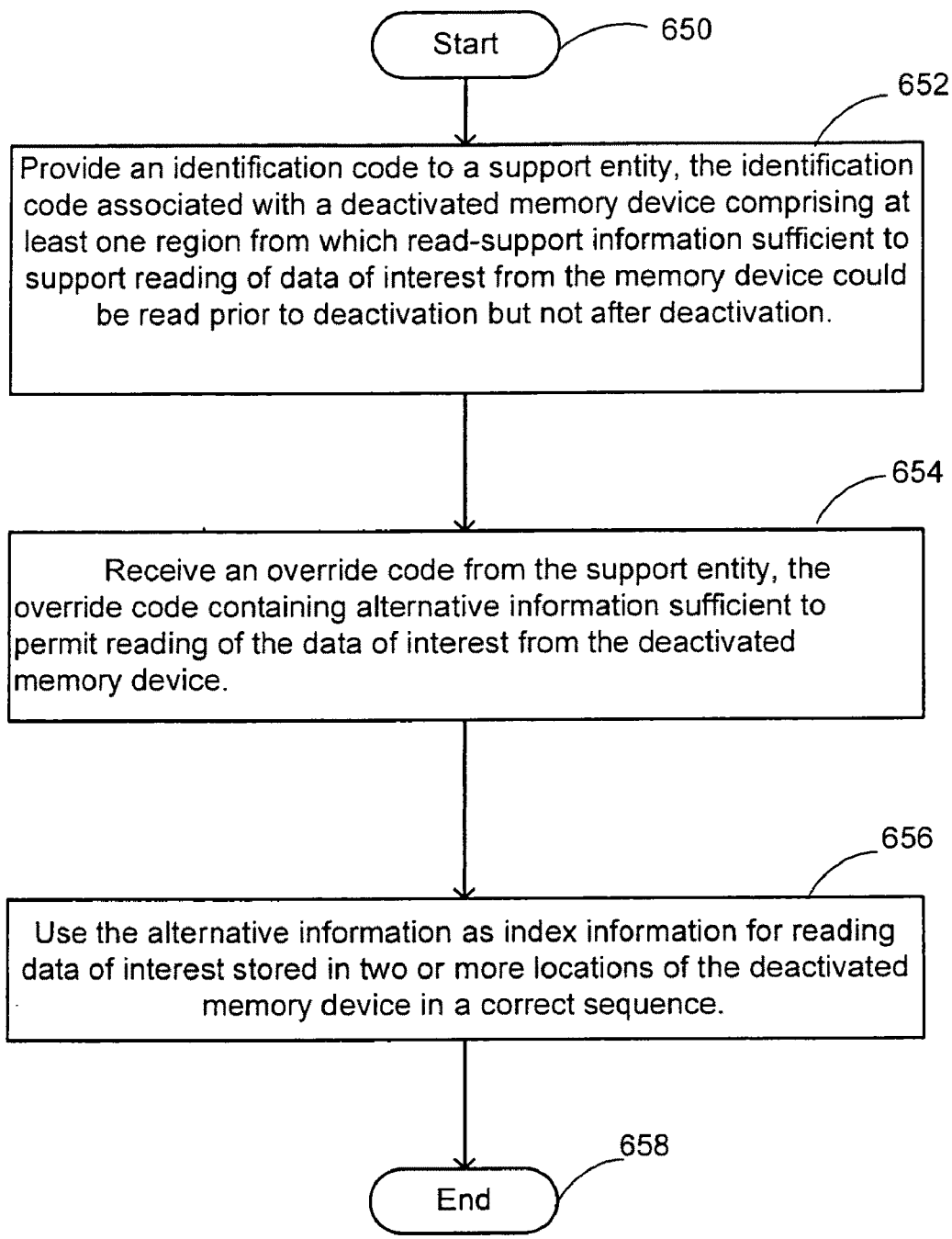
FIG. 20 depicts another exemplary method of retrieving information from a deactivated memory device.

FIG. 20 depicts a further variant in which at step 652, an identification code is provided to a support entity, the identification code associated with a deactivated memory device comprising at least one region from which read-support information sufficient to support reading of data of interest from the memory device could be read prior to deactivation but not after deactivation. At step 654, an override code is received from the support entity, the override code containing alternative information sufficient to permit reading of the data of interest from the deactivated memory device. At step 656, alternative information is used as index information for reading data of interest stored in two or more locations of the deactivated memory device in a correct sequence.

Figure 21:
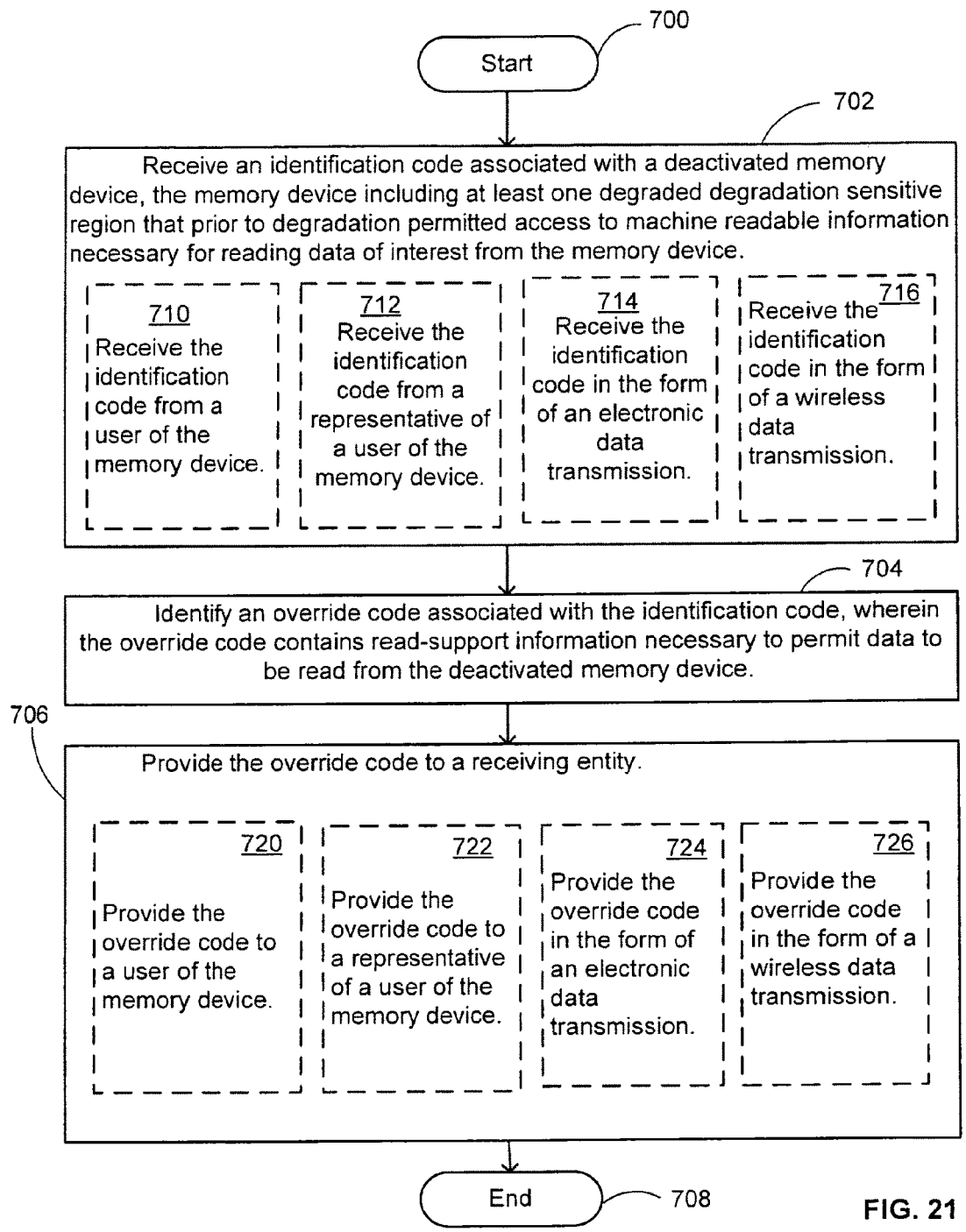
FIG. 21 depicts an embodiment of a method of reactivating a deactivated memory device, including variations thereof.

FIG. 21 depicts a further method of reactivating a deactivated memory device, which includes receiving an identification code associated with a deactivated memory device, the memory device including at least one degraded degradation-sensitive region that prior to degradation permitted access to machine readable information necessary for reading data of interest from the memory device, as shown at step 702, identifying an override code associated with the identification code, wherein the override code contains read-support information necessary to permit data to be read from the deactivated memory device, as shown at step 704, and providing the override code to a receiving entity at step 706. Step 702, which includes receiving an identification code associated with a deactivated memory device may be performed by a number of different methods, several of which are indicated in FIG. 21. Receiving an identification code may include receiving the identification code from a user of the memory device at step 710. Alternatively, the method may include receiving the identification code from a representative of a user of the memory device at step 712. For example, if the method is performed at a repair shop, the user of the device may present the device and the identification code information to an employee of the repair shop, who may carry out the steps of the reactivation method. As a further alternative, the identification code may be received in the form of an electronic data transmission as shown at 714, or in the form of a wireless data transmission, as shown at 716. The step of providing the override code to a receiving entity is also subject to variation: the method may include providing the override code to a user of the memory device as indicated at 720, or a representative of a user of the memory device as indicated at 722. The method may include providing the override code in the form of an electronic data transmission at step 724 or in the form of a wireless data transmission at step 726. Electronic data transmissions may include data sent in the form of emails or attachments thereto, or various electronic data transfer protocols as are known or may be developed by those of skill in the art. The method of FIG. 21 may be performed in connection with a deactivated memory device in which the degradation-sensitive region has been degraded by exposure to a degradation-inducing influence to render the data of interest inaccessible to the user. The override code may include at least a portion of a decryption key or at least a portion of an index table. The override code may include complete read-support information sufficient for reading the data of interest from the memory device, or it may include partial read-support information necessary for reading the data of interest from the memory device. For example, the partial read-support information in the override code may be sufficient for reading the data of interest from the memory device when used in combination with partial read-support information stored on the memory device.

Figure 22:
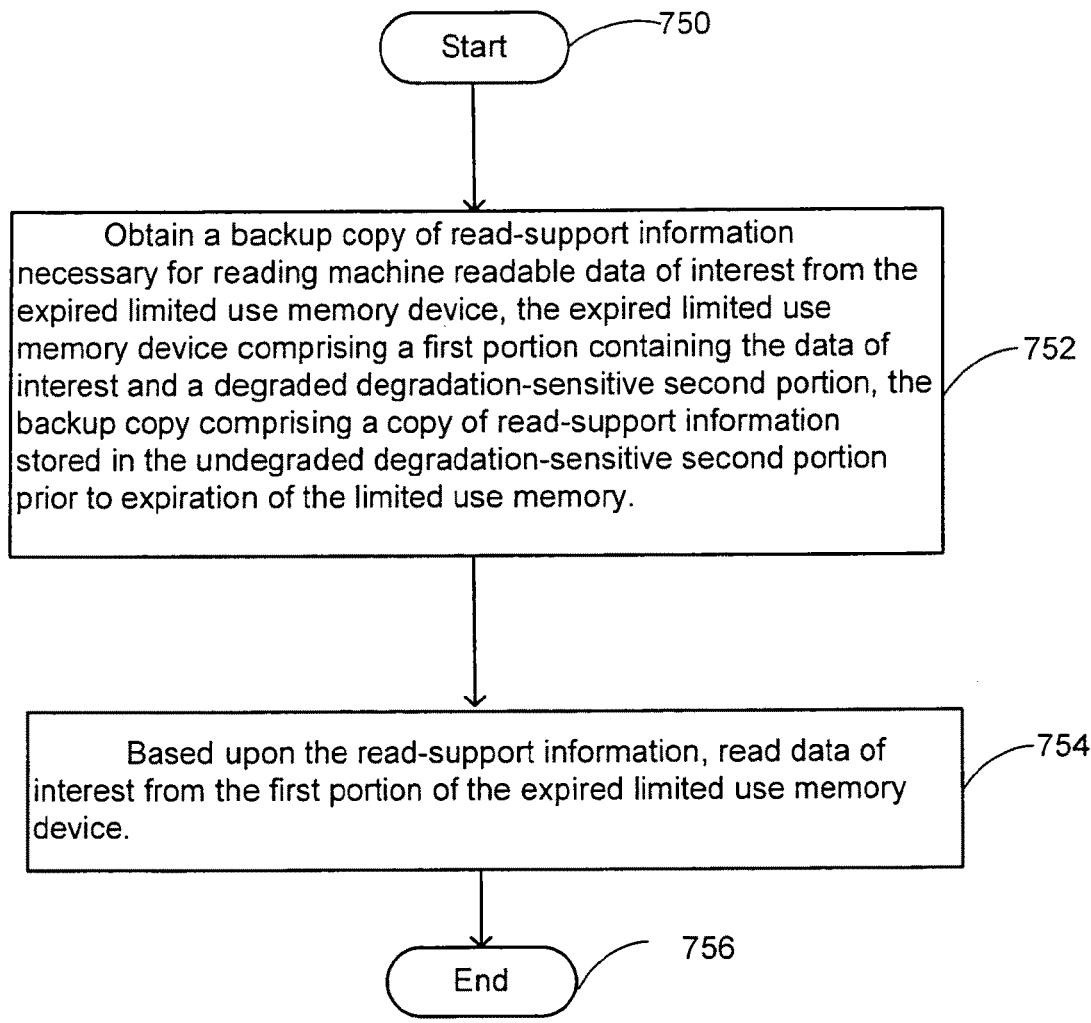
FIG. 22 is a flow diagram of a method of retrieving data from an expired limited use memory device.

According to certain embodiments, as outlined in FIG. 22, a method of retrieving data from an expired limited use memory device may include obtaining a backup copy of read-support information necessary for reading machine readable data of interest from the expired limited use memory device, as shown at step 752, where the expired limited use memory device comprises a first portion containing the data of interest and a degraded degradation-sensitive second portion, and the backup copy comprises a copy of read-support information stored in the undegraded degradation-sensitive second portion prior to expiration of the limited use memory. At step 754, based upon the read-support information, data of interest may be read from the first portion of the expired limited use memory device.

Figure 23:
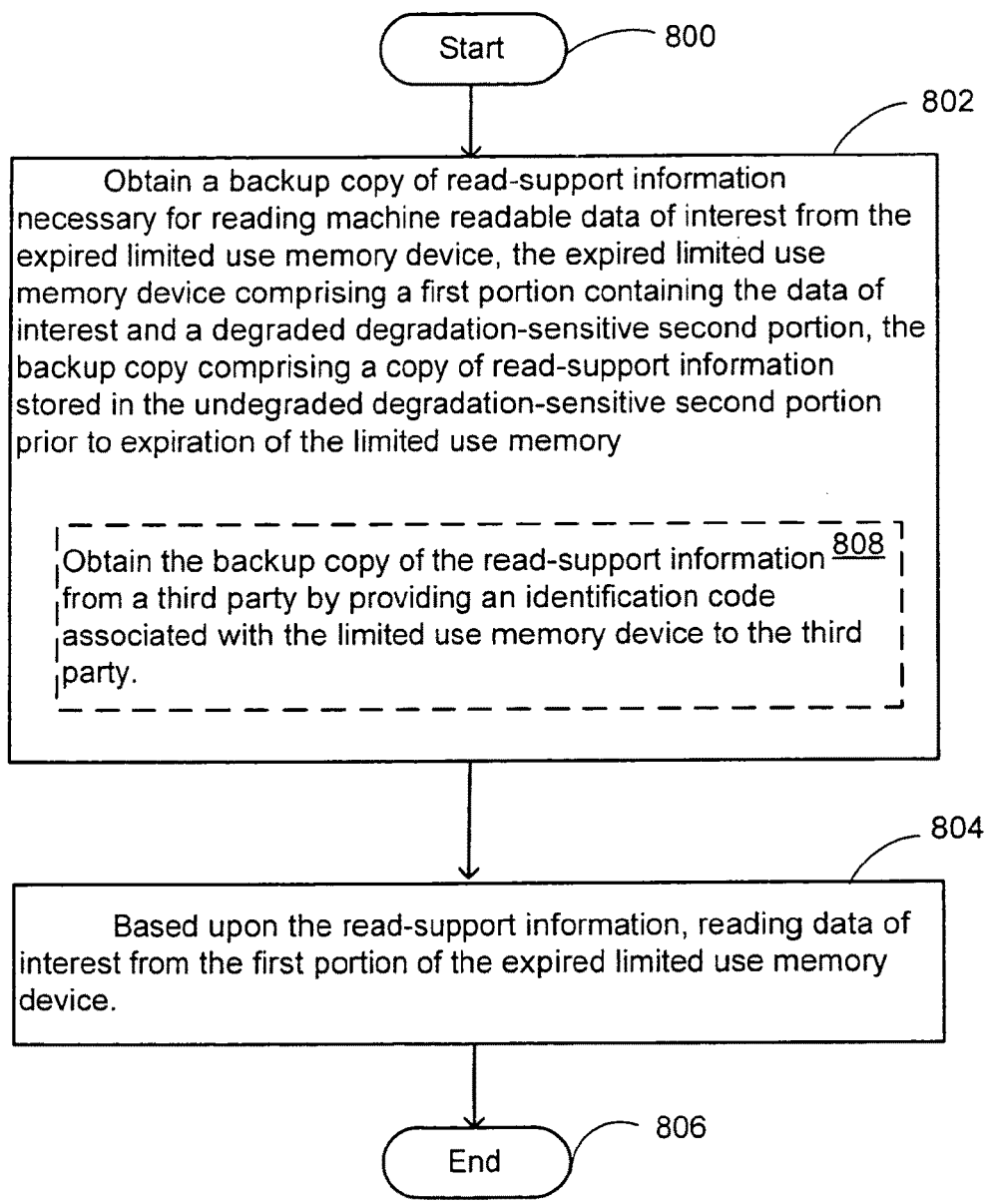
FIG. 23 depicts a further embodiment of a method of retrieving data from an expired limited use memory device.

FIG. 23 further details the method of FIG. 22, which includes obtaining a backup copy of read-support information necessary for reading machine readable data of interest from the expired limited use memory device at step 802, the expired limited use memory device comprising a first portion containing the data of interest and a degraded degradation-sensitive second portion, the backup copy comprising a copy of read-support information stored in the undegraded degradation-sensitive second portion prior to expiration of the limited use memory. As shown at 808, the method further may include obtaining the backup copy of the read-support information from a third party by providing an identification code associated with the limited use memory device to the third party. The third party may be a support entity, for example, that uses the identification code to determine the read-support information that is obtained in step 802. At step 804, based upon the read-support information, data of interest may be read from the first portion of the expired limited use memory device.

Figure 24:
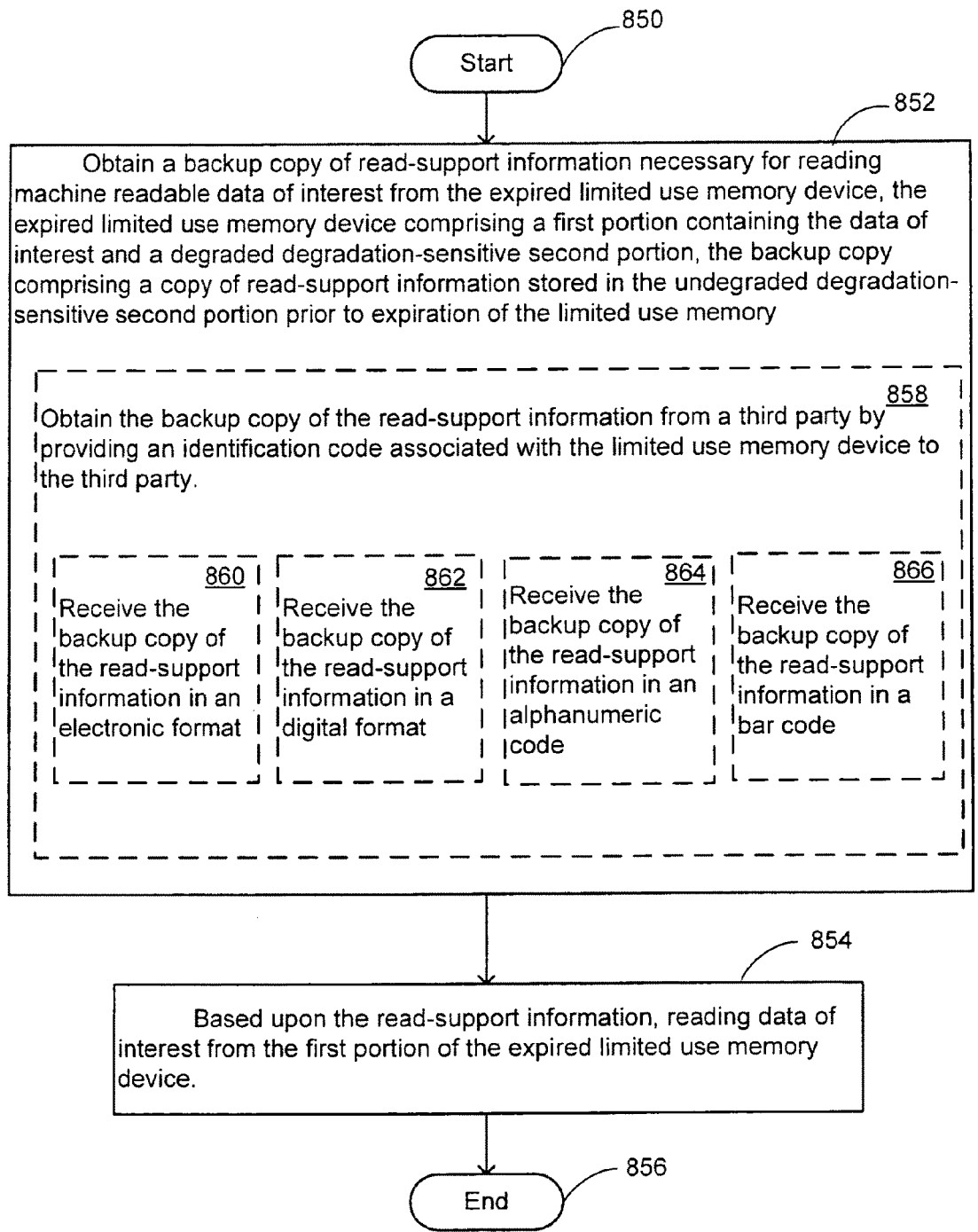
FIG. 24 depicts another embodiment of a method of retrieving data from an expired limited use memory device.

FIG. 24 further elaborates on the method of FIG. 23. A backup copy of read-support information necessary for reading machine readable data of interest from the expired limited use memory device is obtained at step 852. The expired limited use memory device comprises a first portion containing the data of interest and a degraded degradation-sensitive second portion, and the backup copy comprises a copy of read-support information stored in the undegraded degradation-sensitive second portion prior to expiration of the limited use memory. At step 854, based upon the read-support information, data of interest may be read from the first portion of the expired limited use memory device. As shown at 858, the method may include obtaining the backup copy of the read-support information from a third party by providing an identification code associated with the limited use memory device to the third party. This may involve, for example, receiving the backup copy of the read-support information in an electronic format, as indicated at 860. In some embodiments, obtaining the backup copy of the read-support information may include receiving the backup copy of the read-support information in a digital format, as indicated at 862. In other embodiments, the method may include receiving the backup copy of the read-support information in the form of an alphanumeric code, as indicated at step 864, or a bar code, as indicated at step 866.

Figure 25:
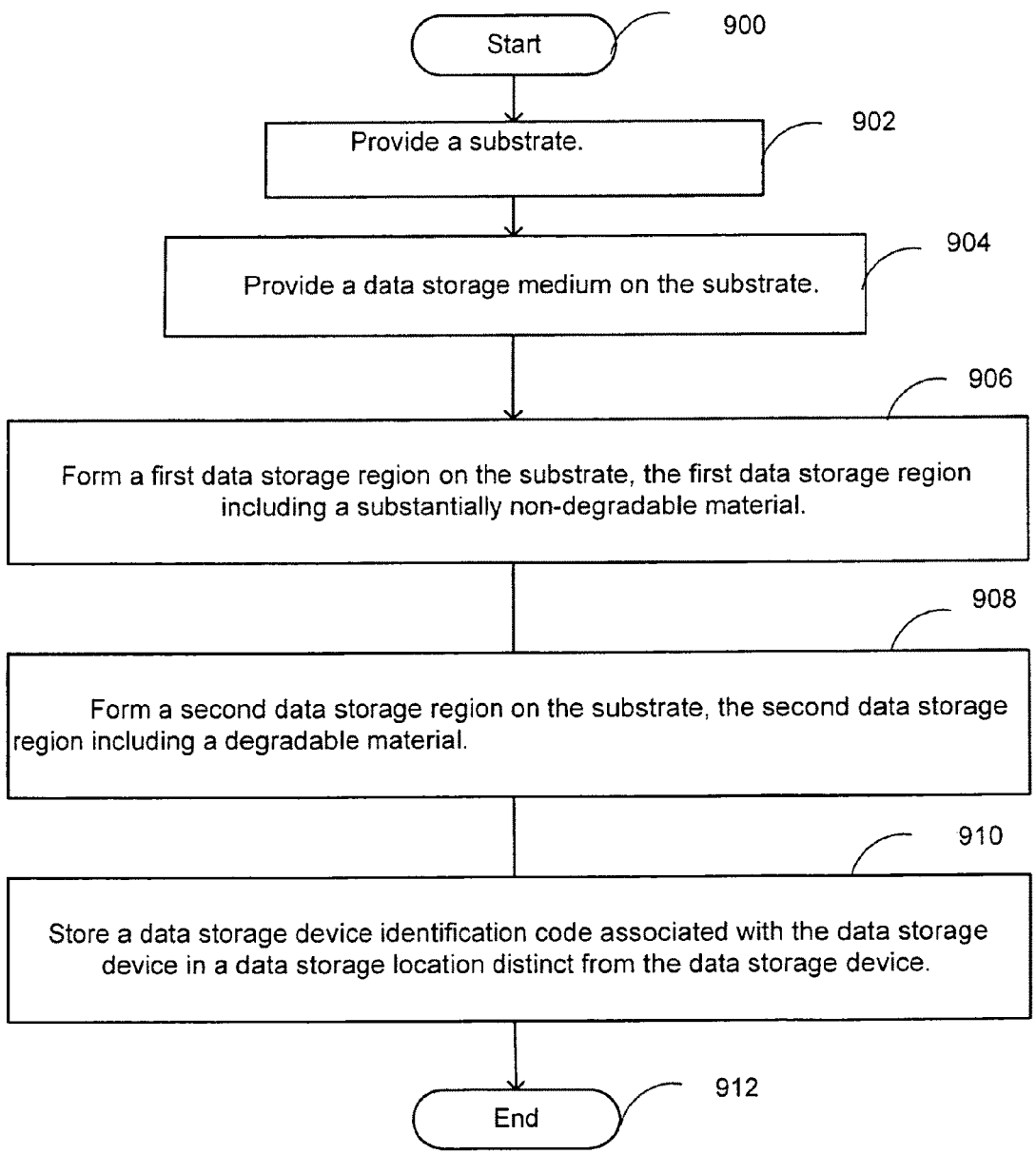
FIG. 25 is a flow diagram of an embodiment of a method of manufacturing a limited use memory device.

According to certain embodiments, as shown in FIG. 25, a method of manufacturing a limited use memory device may include providing a substrate (step 902); providing a data storage medium on the substrate (step 904); forming a first data storage region on the substrate, the first data storage region including a substantially non-degradable material (step 906); forming a second data storage region on the substrate, the second data storage region including a degradable material (step 908); and storing a data storage device identification code associated with the data storage device in a data storage location distinct from the data storage device (step 910). The degradable material that is included in the second data storage region may include a degradable data storage medium, or it may include a degradable portion of the substrate.

Figure 26:
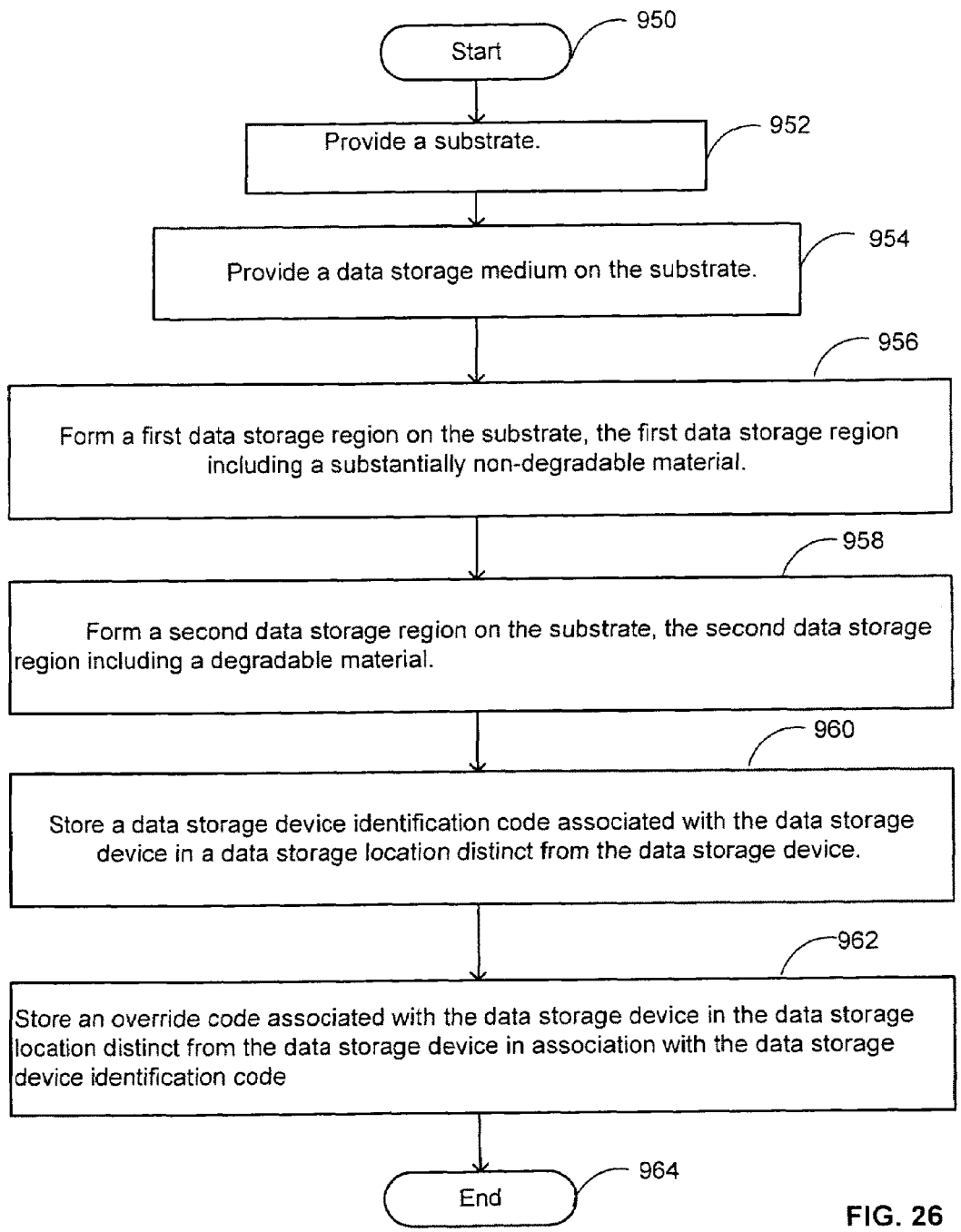
FIG. 26 is a flow diagram of a further embodiment of a method of manufacturing a limited use memory device.

The method depicted in FIG. 25 may be expanded as shown in FIG. 26. Steps 952-960 include providing a substrate (step 952); providing a data storage medium on the substrate (step 954); forming a first data storage region on the substrate, the first data storage region including a substantially non-degradable material (step 956); forming a second data storage region on the substrate, the second data storage region including a degradable material (step 958); and storing a data storage device identification code associated with the data storage device in a data storage location distinct from the data storage device (step 960). The method illustrated in FIG. 26 also includes storing an override code associated with the data storage device in the data storage location distinct from the data storage device in association with the data storage device identification code at step 962.

Figure 27:
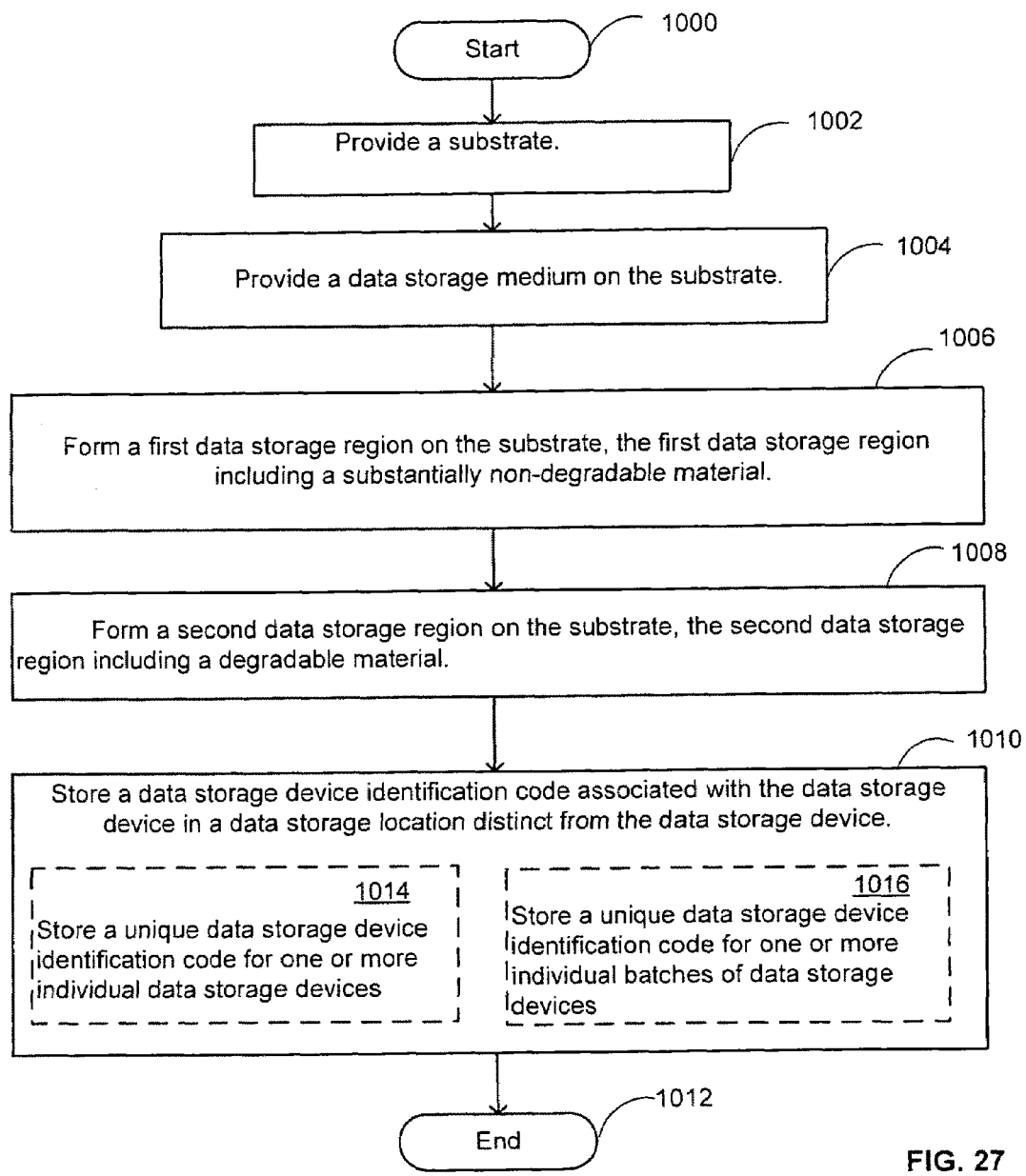
FIG. 27 is a flow diagram of a further embodiment of a method of manufacturing a limited use memory device.

FIG. 27 depicts a further elaboration on the method of FIG. 25, including the steps of providing a substrate (step 1002); providing a data storage medium on the substrate (step 1004); forming a first data storage region on the substrate, the first data storage region including a substantially non-degradable material (step 1006); forming a second data storage region on the substrate, the second data storage region including a degradable material (step 1008); and storing a data storage device identification code associated with the data storage device in a data storage location distinct from the data storage device (step 1010). The method may include storing a unique data storage device identification code for one or more individual data storage devices (step 1014), or it may include storing a unique data storage device identification code for one or more individual batches of data storage devices (step 1016).

Figure 28:
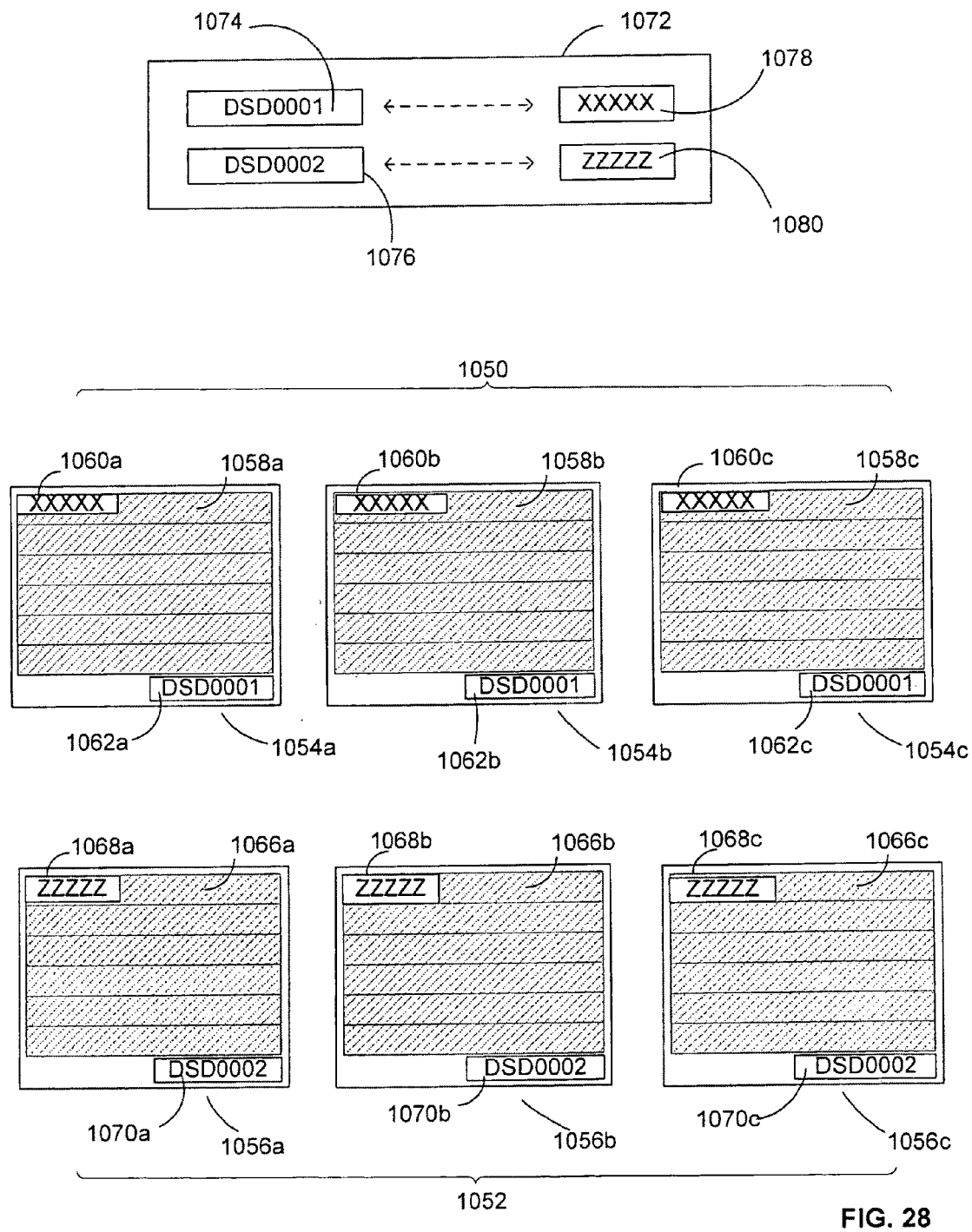
FIG. 28 depicts an example of multiple batches of data storage devices and associated data storage device identification codes.

Storing a unique data storage device identification code for one or more individual data storage devices may be used when each data storage device has a unique identification code. Storing unique data storage device identification code for one or more individual batches of data storage devices may be used in cases where data storage devices within a batch of data storage devices (e.g., a batch being all data storage devices manufactured on one day, all data storage devices of a particular type, or any other selected grouping of data storage devices) have the same device identification code, but data storage devices in different batches of data storage devices have different device identification codes. Storing different data storage device identification codes for individual batches as opposed to individual devices may provide a lower level of security, but may be sufficient for many applications. FIG. 28 illustrates a first batch 1050 including data storage devices 1054a-1054c and a second batch 1052 including data storage devices 1056a-1056c. Each of data storage devices 1054a-1054c includes data of interest 1058a-1058c, respectively, data storage device identification code 1062a-1062c, respectively, and read-support information 1060a-1060c, respectively. Similarly, in second batch 1052, each of data storage devices 1056a-1056c includes data of interest 1066a-1066c, respectively, data storage device identification code 1070a-1070c, respectively, and read-support information 1068a-1068c, respectively. Data storage devices in first batch 1050 have data storage device identification codes 1062a-1062c each with a value of DSD0001, and corresponding read-support information 1060a-1060c with a value of XXXXX. Data storage devices in second batch 1052 have data storage device identification codes 1070a-1070c each with a value of DSD0002, and corresponding read-support information 1068a-1068c with a value of ZZZZZ. Data storage location 1072, which is a data storage location distinct from the data storage devices (e.g., at a remote location, and/or retained by a third party) includes data storage device identification code 1074 having value DSD0001 associated with override code 1078, containing read-support information of value XXXXX for reading data from data storage devices 1054a-1054c in first batch 1050. Data storage location 1072 also includes data storage device identification code 1076 having value DSD0002 associated with override code 1080, containing read-support information of value ZZZZZ for reading data from data storage devices 1056a-1056c in first batch 1052.

Figure 29:
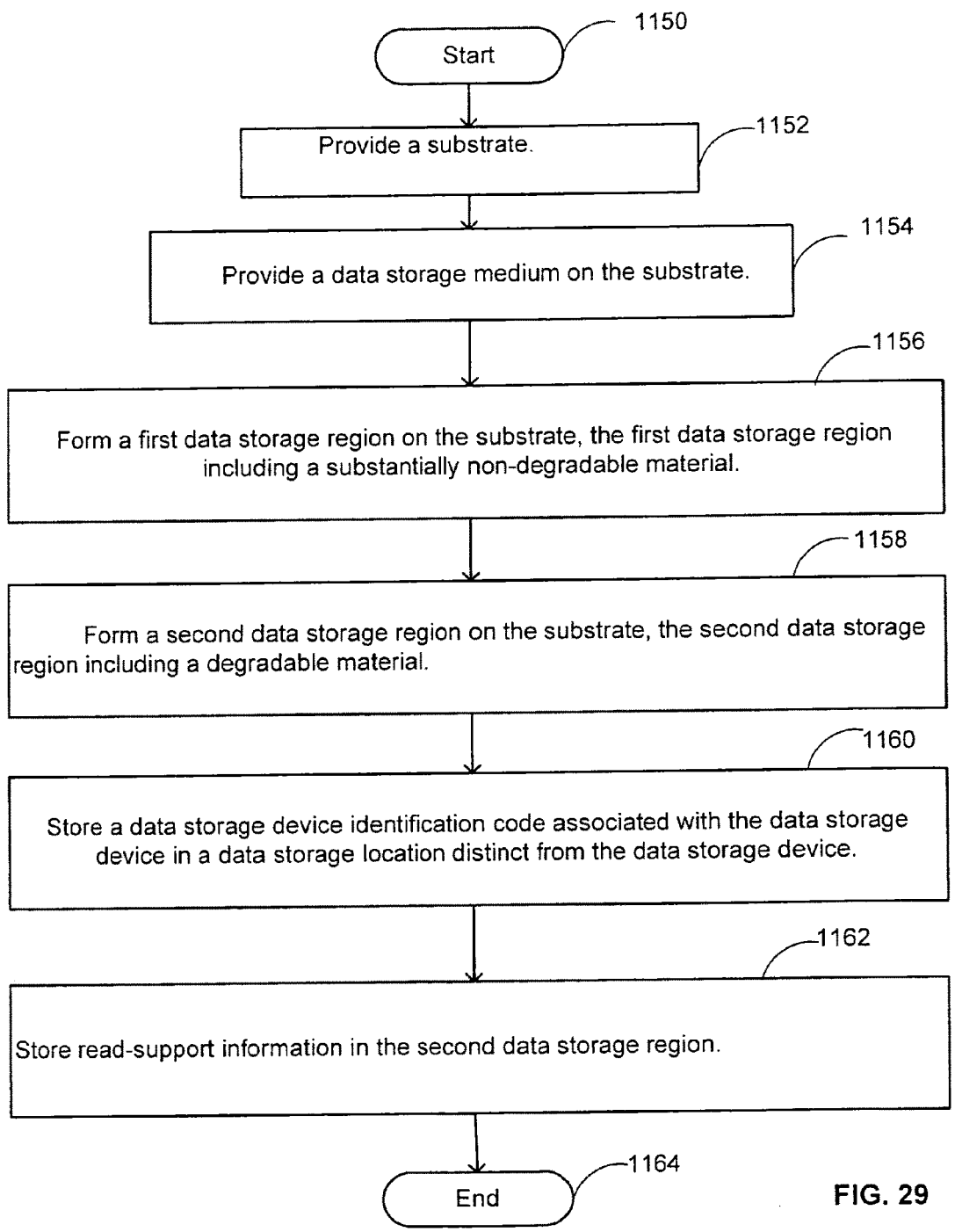
FIG. 29 depicts a further variant of a method of manufacturing a limited use memory device.

FIG. 29 depicts a further variant of the method of FIG. 25, including providing a substrate (step 1152); providing a data storage medium on the substrate (step 1154); forming a first data storage region on the substrate, the first data storage region including a substantially non-degradable material (step 1156); forming a second data storage region on the substrate, the second data storage region including a degradable material (step 1158); and storing a data storage device identification code associated with the data storage device in a data storage location distinct from the data storage device (step 1160). The method includes the additional step of storing read-support information in the second data storage region (step 1162). The method of FIG. 29 may be performed, for example, in situations where the initial manufacture of the data storage device and storage of read-support information on the data storage device are performed by the same party. In some previous embodiments (e.g., as shown in FIG. 25) manufacture of the data storage device may sometimes be performed by a different party than storage of read-support information and/or data on the data storage device.

Figure 30:
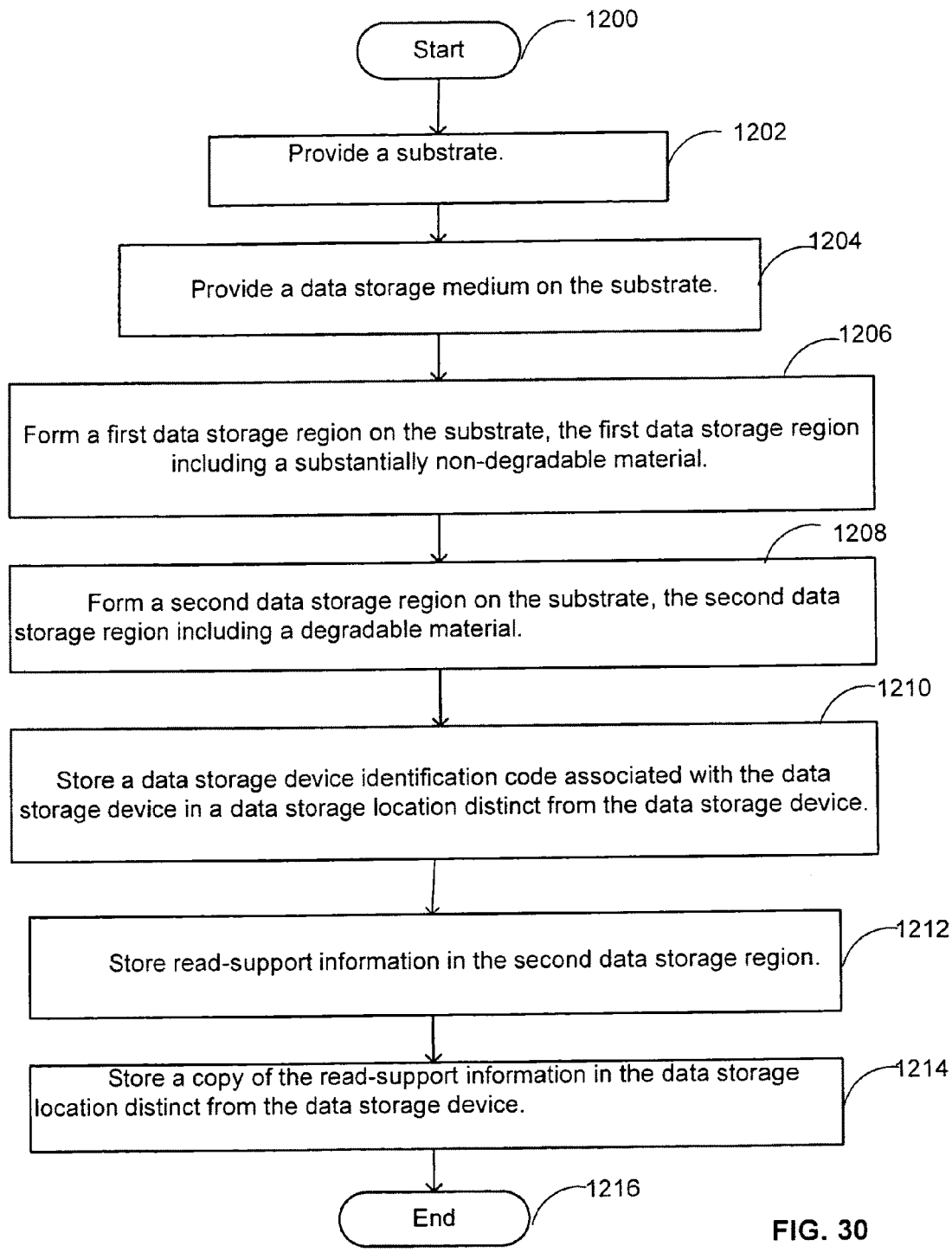
FIG. 30 depicts another variant of a method of manufacturing a limited use memory device.

FIG. 30 depicts a method including steps 1202-1212, which are the same as step 1152-1162 in FIG. 29, with the additional step of storing a copy of the read-support information in the data storage location distinct from the data storage device, as indicated at 1214.

Figure 31:
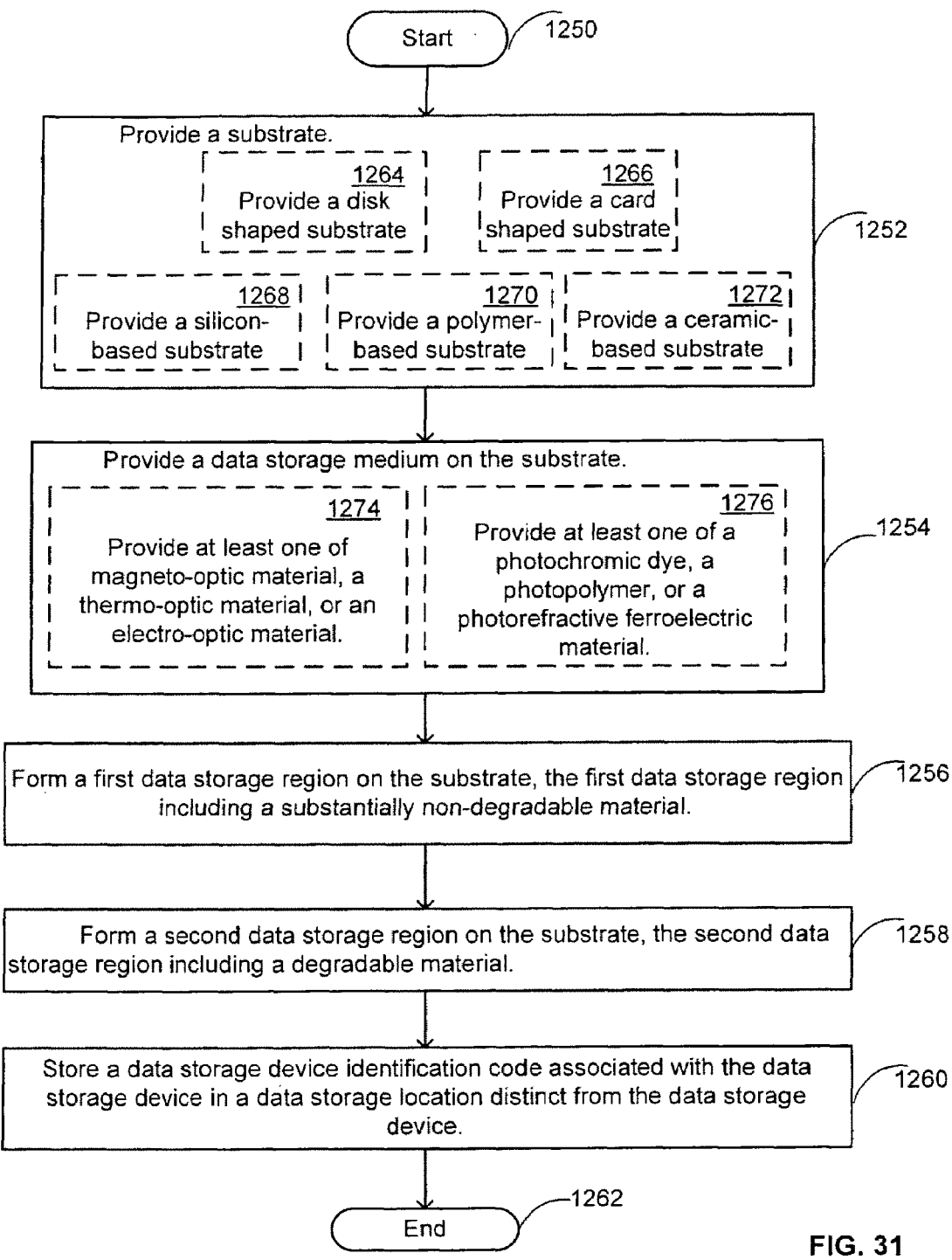
FIG. 31 is a flow diagram of a method of manufacturing a limited use memory device, including variants thereof.

FIG. 31 depicts a further embodiment of a method of manufacturing a data storage device which includes providing a substrate at 1252, providing a data storage medium on the substrate at 1254, forming a first data storage region on the substrate at 1256, where the first data storage region includes a substantially non-degradable material, and forming a second data storage region on the substrate at 1258, where the second data storage region includes a degradable material, and storing a data storage device identification code associated with the data storage device in a data storage location distinct from the data storage device at 1260. Substrates may take various forms and be constructed from various materials. Providing a substrate may include providing a disk shaped substrate (as indicated at 1264) or a card shaped substrate (as indicated at 1266), for example. Providing a substrate may include providing a silicon-based substrate (as indicated at 1268), a polymer-based substrate (as indicated at 1270), or a ceramic-based substrate (as indicated at 1272), for example. Providing a data storage medium may include providing at least one of a magneto-optic material, a thermo-optic material, or an electro-optic material (as indicated at 1274). Providing a data storage medium may include providing at least one of a photochromic dye, a photopolymer, or a photorefractive ferroelectric material (as indicated at 1276).

Figure 32:
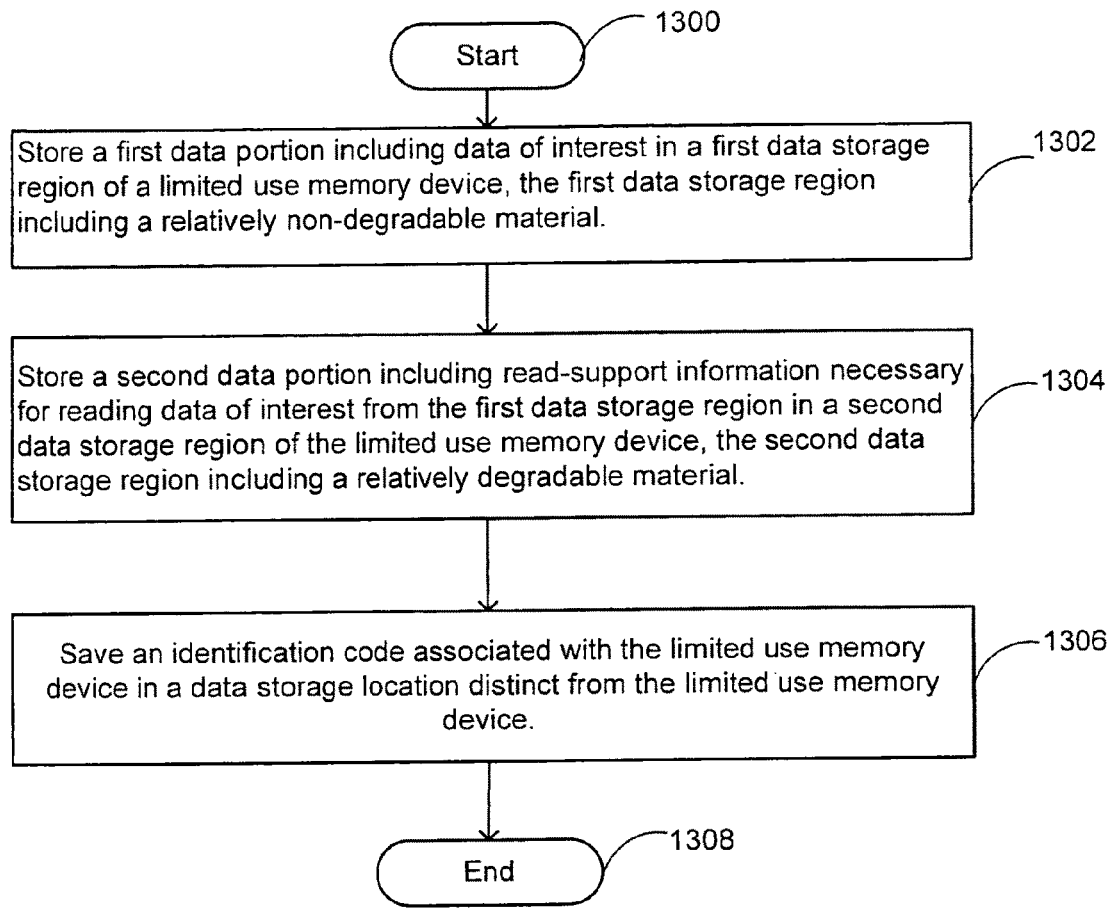
FIG. 32 is a flow diagram of an exemplary method of configuring a limited use memory device.

As shown in FIG. 32, a method of configuring a limited use memory device may include storing a first data portion including data of interest in a first data storage region of a limited use memory device (step 1302), the first data storage region including a relatively non-degradable material; storing a second data portion including read-support information necessary for reading the data of interest from the first data storage region in a second data storage region of the limited use memory device (step 1304), the second data storage region including a relatively degradable material; and saving an identification code associated with the limited use memory device in a data storage location distinct from the limited use memory device (step 1306).

Figure 33:
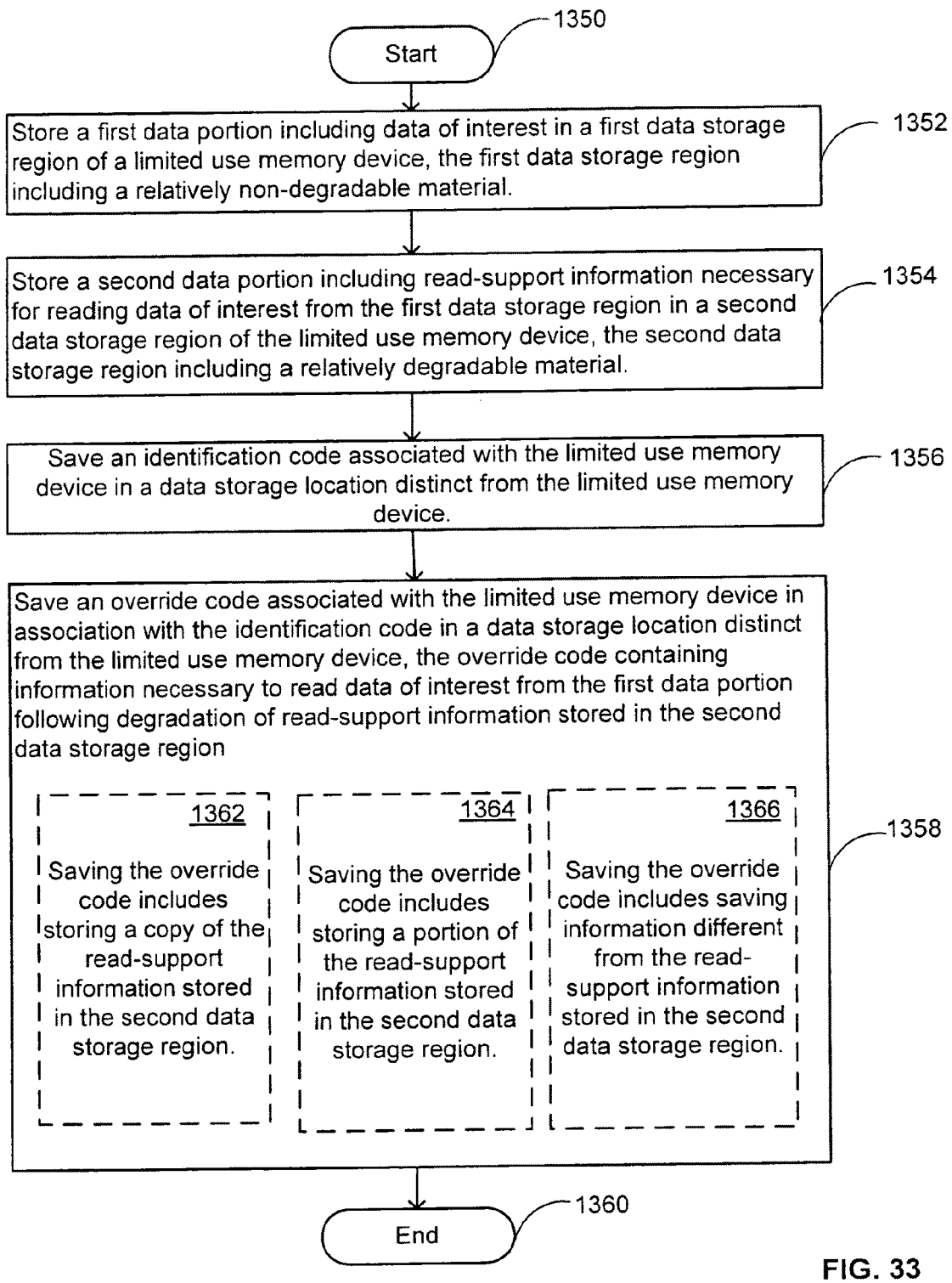
FIG. 33 is a flow diagram showing variants of a method of configuring a limited use memory device.

FIG. 33 illustrates a further expansion on the method shown in FIG. 32. As in FIG. 32, the method may include storing a first data portion including data of interest in a first data storage region of a limited use memory device (step 1352), the first data storage region including a relatively non-degradable material; storing a second data portion including read-support information necessary for reading the data of interest from the first data storage region in a second data storage region of the limited use memory device (step 1354), the second data storage region including a relatively degradable material; and saving an identification code associated with the limited use memory device in a data storage location distinct from the limited use memory device (step 1356). The method further may include saving an override code associated with the limited use memory device in association with the identification code in a data storage location distinct from the limited use memory device, the override code containing information necessary to read data of interest from the first data portion following degradation of read-support information stored in the second data storage region (step 1358). Saving the override code may be performed in several different ways, including storing a copy of the read-support information stored in the second data storage region (step 1362), storing a copy of a portion of the read-support information stored in the second data storage region (step 1364), or saving information different from the read-support information stored in the second data storage region (step 1366).

Read-support information may be stored in various different ways and different formats, so that access to the read-support information may be contingent upon access to a read device including appropriate hardware and/or software following degradation or inactivation of the data storage device. For example, read-support information may be partially modified or degraded, so that it is readable only by special hardware or software. Alternatively, it may be undegraded, but hidden by encryption or by being stored in a form that is readable only by special-purpose system, e.g. because it is stored in a different medium (as the initially readable data), or stored in the same medium at a different spatial frequency, position, or depth with the medium.

According to various embodiments as describe herein, methods of obtaining read-support information in order to retrieve data of interest from, or 'reactivate', a deactivated memory device may be performed completely under microprocessor control. In other embodiments, retrieval of information from a deactivated memory device may be performed with certain intermediate steps performed with human intervention or involvement. Various method steps as described herein may be performed by hardware, software, firmware, or combinations thereof, as is well known to those of skill in the arts of hardware and software design.

Although discussion herein focuses on 'reactivation' of data storage devices that have been deactivated by the degradation (or other modification) of read-support information, which blocks access to data stored in a portion of a data storage device, in other embodiments the blocking and unblocking effect obtained by degradation and subsequent retrieval of read-support information may be used to activate or deactivate selected portions of the data storage device, so that (for example) different data may be read from the data storage device on the first reading than on the subsequent readings. It will be appreciated that the general approach described herein for obtaining a backup copy of read-support information may similarly be applied to blocking information, in order to activate or deactivate 'blocking' of reading, or to activate or deactivate selected portions of a data storage device. In some cases, read-support information may be more appropriately termed read-control information in that its presence/accessibility or absence/inaccessibility may determine which of two (or possibly more) portions of data on a data storage medium will be accessed or executed. For example, read control information may switch between a password-protected version of data of interest, and a non-password-protected version of data of interest. This is but one of many possible applications of this general approach.

Figure 34A:
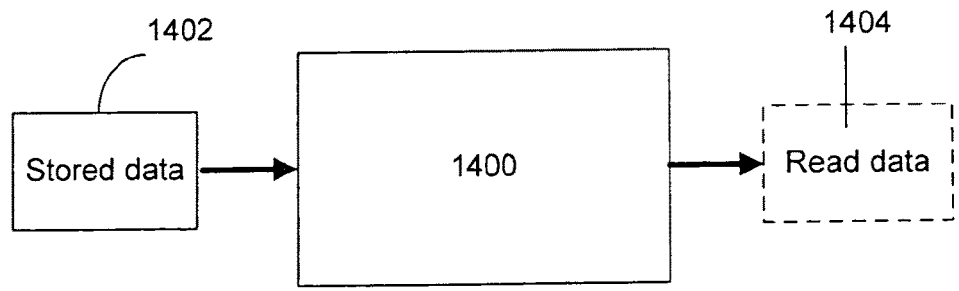
FIG. 34A depicts reading of data from an intact data storage device with a first read device.
Figure 34B:
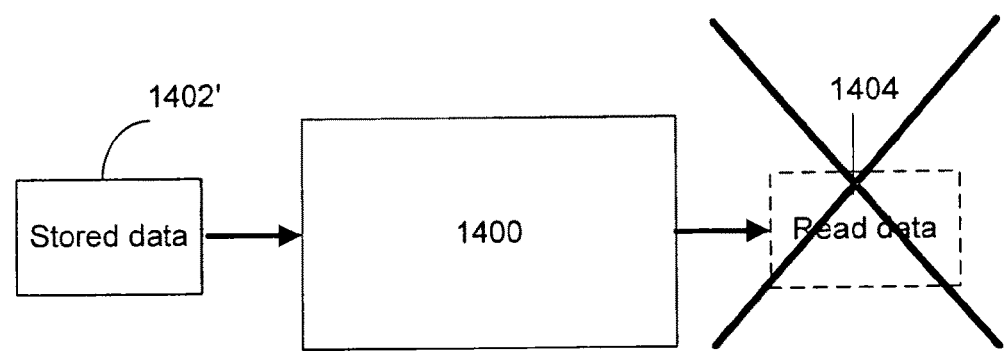
FIG. 34B depicts reading of data from a deactivated data storage device with a first read device.
Figure 34C:
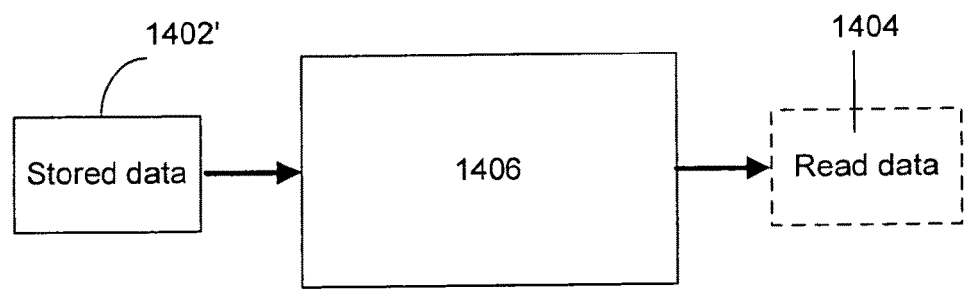
FIG. 34C depicts reading of data from a deactivated data storage device with a second read device.

Referring back to FIG. 8, one general approach for retrieving data from an expired memory device or data storage device may including using special purpose hardware of software (at 1462) to retrieve read-support information from the data storage data, the read-support information being inaccessible to the system previously used to read the read-support information. In other words, some or all of the data storage device may have differing levels of readability to differing data read systems. It is presumed that a first type of read system may be routinely used by the use of the data storage device, and a second type of read system having different read capabilities may be used to recover data from an expired data storage device. Different read capabilities may be conferred by special hardware (that may be available, for example, at a service shop) or special software (that may be available at a service shop, or be accessed, downloaded, or otherwise obtained by the user for installation on the normally used system, for example, by paying a fee, entering a password, or meeting some other requirement for gaining access to the special purpose software). FIG. 34A illustrates in schematic form the use of a first type of read system 1400 for reading stored data from an unmodified data storage device 1402. Successfully read data is indicated at 1404. FIG. 34B illustrates in schematic form the attempted use of a first type of read system 1400 for reading stored data from a degraded or deactivated data storage device 1402'. A successful data read is not obtained. FIG. 34C illustrates the use of a second type of read system 1406 for reading stored data from degraded or deactivated data storage device 1402'. Successfully read data is indicated at 1404.

According to one exemplary embodiment, a memory device may include a substrate, a data storage medium on the substrate, and machine readable data stored in the data storage medium. The machine readable data may have a first readability, and the readability of at least a portion of the machine readable data may be modifiable by a limited expected lifetime so that following modification of readability, the modified portion of machine readable data may have a second readability. Data having the first readability may be readable by a first type of data read system, while data having the second readability is not readable by the first type of data read system. In some cases, data having the second readability may be readable by a second type of data read system, while in other cases, data having the second readability may be substantially unreadable.

In the above exemplary embodiment, the limited expected lifetime may be defined by a limited number of readings of the machine readable data from the memory device, or a limited number of uses of the memory device (not limited to reading, but including other uses or treatment of the memory device as well). Alternatively, the limited expected lifetime may be defined by a limited time interval following an initial use of the device.

Machine readable data having the second readability may have a reduced signal-to-noise ratio, an increased bit error rate, or reduced redundancy relative to machine readable data having the first readability.

In a further related embodiment, the readability of at least one first portion of the machine readable data may be modifiable by the limited expected lifetime while readability of at least one second portion of the machine readable data may not be modifiable by the limited expected lifetime, and the at least one first portion may contain read-support information needed for reading data of interest in the at least one second portion. The read-support information may include a decryption key or index information. The machine readable data in the at least one first portion having the second readability may have a reduced signal-to-noise ratio, increased bit error rate, or reduced redundancy relative to machine readable data having the first readability.

Figure 35:
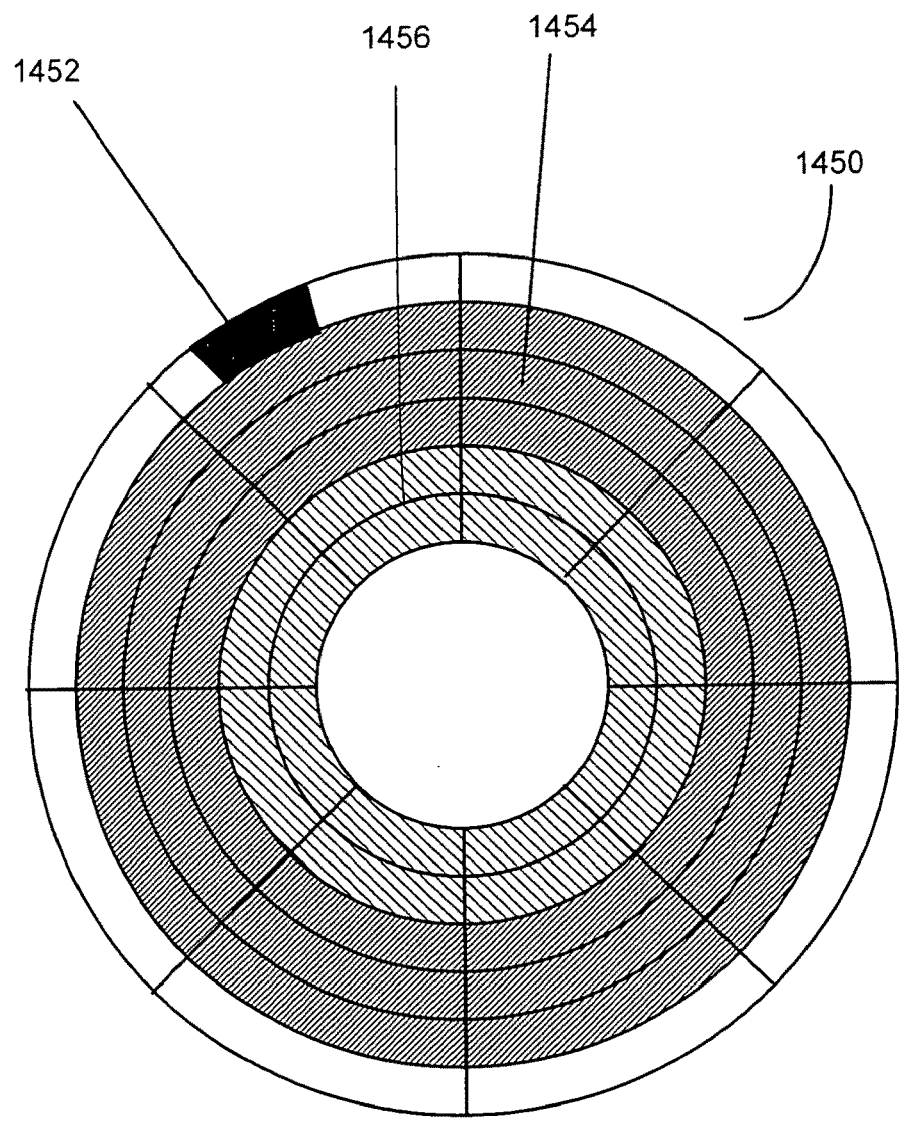
FIG. 35 illustrates a data storage device including read-control data and two data portions.
Figure 36:
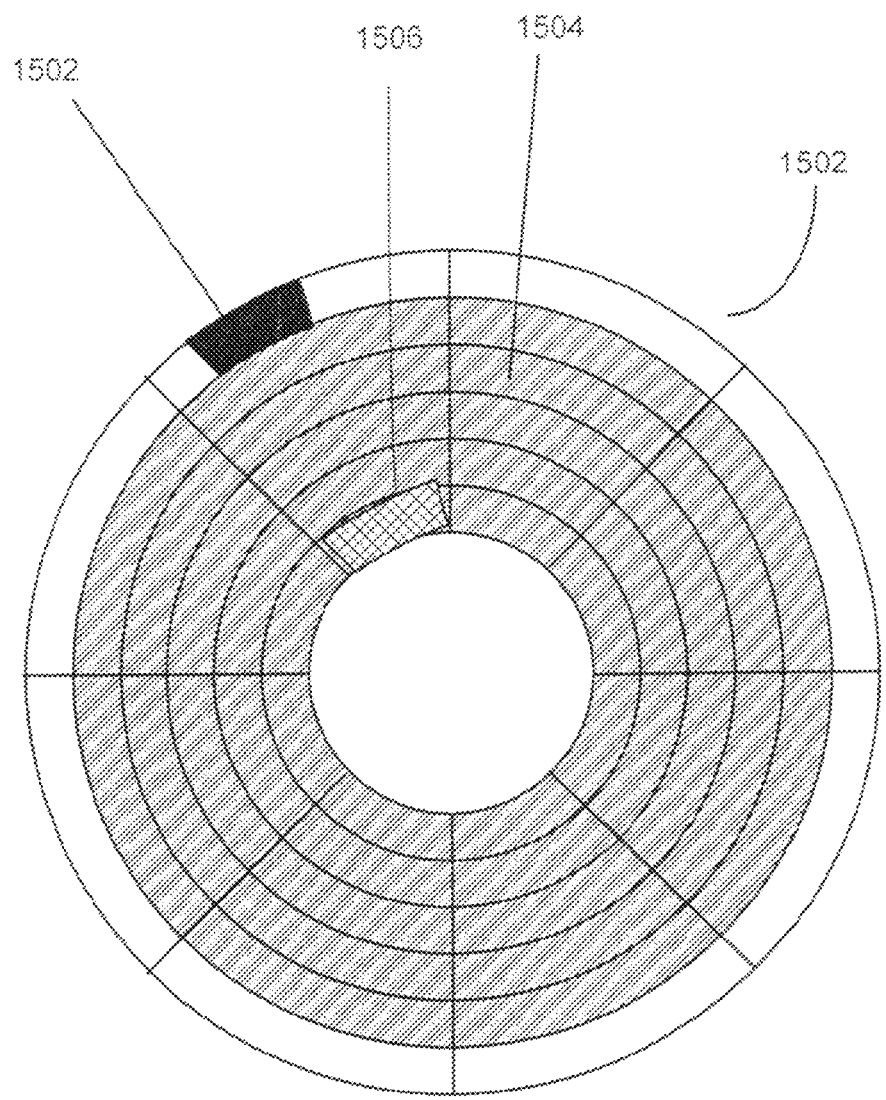
FIG. 36 illustrates a data storage device including secondary read-support information.
Figure 37:
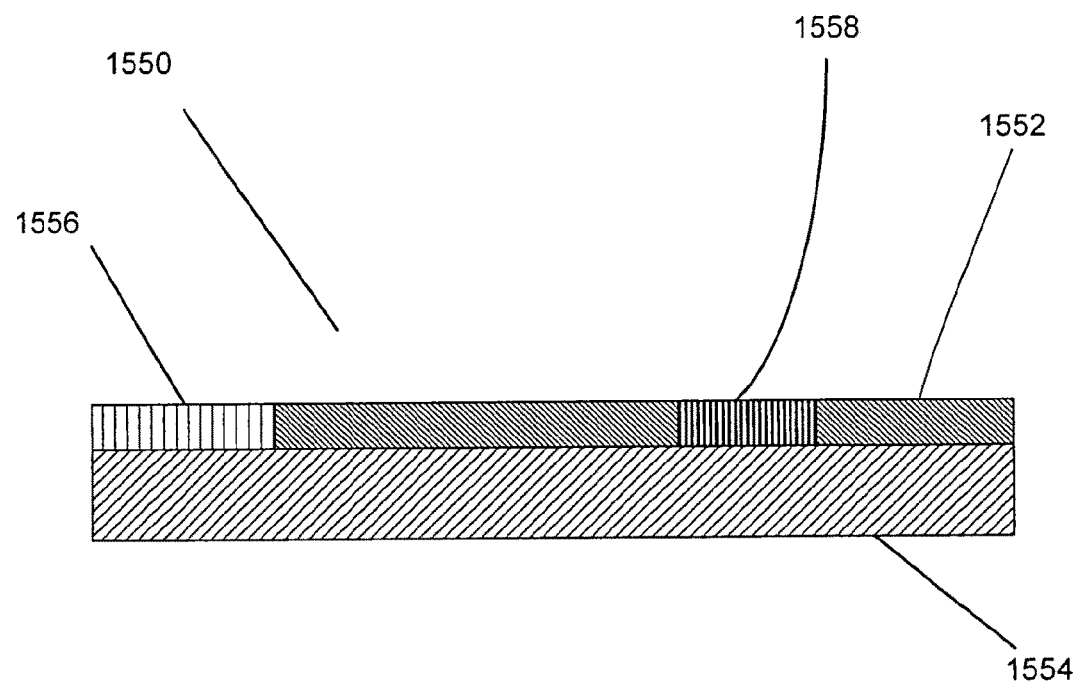
FIG. 37 is a cross-sectional view of a data storage device including data stored at two spatial frequencies.

In still another related embodiment of a memory device 1450, as depicted in FIG. 35, a first portion of data may include read control information 1452 and second data portion 1454 and third portion data 1456 include data of interest. Modification of the read control information may control whether data of interest is read from the second data portion 1454 or third data portion 1456. Readability of at least one first portion of the machine readable data may be modifiable by the limited expected lifetime, while readability of at least one second portion and at least one third portion of the machine readable data may not be modifiable by the limited expected lifetime. The at least one first portion may contain read-control information, which for example may cause data to be read from the at least one second portion when the at least one first portion has the first readability, and cause data to be read from the at least one third portion when the at least one first portion has the second readability FIG. 36 depicts an exemplary data storage device 1500 including a first portion 1502 and second portion 1504. The machine readable data in the at least one first portion 1502 having the second readability may be substantially unreadable, in which case additional read-support information 1506 may be stored in the at least one second portion 1504 and retrievable with a special purpose read system. For example, if the data storage medium is an optical data storage medium, the additional read-support information may be readable at a different optical wavelength than is the data of interest, or the memory device may include a magnetic data storage medium in which the additional read-support information is stored. Conversely, data of interest may be stored in a magnetic data storage medium and additional read-support information stored in an optical data storage medium. Other alternative data storage media in which additional read-support information can be stored include one or more resonant circuits or RFIDs. Additional read-support information may be stored in a bar code on the memory device (which may be read optically, for example, but on a different scale than the data of interest that may be stored in optical form in the memory device. Additional read-support information may be stored in the same type of data storage medium as the data of interest, but in a different format: for example, the additional read-support information may be stored at a different spatial frequency. FIG. 37 depicts in cross-sectional view a data storage device 1550 including a substrate 1554 and data storage medium 1552 including data 1556 stored at a first spatial frequency and data 1558 stored at a second spatial frequency.

Additional read-support information may be retrievable by a special purpose read system including one or both of special purpose software or special purpose hardware.

Figure 16:
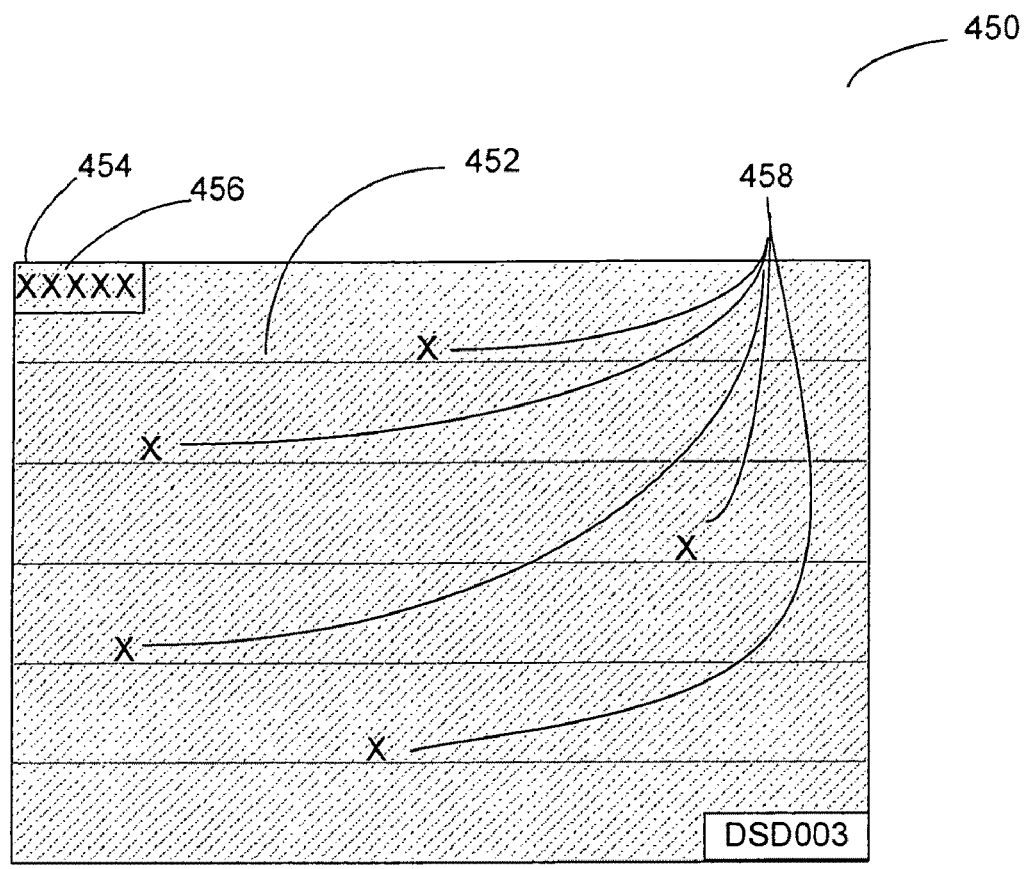
FIG. 16 depicts a data storage device including read-support information dispersed in the data of interest.

Additional read-support information may be stored in various formats, and may include full, partial, or alternative versions of the read-support information in the first portion. The additional read-support information may include at least one copy of the read-support in the at least one first portion or a portion of the read-support in the at least one first portion. The portion of the read-support information may be complementary to a residual portion of the read-support information readable from the at least one first portion following modification of readability, as illustrated in FIG. 13. In some embodiments, the additional read-support information may be distributed among multiple locations in the at least one second portion, as illustrated in FIG. 16. Additional read-support information distributed among the multiple locations may be retrievable with the use of index information. In some embodiments, additional read-support information may be stored in the at least one second portion in encrypted form. For example, additional read-support information may be encrypted by a public key encryption method such as a Diff-Hellman, RSA, EIGaml, DSS, Elliptic curve, Paillier cryptosystem, or Password-authenticated Key agreement encryption method or a private key encryption method such as DES (see, e.g., Donald E. Knuth, The Art of Computer Programming, Volume 1: Fundamental Algorithms, Third Edition, Reading, Mass., Addison-Wesley, 1997; Volume 2: Seminumerical Algorithms, Third Edition, Reading, Mass., Addison-Wesley, 1998).

Readability of the machine readable data may be modifiable through degradation of the data storage medium, which may include material that is degradable by exposure to one of light, heat, moisture, chemicals, an electrical field, or a magnetic field. Alternatively, readability of the machine readable data may be modifiable through degradation of the substrate, which may be, for example, a material that is degradable by exposure to one of light, heat, moisture, chemicals, an electrical field, or a magnetic field. In some embodiments, readability of the machine readable data may be modifiable through erasure or writing over of at least a portion of the machine readable data.

Another exemplary embodiment of a memory device may include a data storage medium and machine readable data stored in the data storage medium, with at least one first portion of the machine readable data having a limited expected lifetime after an initial read of data, during which the machine readable data can be read from the data storage medium by a first type of data read system, and following which the readability of the at least one first portion of the machine readable data is modified so that it is unreadable by the first type of data read system. The limited expected lifetime of the memory device may be imposed by degradation of at least a portion of the memory device by exposure to one or more of light, heat, moisture, chemicals, an electrical field, or a magnetic field.

In some embodiments, the at least one first portion of the machine readable data may be substantially unreadable following the limited expected lifetime. However, in various exemplary embodiments, the at least one first portion of the machine readable data is readable by a second type of data read system following the limited expected lifetime. The second type of data read system may differ from the first type of data read system in some manner. For example, during the limited expected lifetime, the at least one first portion of the machine readable data may be readable by an optical data read system. Following the limited expected lifetime, the at least one first portion of the machine readable data may be readable by an optical data read system operating at a reduced scan speed relative to a general purpose optical data read system. Or, following the limited expected lifetime, the at least one first portion of the machine readable data may be readable by an optical data read system performing signal averaging on the data signal. Alternatively, during the limited expected lifetime, the at least one first portion of the machine readable data may be readable by a magnetic data read system, while following the limited expected lifetime, the at least one first portion of the machine readable data may be readable by a magnetic data read system operating at a reduced scan speed relative to a general purpose magnetic data read system. As a further alternative, following the limited expected lifetime, the at least one first portion of the machine readable data is readable by a magnetic data read system performing signal averaging on the data signal.

The at least one first portion of the machine readable data may contain read-support information necessary for reading data of interest in at least one second portion of machine readable data, such as all or a portion of a decryption key (e.g., a private key or a public key). Read-support information may include locational information relating to the location of the data of interest within the at least one second portion of machine readable data.

In some embodiments, the at least one second portion may include additional read-support information needed for reading data of interest in the at least one second portion. One or more copies of the read-support information may be stored on the memory device. At least one of the one or more copies of the read-support information may be stored in encrypted form. At least one of the one or more copies may be retrievable from the at least one first portion through the use of special purpose software. By way of example, such special purpose software may include a function such as a HASH function, a table lookup function, or a decryption algorithm. At least one of the one or more copies may be retrievable from the at least one first portion through the use of special purpose hardware. In one alternative embodiment, a copy or analog of the read-support information may be retained by a third party, instead of or in addition to being stored on the memory device.

In another exemplary embodiment, a data storage device may include:

A data storage medium capable of having machine readable data stored therein, the data storage medium capable of producing a data signal in a data read device in response to an interrogation activity by the data read device, the data storage medium including:

at least one modifiable portion capable of producing a data signal within a first signal range at the start of a limited read period characterized by a limited expected lifetime or limited temporal duration, and modifiable to produce a read signal falling within a second signal range subsequent to the limited read period.

In the above embodiment, a data signal within the first signal range may be readable by a general purpose read device and a data signal within the second signal range may be readable by a special purpose read device but not by a general purpose read device. For example, a data signal within the first signal range may be characterized by a first signal-to-noise ratio and a data signal within the second signal range may be characterized by a second signal-to-noise ratio. As a second example, data signals within the first signal range may be characterized by a first bit data error rate and a data signal within the second signal range may be characterized by a second bit data error rate. The data storage device may include a data storage medium capable of producing a data signal in an optical data read device, or a data storage medium capable of producing a data signal in a magnetic data read device, but is not limited to any specific types of data storage media.

Figure 38:
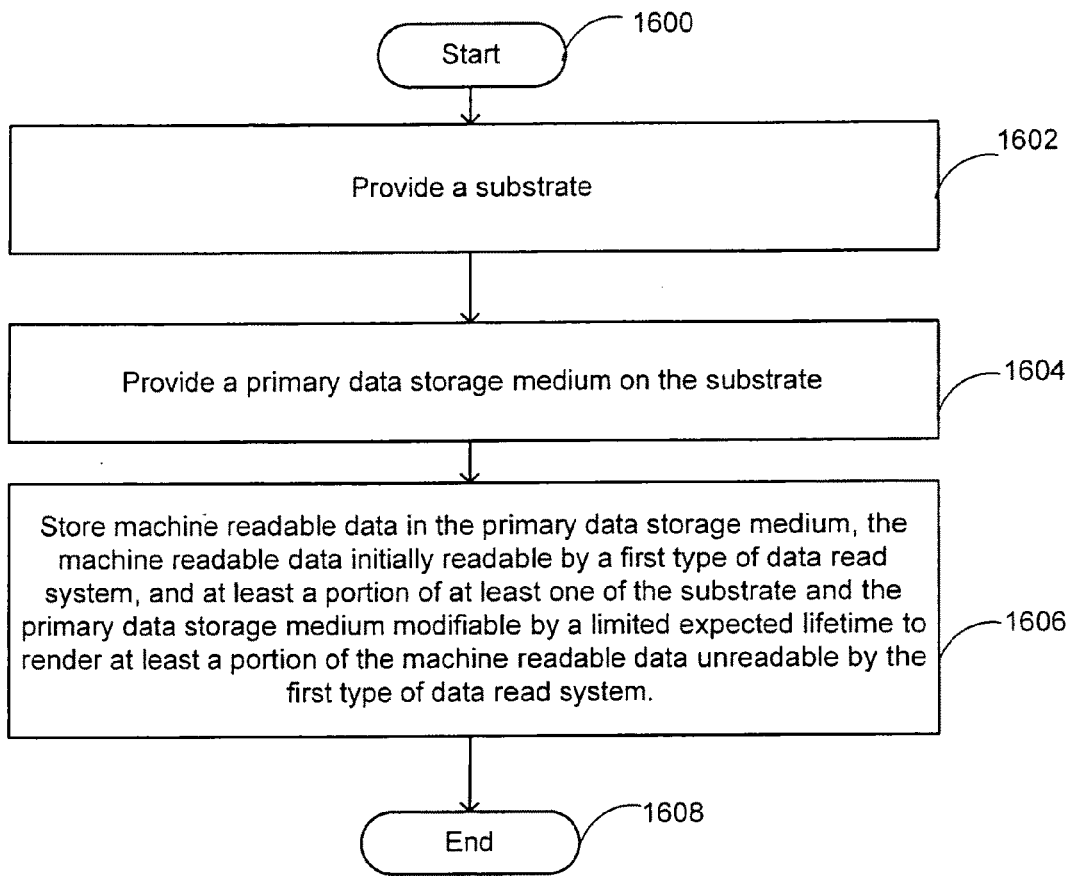
FIG. 38 is a flow diagram of a method of manufacturing a memory device.

As shown in FIG. 38, an exemplary method for manufacturing memory devices as described herein may include providing a substrate at step 1602, providing a primary data storage medium on the substrate at step 1604, and storing machine readable data in the primary data storage medium at step 1606. The machine readable data may initially be readable by a first type of data read system; at least a portion of at least one of the substrate and the primary data storage medium may be modifiable by a limited expected lifetime to render at least a portion of the machine readable data unreadable by the first type of data read system. According to the method, the at least a portion of at least one of the substrate and the primary data storage medium may be modifiable by a limited expected lifetime to render at least a portion of the machine readable data unreadable by the first type of data read system but readable by a second type of data read system.

As noted herein, the limited expected lifetime may be defined by a limited number of readings of the machine readable data from the memory device, by a limited number of uses of the memory device, or by a limited time interval following an initial use of the device. The method may include providing a substrate having at least one degradable portion, wherein the at least one degradable portion is degradable by the limited expected lifetime to render the at least a portion of the machine readable data unreadable by the first type of data read system but readable by the second type of data read system. Alternatively, or in addition, the method may include providing a degradable primary data storage medium on at least a portion of the substrate, wherein the degradable primary data storage medium is modifiable by the limited expected lifetime to render the at least a portion of the machine readable data unreadable by the first type of data read system but readable by the second type of data read system. The degradable primary data storage medium may include a photosensitive material, an electromagnetically-sensitive material, a thermally-sensitive material, a moisture-sensitive material, or a chemical-sensitive material.

In some variants of the above embodiment, prior to the limited expected lifetime the portion of machine readable data may be readable by a first type of data read system selected from an optical data read system and a magnetic data read system.

A number of approaches may be used to provide machine readable data that is modifiable by a limited expected lifetime and has different readability before and after the limited expected lifetime. Depending on how the data is modified over the limited expected lifetime, different methods of providing data may be effective. In some embodiments, the method may include storing machine readable data including multiple copies of data of interest. In some embodiments, the method may include storing machine readable data including redundancies within the data of interest, wherein the machine readable data is modifiable by the limited expected lifetime so that the redundancy in the data of interest is reduced. Following the limited expected lifetime the signal-to-noise ratio of the data of interest may be reduced relative to the signal-to-noise ratio prior to the limited expected lifetime. The portion of machine readable data may then be readable by a second type of data read system that performs signal averaging of multiple reads of the portion of machine readable data. Alternatively, or in addition, following the limited expected lifetime the portion of machine readable data may be readable by a second type of data read system that determines a moving average of the machine readable data. As a further alternative, following the limited expected lifetime the portion of machine readable data may be readable by a second type of data read system that reads data from the at a reduced scan rate relative to a scan rate used by the first type of data read system.

Figure 40:
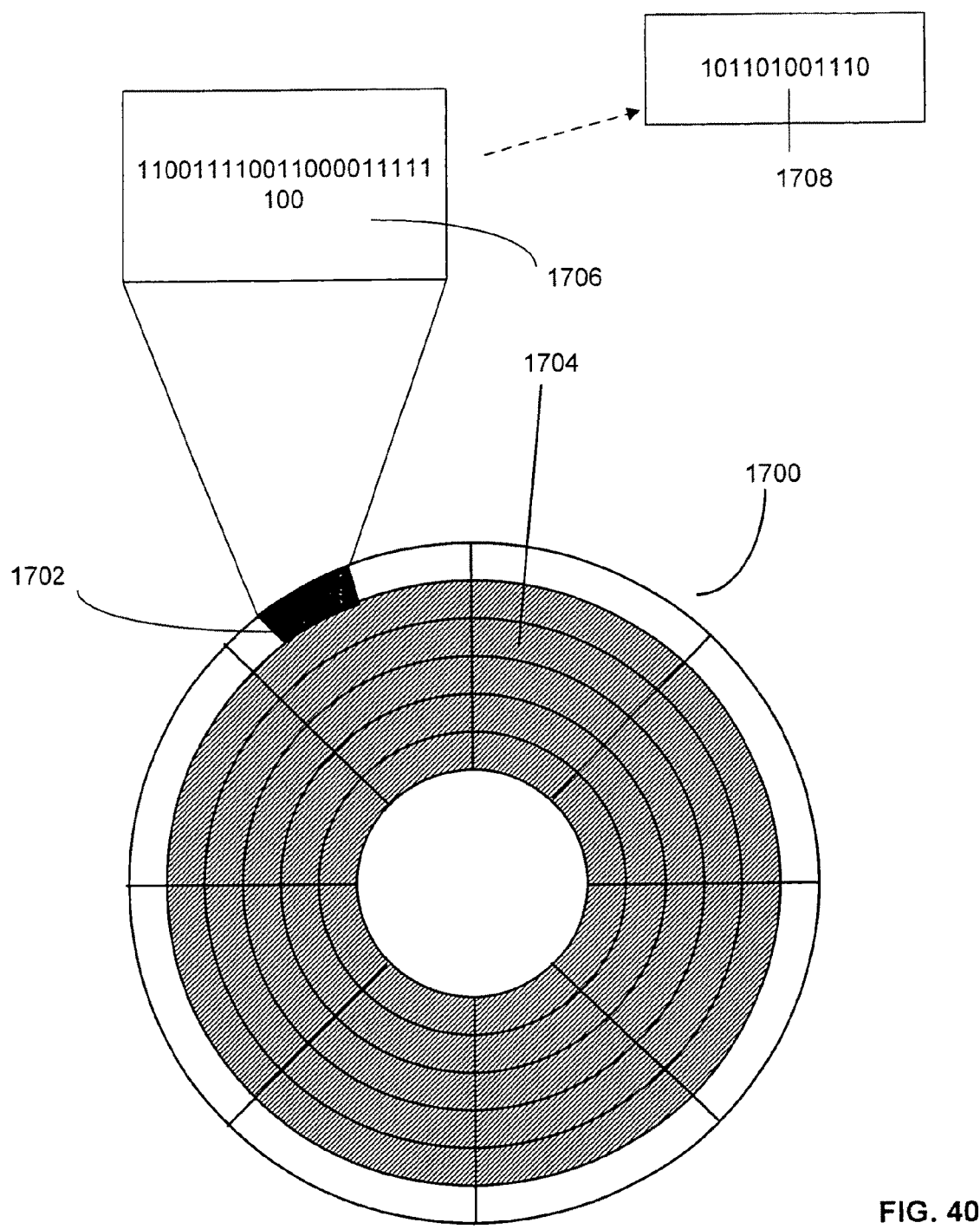
FIG. 40 depicts a data storage device including read-support information including redundancies.
Figure 41:
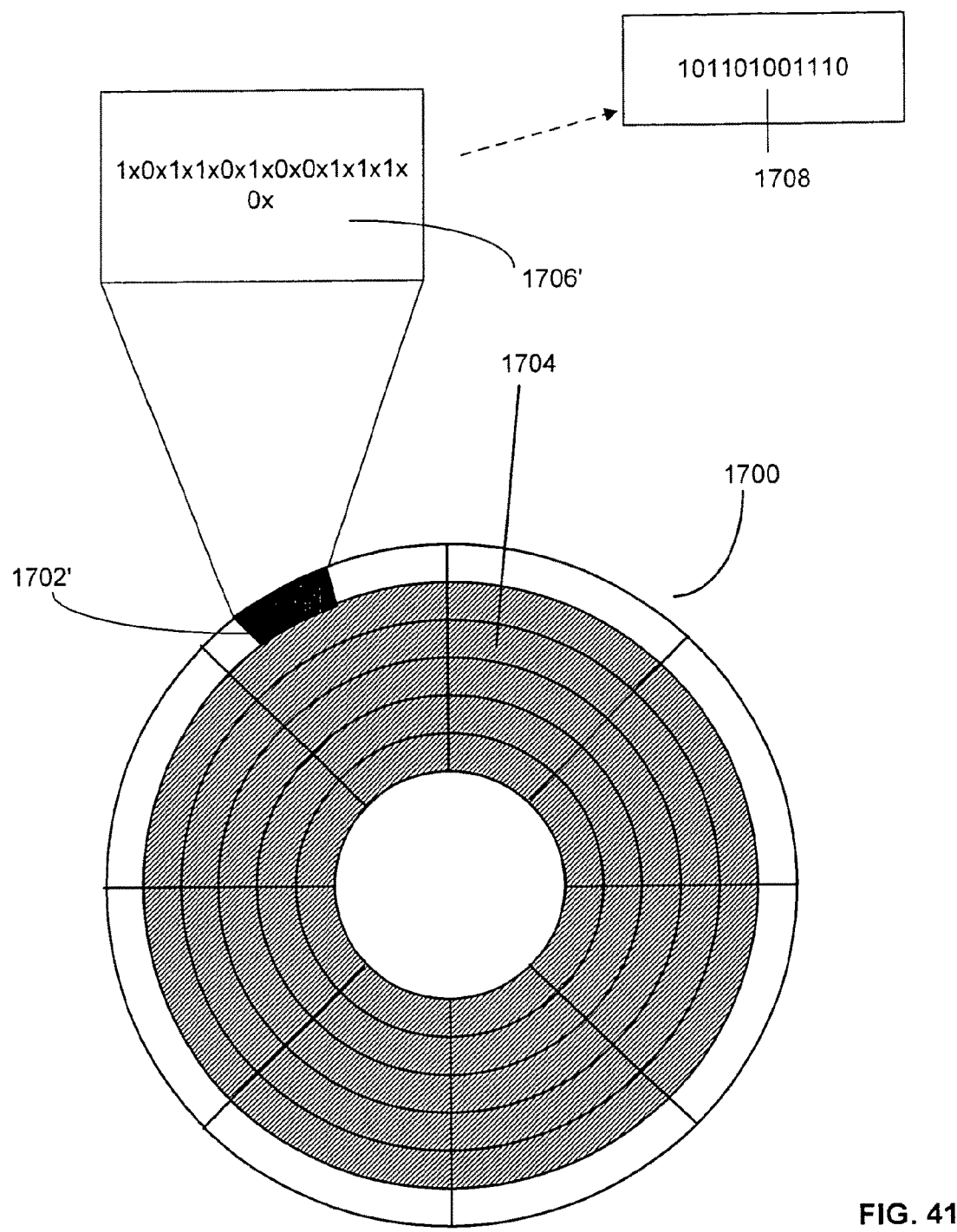
FIG. 41 depicts the data storage device of FIG. 40 following reduction of redundancy in the read-support information.

In one variation, the method may include storing at least one first portion of machine readable data in at least one first portion of the primary data storage medium and storing at least one second portion of machine readable data in at least one second portion of the primary data storage medium, the at least one first portion of machine readable data modifiable by a limited expected lifetime to render the at least one first portion of machine readable data unreadable by the first type of data read system but readable by the second type of data read system, and the at least one second portion of machine readable data substantially unmodifiable by the limited expected lifetime. The method may also include storing read-support information in the at least one first portion of the primary data storage medium and storing data of interest in the at least one second portion of the primary data storage medium, the read-support information necessary for reading the data of interest from the at least one second portion of the primary data storage medium. As illustrated by the data storage device 1650 shown in FIG. 39, the method may include storing two or more copies of the read-support information (1656, 1658, 1660) in the at least one first portion 1652 of the primary data storage medium. Data of interest is indicated at 1654. The multiple copies of read-support information (1656, 1658, 1660) may be averaged to obtain averaged read-support information 1662. As illustrated by data storage device 1700 depicted in FIG. 40, the stored read-support information 1702 may include redundant information 1706, relative to the necessary read-support information 1708, and the stored read-support information may be modifiable by reduction in redundancy by the limited expected lifetime. FIG. 41 depicts data storage device 1700 following degradation. Degraded read-support information 1702' has diminished redundancy in stored information 1706', but the necessary read-support information 1708 is still contained therein.

The method may include storing secondary read-support information on the memory device, the secondary read-support information being readable with the second type of data read system but not the first type of data read system. The method may additionally include storing secondary read-support information in the at least one second portion of the primary data storage medium distributed in the data of interest. For example, this may include storing the secondary read-support information in the at least one second portion of the primary data storage medium in a different format than the data of interest, or storing secondary read-support information in the at least one second portion of the primary data storage medium in encrypted form. Public key or private key encryption methods may be used, for example.

Another approach for storing secondary read-support information is to store secondary read-support information in a secondary data storage medium that may be different than the primary data storage medium. Exemplary secondary data storage media include one or more RFIDs or resonant circuits, optical data storage media (used with a magnetic primary data storage media) or magnetic data storage media (used with an optical primary data storage media).

Figure 42:
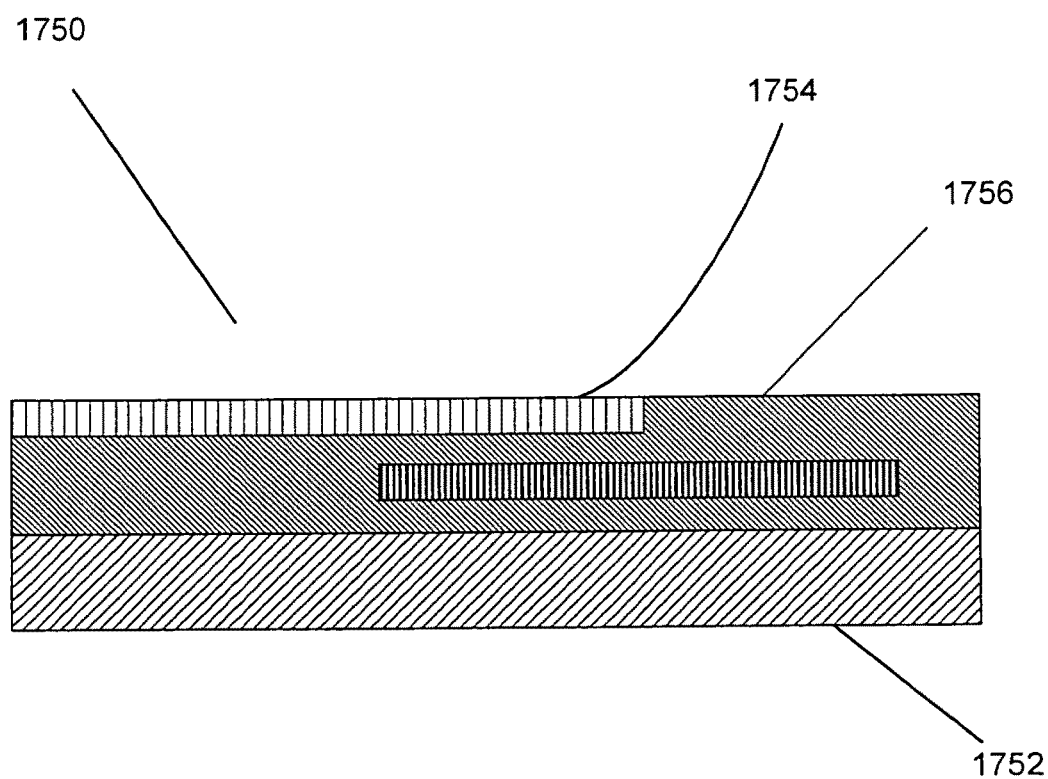
FIG. 42 illustrate a data storage medium having data stored at several different levels.

In yet another approach, as shown in FIG. 42 the primary data storage medium 1756 (shown on substrate 1752 of data storage device 1750, illustrated here in cross-section) may be an optical data storage medium, and the method may include storing secondary read-support information 1756 in the at least one second portion of the primary data storage medium at a different levels in the primary data storage medium than the data of interest 1754. The approach may be used in optical data storage device capable of storing data in multiple layers or levels of the device; such device may include from two to as many as five or more layers.

In another approach, which may be used with magnetic or optical data storage media, among others, the method may include storing secondary read-support information in the at least one second portion of the primary data storage medium at a different spatial frequency in the primary data storage medium than the data of interest.

In optical media, secondary read-support information may be stored in the at least one second portion of the primary data storage medium that is readable by a different optical wavelength than the data of interest.

Figure 43:
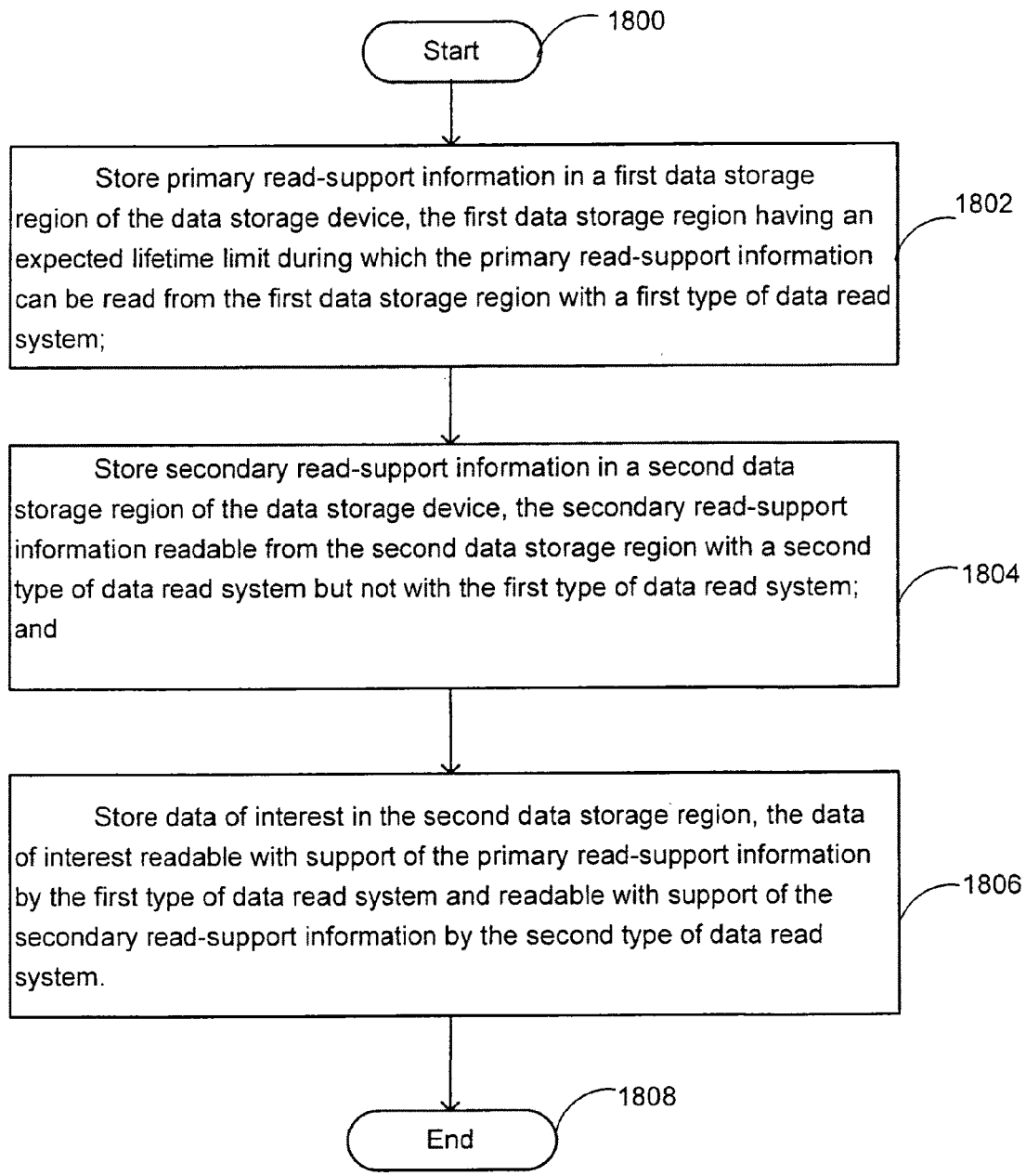
FIG. 43 is a flow diagram of an exemplary method of manufacturing a data storage device.

FIG. 43 depicts another exemplary method of manufacturing a data storage device, which may include:

storing primary read-support information in a first data storage region of the data storage device, the first data storage region having an expected lifetime limit during which the primary read-support information can be read from the first data storage region with a first type of data read system (step 1802);

storing secondary read-support information in a second data storage region of the data storage device, the secondary read-support information readable from the second data storage region with a second type of data read system but not with the first type of data read system (step 1804); and storing data of interest in the second data storage region, the data of interest readable with support of the primary read-support information by the first type of data read system and readable with support of the secondary read-support information by the second type of data read system (step 1806).

Secondary read-support information may be stored in the second data storage region in encrypted form. The primary read-support information may include a decryption key, which may be, for example, a private key or a public key. Alternatively, the primary read-support information includes index information used for determining locations from which to read data of interest from the data storage device in correct sequence. The method may include storing the primary read-support information in a degradable first data storage region, wherein the expected lifetime limit during which primary read-support information can be read from the first data storage region with the first type of data read system is determined by the degradation of the degradable first data storage region. The degradable first data storage region is degradable, for example, by exposure to at least one of light, heat, oxygen, moisture, a chemical, or an electromagnetic field.

Figure 44:
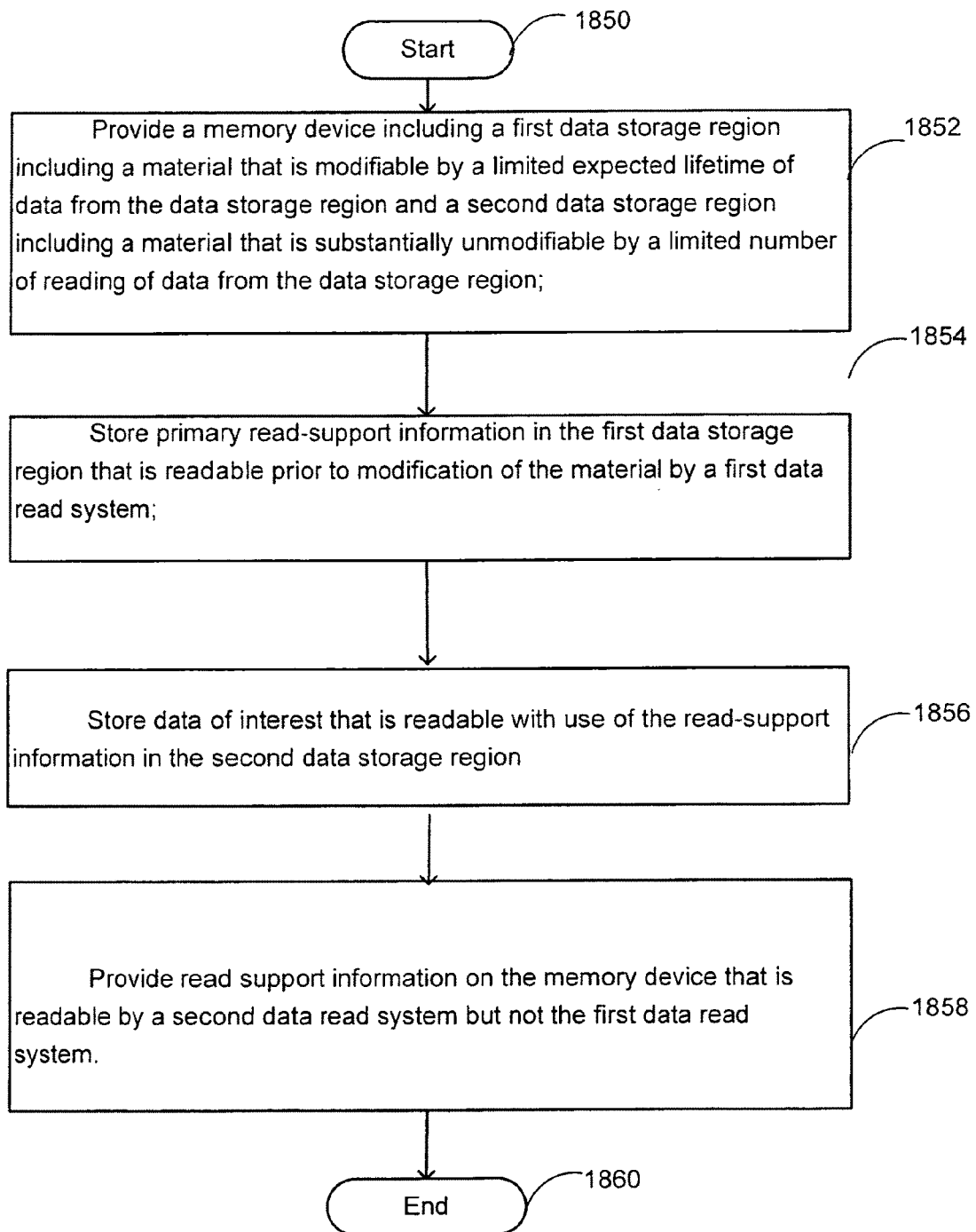
FIG. 44 is a flow diagram of an exemplary method of configuring a memory device.

An exemplary method of configuring a memory device, as shown in FIG. 44, may include:

providing a memory device including a first data storage region including a material that is modifiable by a limited expected lifetime of data from the data storage region and a second data storage region including a material that is substantially unmodifiable by a limited number of reading of data from the data storage region (step 1852);

storing primary read-support information in the first data storage region that is readable prior to modification of the material by a first data read system (step 1854);

storing data of interest that is readable with use of the read-support information in the second data storage region (step 1856); and providing read-support information on the memory device that is readable by a second data read system but not the first data read system (step 1858).

The method of configuring a memory device may include providing read-support information on the memory device that is readable by a second data read system but not the first data read system by storing read-support information in the first data storage region in a format that is readable by the first data read system prior to modification of the material and is readable by the second data read system but not the first data read system subsequent to modification of the material. A format readable by the first data read system may include redundancy, and following modification the level of redundancy may be reduced to a level readable by the second data read system but not the first data read system. In some embodiments, the format readable by the first data read system may include multiple copies of the read-support information of which only one is read by the first data read system, and wherein following modification the signal-to-noise ratio of the copies is reduced so to a level that is unreadable by the first data read system but readable by the second data read system by averaging of the multiple copies.

Providing read-support information on the memory device that is readable by a second data read system but not the first data read system may be accomplished by storing secondary read-support information in the second data storage region. Secondary read-support information may be stored at one or more locations in the second data storage region, wherein information about the one or more locations is available to the second data read system but not the first data read system.

In some embodiments, primary read-support information may include index information or an encryption key such as a private key or a public key.

In some embodiments, data of interest may be stored in an optical data storage medium, or a magnetic data storage medium, among others. Read-support information may be provided that is readable by an optical data read device or a magnetic data read device. Secondary read-support information may be provided on the memory device in the form of at least one RFID or resonant circuit.

Figure 45:
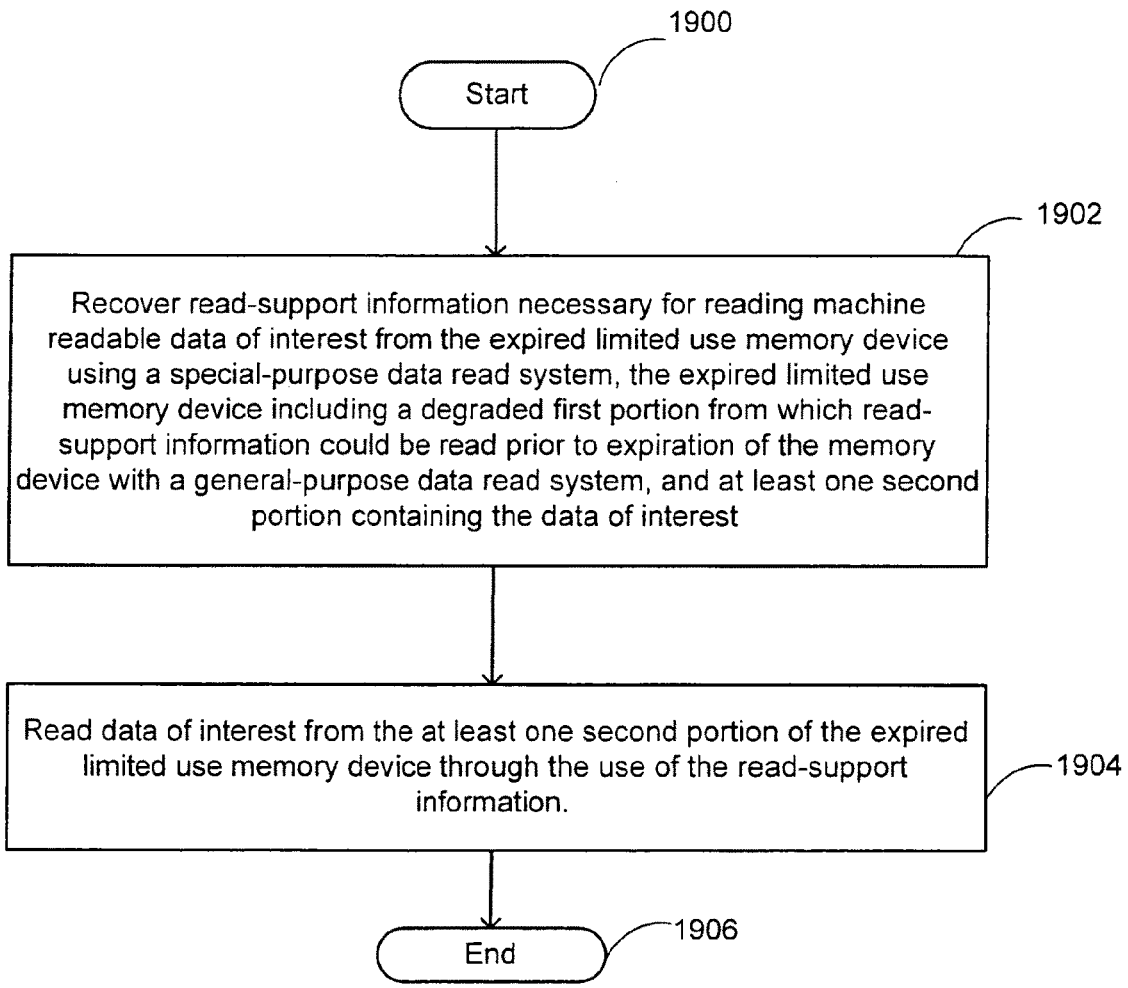
FIG. 45 is a flow diagram of an exemplary method of retrieving data from an expired limited use memory device.

Data stored on expired limited use memory devices according to methods as described herein may be retrieved with suitably constructed data recovery methods and systems. As shown in FIG. 45, one exemplary method of retrieving data from an expired limited use memory device may include recovering read-support information necessary for reading machine readable data of interest from the expired limited use memory device using a special-purpose data read system, the expired limited use memory device including a degraded first portion from which read-support information could be read prior to expiration of the memory device with a general-purpose data read system, and at least one second portion containing the data of interest, as shown at step 1902, and reading data of interest from the at least one second portion of the expired limited use memory device through the use of the read-support information, as shown at step 1904. In some applications, the method may include recovering read-support information from the degraded first portion of the limited use memory device. The method may include recovering read-support information from the degraded first portion of the limited use memory device using a data read system operating at a reduced scanning speed relative to a general-purpose data read system, or it may include recovering read-support information from the degraded first portion of the limited use memory device using a data read system that performs signal averaging on the read data. In some embodiments, the data read system may perform a moving average on the read data.

Figure 39:
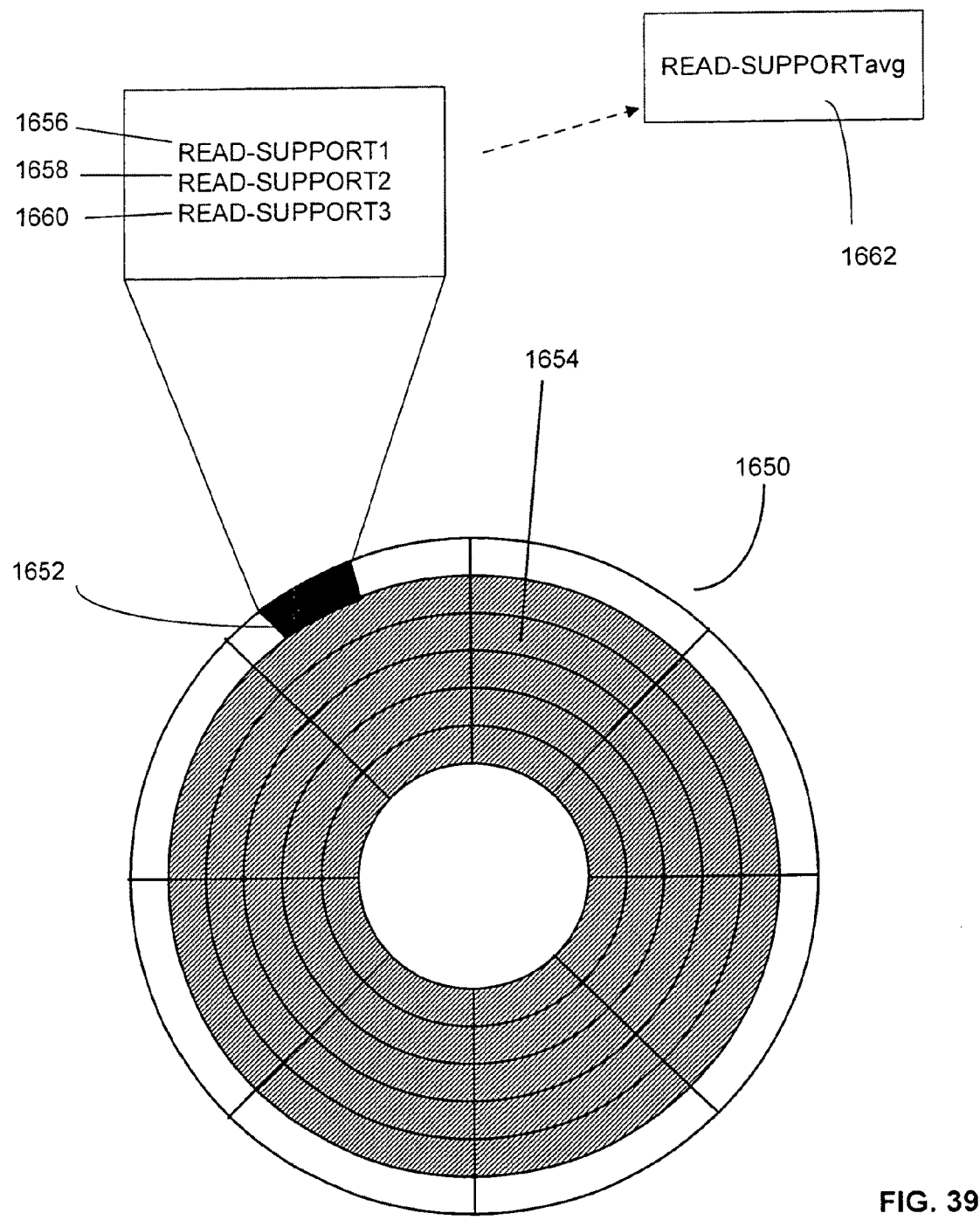
FIG. 39 depicts a data storage device including multiple copies of read-support information.

In cases where the degraded first data portion includes two or more degraded copies of the read-support information, the data read system may average the two or more degraded copies of the read-support information, as depicted herein in FIG. 39. This may improve the signal-to-noise ratio, for example. In cases where read-support information is distributed among the data of interest in the at least one second portion of the limited use memory device, the read-support information may be recovered using a special-purpose data read system including extraction software. The extraction software may include at least one function, such as a HASH function or a decryption function, or it may include a lookup table operation.

Recovered read-support information may include complete information necessary for reading the data of interest, or a subset of information necessary for reading the data of interest. In some embodiments, the method may include recovering partial read-support information from the degraded first portion of the limited use memory device and recovering complimentary partial read-support information from the at least one second portion of the limited use memory device, wherein the partial read-support information and complementary read-support information together are sufficient to support reading of the data of interest from the at least one second portion of the limited use memory device, as illustrated in FIG. 13.

Figure 46:
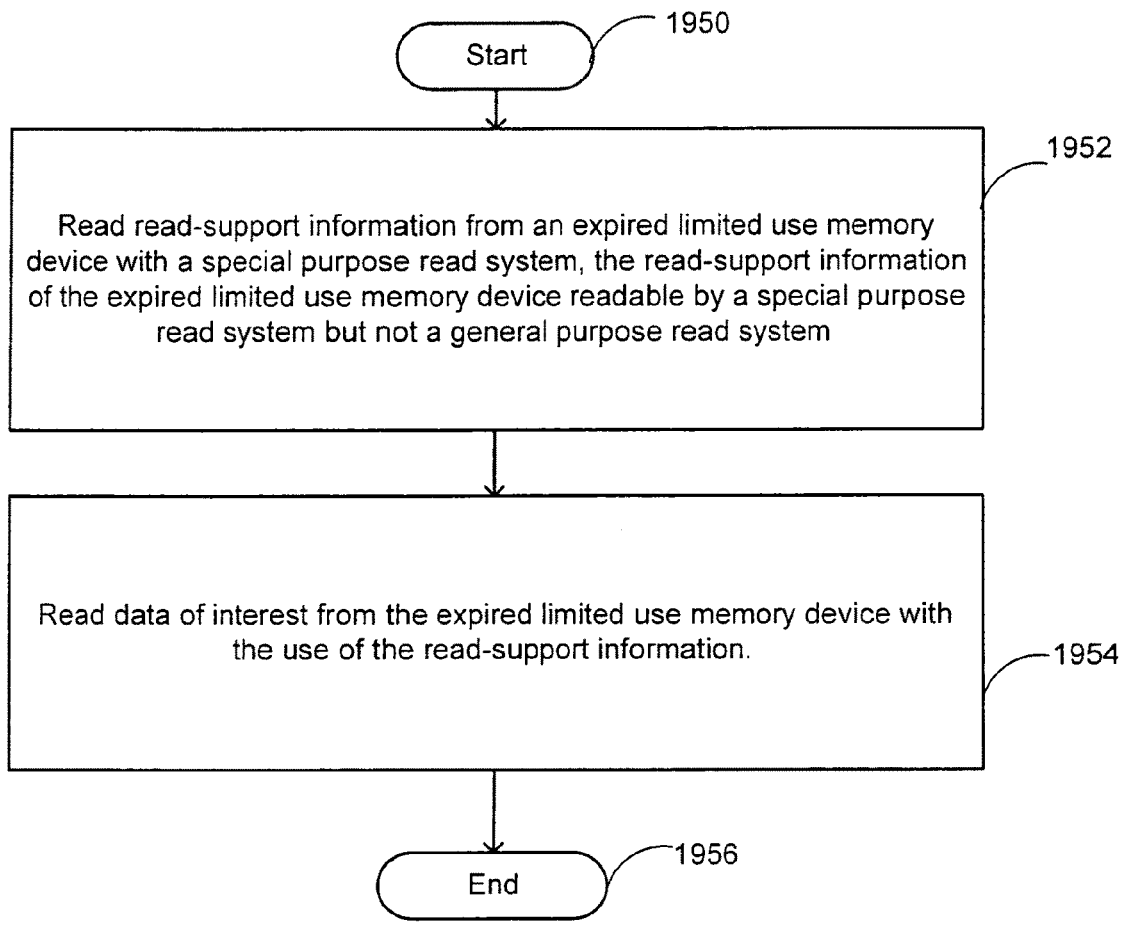
FIG. 46 is a flow diagram of a further exemplary method of retrieving data from an expired limited use memory device.

As shown in FIG. 46, a further exemplary method of retrieving data from an expired limited use memory device may include reading read-support information from an expired limited use memory device with a special purpose read system, the read-support information of the expired limited use memory device readable by a special purpose read system but not a general purpose read system, as shown at step 1952; and reading data of interest from the expired limited use memory device with the use of the read-support information, as shown at step 1954. If the read-support information includes a decryption key, the method may also include decrypting the data of interest, while if the read-support information includes index information, the method may include locating and sequencing the data of interest.

The method may include reading the read-support information from the expired limited use memory device with the use of a noise reduction technique, which may include, for example, a thresholding operation, performing a moving average, or performing signal averaging. In some embodiments, reading the read-support information from the expired limited use memory device may include using an error detection technique including an error detection code. The method may include reading the read-support information from the expired limited use memory device includes using an error correction code. One or both of error detection or error correction may be formed, though error correction is commonly performed in connection with error detection.

Figure 47:
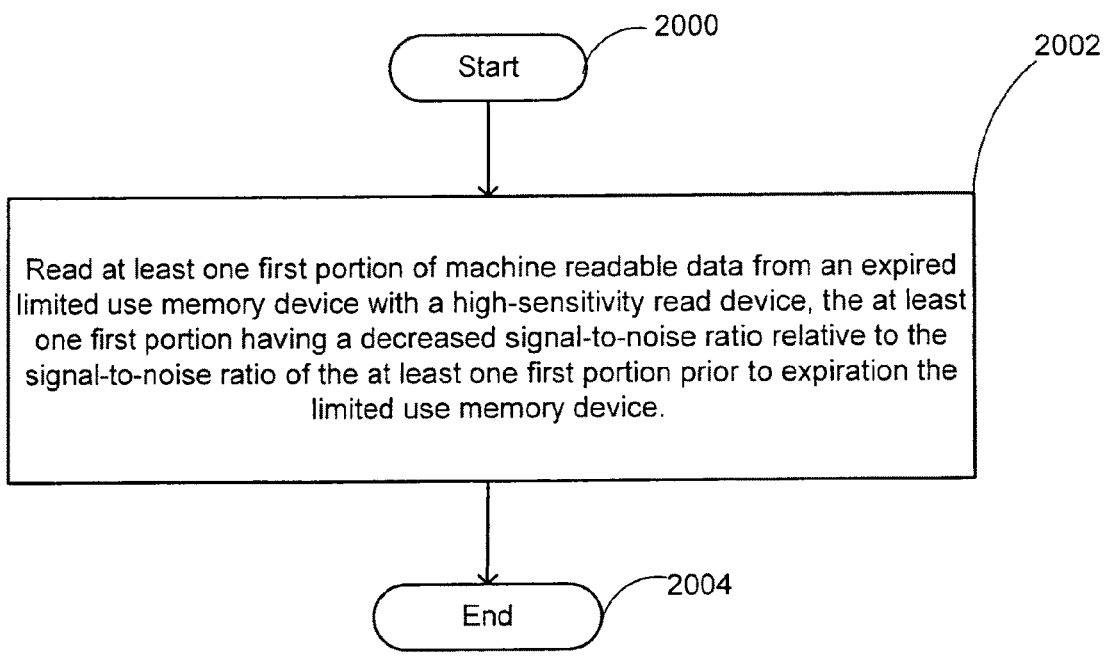
FIG. 47 is a flow diagram of a further exemplary method of retrieving data from an expired limited use memory device.

In a further alternative embodiment, depicted in FIG. 47, a method of retrieving data from an expired limited use memory device may include reading at least one first portion of machine readable data from an expired limited use memory device with a high-sensitivity read device, the at least one first portion having a decreased signal-to-noise ratio relative to the signal-to-noise ratio of the at least one first portion prior to expiration the limited use memory device (step 2002). The method may include reading at least one first portion of machine readable data from an expired limited use memory device with a high-sensitivity read device that performs signal averaging on the at least one first portion. In some embodiments the high-sensitivity read device may perform a thresholding operation on the at least one first portion. The high-sensitivity read device may include normal-sensitivity read-device hardware configured with special purpose software or firmware. Alternatively, the high-sensitivity read device may include special purpose hardware components.

In some embodiments, the method may include using information contained in the at least one first portion of machine readable data to enable reading of data from at least one second portion of machine readable data on the expired limited use memory device. The at least one second portion of machine readable data on the expired limited use memory device may have a signal-to-noise ratio substantially the same as the signal-to-noise ratio of the at least one first portion prior to expiration of the limited use memory device.

In one exemplary embodiment, a system for recovering data from expired data storage devices may include a data recovery device including a receptacle adapted to receive a data storage device, a read head positionable within the receptacle to read data from an expired data storage device received within the receptacle, a first sensor located on the read head for sensing data from the data storage device, and a controller configured to control at least one of the position of the read head position, operation of the first sensor, or processing of sensed data to recover data from at least a portion of an expired data storage device. The controller may include drive controller hardware and/or software, software resident in a computer or other system including a read device (as depicted generally in FIGS. 1 and 2). The controller may include hardware, software, firmware, or combinations thereof, and may be resident in a single device or distributed between two or more devices or components. The controller may be configured to control the position of the read head to locate the read head over at least one degraded data portion of an expired data storage device. In some embodiments, the controller may be configured to scan the read head over the degraded data portion at a reduced scan speed relative to the scan speed of a general purpose read device, wherein data in the degraded data portion is readable at the reduced scan speed but not at the scan speed of a general purpose read device. The data recovery device may include a controller configured to perform a moving average on data read from the degraded data portion, the degraded data portion having a reduced signal-to-noise ratio relative to the signal-to-noise ratio of the data portion prior to degradation, to produce an improved signal-to-noise ratio in the data signal. Alternatively, or in addition, the controller may be configured to use an error-detection code to detect one or more errors from data read from the degraded data portion, the degraded data portion have an increased bit error rate relative to the bit error rate of the data portion prior to degradation. The controller may be configured to use an error-correction code to correct detected errors in data read from the degraded data portion. A number of error detection and correction codes are known to those of skill in the art, including but not limited to, parity functions, cyclic redundancy checks, Hamming codes, Reed-Solomon codes, and so on.

The controller may be configured to control read head position to locate a read head over two or more degraded data portions of an expired data storage device and to average two or more degraded data sets read from the two or more data portions to produce a data set having an improved signal-to-noise ratio. In some embodiments, the controller may be configured to control read head position to locate a read head over a non-degraded portion of an expired data storage device that includes a non-degraded portion including data of interest and a degraded portion that prior to expiration included read-support information necessary for reading the data of interest and to recover read-support information from one or more locations within the non-degraded portion, wherein the read-support information is located at the one or more locations interspersed with the data of interest. The controller may be configured to control read head position to position the read head over a non-degraded portion of an expired data storage device that includes read-support information necessary for reading the data of interest encoded at a different spatial frequency than the data of interest and to read the read-support information from the non-degraded portion of the expired data storage device, or to position the read head over a non-degraded portion of an expired data storage device that includes read-support information necessary for reading the data of interest stored at a different level than the data of interest and to read the read-support information from the non-degraded portion of the expired data storage device.

Figure 48:
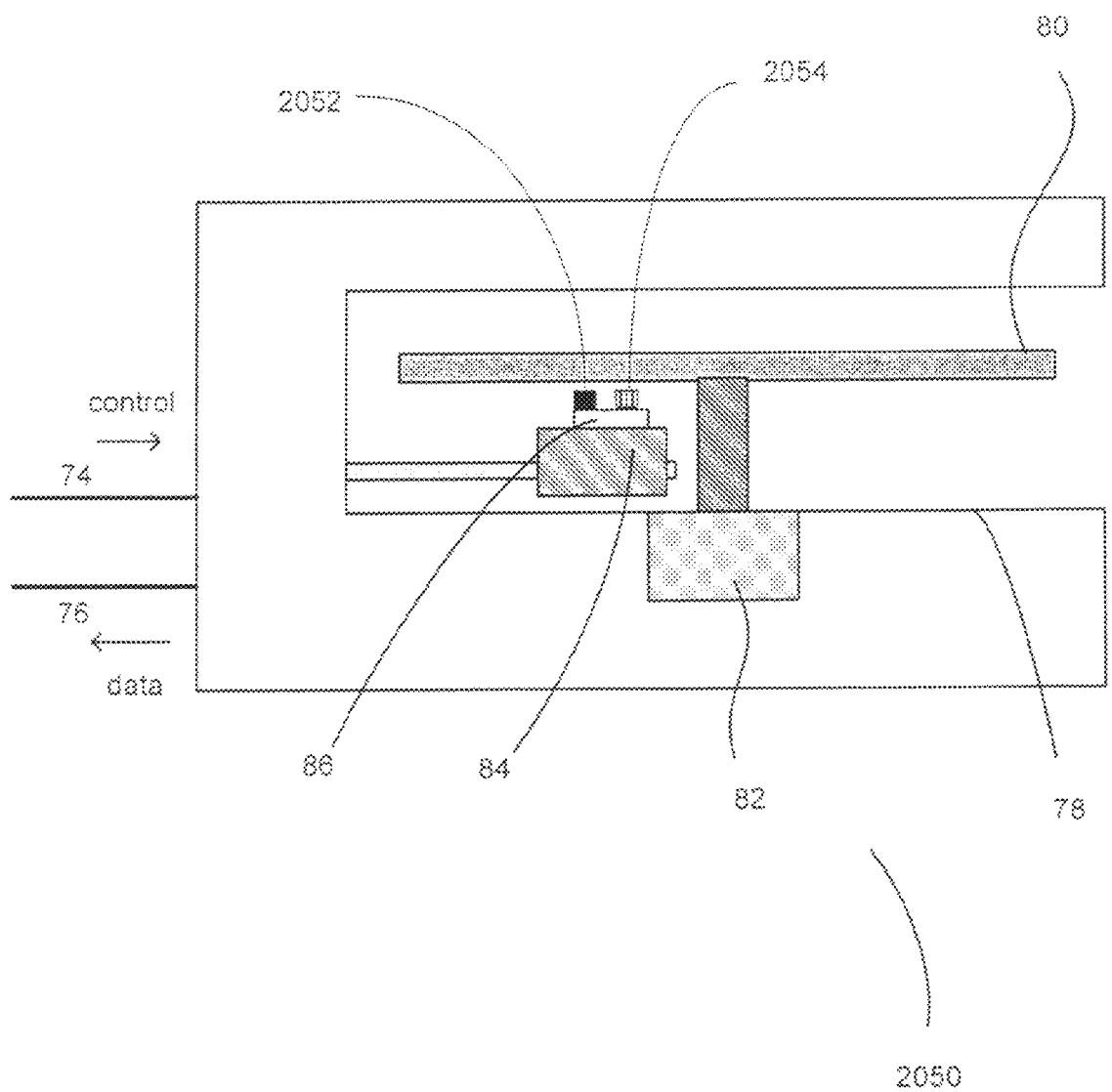
FIG. 48 depicts a read device including a read head having two different types of sensors.

The first sensor may be an optical sensor adapted to sense an optical signal from an optical data storage device, for example. The data recovery device may also include a second sensor adapted to sense information from an optical data storage medium at a different optical wavelength than the wavelength used by the first sensor, or at a different depth level of the expired data storage device than is read by the first sensor. A read device 2050 including two different sensors 2052 and 2054 of different types on read head 86 is depicted in FIG. 48. Other components (74-84) may be as depicted and described previously in FIG. 2. In some embodiments, the second sensor may be adapted to sense information from a different side of an optical data storage medium than is sensed by the first sensor. Alternatively, the first sensor is a magnetic sensor may be adapted to sense a magnetic signal from a magnetic data storage device. The second sensor may be adapted to read information from a different type of data storage medium than said first sensor. In some embodiments, the second sensor may be an optical sensor or a magnetic sensor. In some embodiments, the second sensor may be adapted to read information from at least one RFID or resonant circuit on the expired data storage device.

In another exemplary embodiment, a data recovery system may include a read head, a sensor, drive control hardware, and drive control software, where at least one of the drive control hardware and drive control software is configured to recover read-support information from an expired data storage device and to read data of interest from the information. The read head may be an optical read head, a magnetic read head, or some other type of read head. The system may include decoding hardware or software configured to decode encoded read-support information recovered from an expired data storage device. For example, the decoding hardware or software may include a function such as a HASH function or a decryption function (e.g., public key decryption function or a symmetric key decryption function), or a table-lookup operation for decoding read-support information stored in multiple locations on the expired data storage device, said multiple locations stored in a lookup table used by the table-lookup operation.

The data recovery system may include drive control hardware, which may be configured to read read-support information from an expired data storage device at a reduced read speed or to control the level of the data storage device from which read-support information is read. For example, in some embodiments, drive control hardware may be configured to control reading of read-support information from a first level of an expired data storage device and to control reading of data of interest from a second level of an expired data storage device. Drive control hardware may be configured to adjust the spatial frequency at which read-support information is read from the expired data storage device.

In some embodiments, the data recovery system may include signal processing software configured to perform signal averaging of multiple copies of low signal-to-noise ratio read-support information read from an expired data storage device.

At least one of the drive control hardware and drive control software may be configured to recover secondary read-support information distributed in the data of interest.

A computer program that may be used in connection with systems as described herein may include, for example, instructions for performing an interrogation activity with a data read device, instructions for detecting a read response from a data storage device in response to the interrogation activity with the data read device, and instructions for comparing a detected read response with an expected data range, where if the read response is within the expected data range, data is read according to a first data read protocol or if the read response is outside the expected data range, data is read according to a second data read protocol performable by special-purpose hardware or software. In such a computer program, the second data read protocol may be performable by special-purpose software, which may, for example, control the scan rate of a data read device performing the second data read protocol at a reduced scan rate relative to the scan rate of a data read device performing the first data read protocol. In other embodiments, the special-purpose software may read data to be detected from a different location of the data storage device under the second data read protocol than under the first data read protocol. In other embodiments, the second data read protocol is performable by special-purpose hardware, which may be controlled or operated by the computer program. Special purpose hardware may permit reading of data having a reduced signal-to-noise ratio relative to data readable with general purpose hardware.

With regard to the hardware and/or software used in the control of devices and systems for reading from data storage devices according to the present embodiments, those having skill in the art will recognize that the state of the art has progressed to the point where there is little distinction left between hardware and software implementations of aspects of such systems; the use of hardware or software is generally (but not always, in that in certain contexts the choice between hardware and software can become significant) a design choice representing cost vs. efficiency or implementation convenience tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some embodiments, portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the capabilities of one of skill in the art in light of this disclosure. In addition, those skilled in the art will appreciate that certain mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., links carrying packetized data).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory or an optical or ferromagnetic memory structure), and/or electrical circuitry forming a communications device (e.g., a modem, communications switch, or optical-electrical equipment).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be implicitly understood by those with skill in the art that each function and/or operation within such block diagrams, flowcharts, or examples can be implemented, individually and/or collectively, by a wide range of hardware, software, firmware, or virtually any combination thereof.

Those skilled in the art will recognize that it is common within the art to describe devices for data storage and reading in the fashion set forth herein, and thereafter use standard engineering practices to integrate such described devices and/or processes into systems including data storage devices as exemplified herein. That is, at least a portion of the devices and/or processes described herein can be integrated into a system including a data storage device via a reasonable amount of experimentation. Those having skill in the art will recognize that such systems generally include one or more of a memory such as volatile and non-volatile memory, processors such as microprocessors and digital signal processors, computational-supporting or associated entities such as operating systems, user interfaces, drivers, sensors, actuators, applications programs, one or more interaction devices, such as data ports, control systems including feedback loops and control implementing actuators (e.g., devices for sensing position and/or velocity and/or acceleration or time-rate-of-change thereof, control motors for moving and/or adjusting components and/or quantities). A typical system may be implemented utilizing any suitable available components, such as those typically found in appropriate computing/communication systems and/or data storage and reading systems, combined with standard engineering practices.

The foregoing-described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

Although the methods, devices, systems and approaches herein have been described with reference to certain preferred embodiments, other embodiments are possible. As illustrated by the foregoing examples, various choices of system configuration may be within the scope of the invention. As has been discussed, the choice of system configuration may depend on the intended application of the system, the environment in which the system is used, cost, personal preference or other factors. Data storage device design, manufacture, and control processes may be modified to take into account choices of system components and configuration, and such modifications, as known to those of skill in the arts of data storage and retrieval structures and systems, fluid control structures, and electronics design and construction, may fall within the scope of the invention. Therefore, the full spirit or scope of the invention is defined by the appended claims and is not to be limited to the specific embodiments described herein.

The invention claimed is:

1. A computer program product comprising:
a recordable type signal bearing medium bearing one or more instructions related to reading data from a data storage device, the one or more instructions including:
instructions for performing an interrogation activity with a data read device;
instructions for detecting a read response from the data storage device in response to the interrogation activity with the data read device;
instructions for comparing a detected read response with an expected data range, and if the read response is within the expected data range, reading data according to a first data read protocol or if the read response is outside the expected data range, reading data according to a second data read protocol performable by special-purpose software, wherein the special-purpose software controls the scan rate of a data read device performing the second data read protocol at a reduced scan rate relative to the scan rate of a data read device performing the first data read protocol.

2. The computer program product of claim 1, wherein the recordable type signal bearing medium includes a floppy disk.

3. The computer program product of claim 1, wherein the recordable type signal bearing medium includes a hard disk.

4. The computer program product of claim 1, wherein the recordable type signal bearing medium includes a CD ROM.

5. The computer program product of claim 1, wherein the recordable type signal bearing medium includes a digital tape.

6. The computer program product of claim 1, wherein the recordable type signal bearing medium includes a computer memory.

7. A computer program product comprising:
a recordable type signal bearing medium bearing one or more instructions related to reading data from a data storage device, the one or more instructions including:
instructions for performing an interrogation activity with a data read device;
instructions for detecting a read response from the data storage device in response to the interrogation activity with the data read device;
instructions for comparing a detected read response with an expected data range, and if the read response is within the expected data range, reading data according to a first data read protocol or if the read response is outside the expected data range, reading data according to a second data read protocol performable by special-purpose software, wherein the special-purpose software reads data from a different location of the data storage device under the second data read protocol than under the first data read protocol.

8. A computer program product comprising:
a recordable type signal bearing medium bearing one or more instructions related to reading data from a data storage device, the one or more instructions including:
instructions for performing an interrogation activity with a data read device;
instructions for detecting a read response from the data storage device in response to the interrogation activity with the data read device;
instructions for comparing a detected read response with an expected data range, and if the read response is within the expected data range, reading data according to a first data read protocol or if the read response is outside the expected data range, reading data according to a second data read protocol performable by special-purpose software, wherein the second data read protocol is performable by special-purpose software that controls at least one of the scan rate or read location of a data read device performing the second data read protocol to provide at least one of a reduced scan rate or different read location with the second data read protocol relative to the first data read protocol.

* * * * *